(12) United States Patent
Nemet et al.

(10) Patent No.: US 10,776,752 B2
(45) Date of Patent: *Sep. 15, 2020

(54) SYSTEM AND METHOD FOR QUALITY MANAGEMENT UTILIZING BARCODE INDICATORS

(71) Applicant: VARCODE LTD., Rosh Ha'ayin (IL)

(72) Inventors: Yaron Nemet, Kedumim (IL); Ephraim Brand, Givatayim (IL)

(73) Assignee: Varcode Ltd., Rosh Ha'ayin (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/671,787

(22) Filed: Nov. 1, 2019

(65) Prior Publication Data

US 2020/0134548 A1    Apr. 30, 2020

Related U.S. Application Data

(63) Continuation of application No. 16/201,334, filed on Nov. 27, 2018, now Pat. No. 10,504,060, which is a
(Continued)

(51) Int. Cl.
*G06Q 10/08* (2012.01)
*G06K 17/00* (2006.01)
(Continued)

(52) U.S. Cl.
CPC ........ *G06Q 10/087* (2013.01); *G01D 21/00* (2013.01); *G01K 11/12* (2013.01); *G06K 7/14* (2013.01); *G06K 17/00* (2013.01); *G06Q 10/08* (2013.01)

(58) Field of Classification Search
CPC ...... G06Q 10/087; G06Q 10/08; G01K 11/12; G06K 17/00; G06K 7/14; G01D 21/00
See application file for complete search history.

(56) References Cited

U.S. PATENT DOCUMENTS 4,057,029 A   11/1977   Seiter
4,059,407 A   11/1977   Hochstrasser
(Continued)

FOREIGN PATENT DOCUMENTS

CN   1720180   1/2006
CN   1914621   2/2007
(Continued)

OTHER PUBLICATIONS

An English Translation of an Office Action dated Aug. 27, 2015. which issued during the prosecution of Japanese Patent Application No. 2014-218223.
(Continued)

*Primary Examiner* — Sonji N Johnson
(74) *Attorney, Agent, or Firm* — Fish & Richardson P.C.

(57) ABSTRACT

A quality management system for products including a multiplicity of barcode indicators, each operative to provide a machine-readable indication of exceedance of at least one threshold by at least one product quality determining parameter, the at least one threshold being at least one of a time duration threshold and a combined temperature and time threshold, a barcode indicator reader operative to read the barcode indicators and to provide output indications and an indication interpreter operative to receive the output indications and to provide human sensible, product unit specific, product quality status outputs.

9 Claims, 24 Drawing Sheets

Related U.S. Application Data continuation of application No. 15/184,483, filed on Jun. 16, 2016, now Pat. No. 10,176,451, which is a continuation of application No. 14/595,412, filed on Jan. 13, 2015, now Pat. No. 9,373,100, which is a continuation of application No. 14/017,545, filed on Sep. 4, 2013, now Pat. No. 8,950,664, which is a continuation of application No. 12/598,979, filed as application No. PCT/IL2007/001411 on Nov. 14, 2007, now Pat. No. 8,528,808, which is a continuation-in-part of application No. PCT/IL2007/000547, filed on May 6, 2007.

(60) Provisional application No. 60/963,956, filed on Aug. 6, 2007, provisional application No. 60/959,120, filed on Jul. 10, 2007.

(51) Int. Cl.
  *G01D 21/00* (2006.01)
  *G01K 11/12* (2006.01)
  *G06K 7/14* (2006.01)

(56) References Cited

U.S. PATENT DOCUMENTS

| | | |
|---|---|---|
| RE31,586 E | 5/1984 | Magnussen |
| 4,674,065 A | 6/1987 | Lange et al. |
| 5,053,339 A | 10/1991 | Patel |
| 5,084,143 A | 1/1992 | Smith |
| 5,085,802 A | 2/1992 | Jalinski |
| 5,146,405 A | 9/1992 | Church et al. |
| 5,254,473 A | 10/1993 | Patel |
| 5,364,195 A | 11/1994 | Kanemitsu et al. |
| 5,369,577 A | 11/1994 | Kalashevich et al. |
| 5,485,372 A | 1/1996 | Golding et al. |
| 5,591,952 A | 1/1997 | Krichever |
| 5,600,119 A | 2/1997 | Dvorkis |
| 5,617,488 A | 4/1997 | Hong et al. |
| 5,634,195 A | 5/1997 | Sawyer |
| 5,659,771 A | 8/1997 | Golding |
| 5,752,227 A | 5/1998 | Lyberg |
| 5,805,245 A | 9/1998 | Davis |
| 5,822,728 A | 10/1998 | Applebaum et al. |
| 5,828,991 A | 10/1998 | Skiena et al. |
| 5,882,116 A | 3/1999 | Backus |
| 5,895,075 A | 4/1999 | Edwards |
| 5,899,973 A | 5/1999 | Bandara et al. |
| 5,902,982 A | 5/1999 | Lappe |
| 5,907,839 A | 5/1999 | Roth |
| 5,956,739 A | 9/1999 | Golding et al. |
| 6,006,221 A | 12/1999 | Liddy et al. |
| 6,009,400 A | 12/1999 | Blackman |
| 6,036,092 A | 3/2000 | Lappe |
| 6,085,206 A | 7/2000 | Domini et al. |
| 6,098,034 A | 8/2000 | Razin et al. |
| 6,154,722 A | 11/2000 | Bellegarda |
| 6,173,261 B1 | 1/2001 | Arai et al. |
| 6,190,610 B1 | 2/2001 | Goldsmith et al. |
| 6,214,623 B1 | 4/2001 | Simons et al. |
| 6,272,242 B1 | 8/2001 | Saitoh et al. |
| 6,314,400 B1 | 11/2001 | Klakow |
| 6,335,922 B1 | 1/2002 | Tiedemann et al. |
| 6,366,759 B1 | 4/2002 | Burstein et al. |
| 6,424,983 B1 | 7/2002 | Schabes et al. |
| 6,456,972 B1 | 9/2002 | Gladstein et al. |
| 6,479,016 B1 | 11/2002 | Goldsmith |
| 6,495,368 B1 | 12/2002 | Wallach |
| 6,544,925 B1 | 4/2003 | Prusik et al. |
| 6,685,094 B2 | 2/2004 | Cameron |
| 6,751,584 B2 | 6/2004 | Bangalore |
| 6,758,397 B2 | 7/2004 | Catan |
| 6,920,420 B2 | 7/2005 | Lin |
| 6,982,640 B2 | 1/2006 | Lindsay |
| 7,017,806 B2 | 3/2006 | Peterson |
| 7,020,338 B1 | 3/2006 | Cumbee |
| 7,030,863 B2 | 4/2006 | Longe et al. |
| 7,053,777 B2 | 5/2006 | Allen |
| 7,054,293 B2 | 5/2006 | Tiedemann et al. |
| 7,057,495 B2 | 6/2006 | Debord |
| RE39,226 E | 8/2006 | Lappe |
| 7,092,567 B2 | 8/2006 | Ma et al. |
| RE39,266 E | 9/2006 | Lohray et al. |
| 7,117,144 B2 | 10/2006 | Goodman et al. |
| 7,156,597 B2 | 1/2007 | Goldsmith et al. |
| 7,157,048 B2 | 1/2007 | Goldsmith et al. |
| 7,165,019 B1 | 1/2007 | Lee et al. |
| 7,166,345 B2 | 1/2007 | Myers |
| 7,184,950 B2 | 2/2007 | Weise |
| 7,224,346 B2 | 5/2007 | Sheng |
| 7,262,792 B2 | 8/2007 | Shniberg |
| 7,277,088 B2 | 10/2007 | Robinson et al. |
| 7,295,965 B2 | 11/2007 | Haigh et al. |
| 7,295,968 B2 | 11/2007 | Bietrix et al. |
| 7,296,019 B1 | 11/2007 | Chandrasekar et al. |
| 7,340,388 B2 | 3/2008 | Soricut |
| 7,386,442 B2 | 6/2008 | Dehlinger et al. |
| 7,457,808 B2 | 11/2008 | Gaussier |
| 7,475,015 B2 | 1/2009 | Epstein et al. |
| 7,558,725 B2 | 7/2009 | Greenwald et al. |
| 7,562,811 B2 | 7/2009 | Nemet et al. |
| 7,584,093 B2 | 9/2009 | Potter et al. |
| 7,587,217 B1 | 9/2009 | Laakso et al. |
| 7,590,626 B2 | 9/2009 | Li et al. |
| 7,702,680 B2 | 4/2010 | Yih et al. |
| 7,747,427 B2 | 6/2010 | Lee et al. |
| 7,813,916 B2 | 10/2010 | Bean |
| 7,917,355 B2 | 3/2011 | Wu et al. |
| 8,005,664 B2 | 8/2011 | Hanumanthappa |
| 8,091,776 B2 | 1/2012 | Nemet |
| 8,196,821 B2 | 6/2012 | Nemet |
| 8,271,266 B2 | 9/2012 | Gallagher |
| 8,321,786 B2 | 11/2012 | Lunati |
| 8,341,520 B2 | 12/2012 | Lakobashvili et al. |
| 8,365,070 B2 | 1/2013 | Song et al. |
| 8,473,278 B2 | 6/2013 | Futagi et al. |
| 8,500,014 B2 | 8/2013 | Nemet et al. |
| 8,528,808 B2 | 9/2013 | Nemet et al. |
| 8,540,156 B2 | 9/2013 | Nemet |
| 8,579,193 B2 | 11/2013 | Nemet |
| 8,626,786 B2 | 1/2014 | Halcrow |
| 8,807,422 B2 | 8/2014 | Nemet |
| 8,950,664 B2 | 2/2015 | Nemet et al. |
| 8,960,534 B2 | 2/2015 | Nernet et al. |
| 8,967,467 B2 | 3/2015 | Ne:Met et al. |
| 9,122,963 B2 | 9/2015 | Nemet |
| 10,176,451 B2 | 1/2019 | Nemet et al. |
| 2002/0012332 A1 | 1/2002 | Tiedemann et al. |
| 2002/0032564 A1 | 3/2002 | Eshani et al. |
| 2002/0056756 A1 | 5/2002 | Cameron et al. |
| 2002/0128821 A1 | 9/2002 | Ehsani |
| 2002/0169595 A1 | 11/2002 | Agichtein et al. |
| 2003/0187632 A1 | 10/2003 | Menich |
| 2003/0204569 A1 | 10/2003 | Andrews et al. |
| 2003/0210249 A1 | 11/2003 | Simske |
| 2003/0227392 A1 | 12/2003 | Ebert |
| 2003/0233222 A1 | 12/2003 | Soricut et al. |
| 2004/0002849 A1 | 1/2004 | Zhou |
| 2004/0018641 A1 | 1/2004 | Goldsmith et al. |
| 2004/0030540 A1 | 2/2004 | Ovil et al. |
| 2004/0093567 A1 | 5/2004 | Schabes et al. |
| 2004/0138869 A1 | 7/2004 | Heinecke |
| 2004/0215514 A1 | 10/2004 | Devlin |
| 2004/0260543 A1 | 12/2004 | Horowitz |
| 2005/0043940 A1 | 2/2005 | Elder |
| 2005/0044495 A1 | 2/2005 | Lee et al. |
| 2005/0053900 A1 | 3/2005 | Kaufmann |
| 2005/0083413 A1 | 4/2005 | Reed et al. |
| 2005/0091030 A1 | 4/2005 | Jessee et al. |
| 2005/0091088 A1 | 4/2005 | Peterson |
| 2005/0108001 A1 | 5/2005 | Aarskog |
| 2005/0120002 A1 | 6/2005 | Behbehani |
| 2005/0139686 A1 | 6/2005 | Helmer et al. |

(56) References Cited

U.S. PATENT DOCUMENTS

| | | |
|---|---|---|
| 2005/0143971 A1 | 6/2005 | Burstein |
| 2005/0162274 A1 | 7/2005 | Shniberg et al. |
| 2005/0209844 A1 | 9/2005 | Wu et al. |
| 2005/0257146 A1 | 11/2005 | Asheraft et al. |
| 2006/0003297 A1 | 1/2006 | Wiig et al. |
| 2006/0032427 A1 | 2/2006 | Ishii et al. |
| 2006/0048055 A1 | 3/2006 | Wu et al. |
| 2006/0057022 A1 | 3/2006 | Williams |
| 2006/0074655 A1 | 4/2006 | Bejar et al. |
| 2006/0081711 A1 | 4/2006 | Zhao et al. |
| 2006/0110714 A1 | 5/2006 | Symmes |
| 2006/0129381 A1 | 6/2006 | Wakita |
| 2006/0247914 A1 | 11/2006 | Brener et al. |
| 2006/0260958 A1 | 11/2006 | Brunner |
| 2007/0067177 A1 | 3/2007 | Martin |
| 2007/0094024 A1 | 4/2007 | Kristensson et al. |
| 2007/0106937 A1 | 5/2007 | Cueerzan et al. |
| 2007/0141544 A1 | 6/2007 | Nakane |
| 2007/0238084 A1 | 10/2007 | Maguire et al. |
| 2007/0265831 A1 | 11/2007 | Dinur et al. |
| 2007/0271089 A1 | 11/2007 | Bates et al. |
| 2008/0059151 A1 | 3/2008 | Chen |
| 2008/0077859 A1 | 3/2008 | Schabes et al. |
| 2008/0154600 A1 | 6/2008 | Tian et al. |
| 2008/0167858 A1 | 7/2008 | Christie et al. |
| 2008/0173712 A1 | 7/2008 | Nemet |
| 2008/0189106 A1 | 8/2008 | Low et al. |
| 2008/0195940 A1 | 8/2008 | Gail et al. |
| 2008/0208567 A1 | 8/2008 | Brockett et al. |
| 2008/0208582 A1 | 8/2008 | Gallino |
| 2008/0249773 A1 | 10/2008 | Bejar et al. |
| 2008/0270897 A1 | 10/2008 | Jawerth et al. |
| 2009/0083028 A1 | 3/2009 | Davtchev et al. |
| 2009/0198671 A1 | 8/2009 | Zhang |
| 2009/0228467 A1 | 9/2009 | Asanuma |
| 2009/0230182 A1 | 9/2009 | Nemet et al. |
| 2009/0302102 A1 | 12/2009 | Nemet et al. |
| 2009/0319257 A1 | 12/2009 | Blume et al. |
| 2010/0020970 A1 | 1/2010 | Liu |
| 2010/0050074 A1 | 2/2010 | Nachmani et al. |
| 2010/0219235 A1 | 9/2010 | Nemet et al. |
| 2010/0275118 A1 | 10/2010 | Iakobashvili et al. |
| 2010/0286979 A1 | 11/2010 | Zangvil et al. |
| 2011/0006109 A1 | 1/2011 | Nemet |
| 2011/0006115 A1 | 1/2011 | Nemet |
| 2011/0093268 A1 | 4/2011 | Gorin et al. |
| 2011/0184720 A1 | 7/2011 | Zangvil |
| 2012/0104105 A1 | 5/2012 | Nemet |
| 2012/0104106 A1 | 5/2012 | Nemet |
| 2012/0145781 A1 | 6/2012 | Nemet |
| 2012/0305637 A1 | 12/2012 | Nemet |
| 2013/0024185 A1 | 1/2013 | Parikh |
| 2013/0138641 A1 | 5/2013 | Korolev et al. |
| 2013/0334301 A1 | 12/2013 | Nemet et al. |
| 2014/0001256 A1 | 1/2014 | Nemet et al. |
| 2014/0110486 A1 | 4/2014 | Nemet |
| 2014/0252096 A1 | 9/2014 | Nemet et al. |
| 2014/0353385 A1 | 12/2014 | Nemet |
| 2015/0053776 A1 | 2/2015 | Nemet et al. |
| 2015/0122880 A1 | 5/2015 | Nemet et al. |
| 2015/0193677 A1 | 7/2015 | Nemet et al. |

FOREIGN PATENT DOCUMENTS

| | | |
|---|---|---|
| CN | 101365934 | 2/2009 |
| EP | 936753 | 8/1999 |
| JP | S63-094383 | 4/1988 |
| JP | 63-118894 | 5/1988 |
| JP | 3-53281 | 3/1991 |
| JP | 5-6470 | 1/1993 |
| JP | 5-19695 | 1/1993 |
| JP | 5-67753 | 3/1993 |
| JP | 9-504858 | 11/1994 |
| JP | 2006-522933 | 5/1997 |
| JP | 2001-502794 | 2/2001 |
| JP | 2002-040012 | 2/2002 |
| JP | 2002-504684 | 2/2002 |
| JP | 2003-203210 | 7/2003 |
| JP | 2003-525464 | 8/2003 |
| JP | 2005-518320 | 6/2005 |
| JP | 2006-18782 | 1/2006 |
| JP | 2007-121017 | 5/2007 |
| JP | 2004-184920 | 7/2007 |
| WO | 1994/27144 | 11/1994 |
| WO | 1994/27155 | 11/1994 |
| WO | 1997/011535 | 3/1997 |
| WO | 1998/14777 | 4/1998 |
| WO | 1998/035514 | 12/1998 |
| WO | 1999/042822 | 8/1999 |
| WO | 2001/048680 | 7/2001 |
| WO | 2001/064430 | 9/2001 |
| WO | 2003/060626 | 7/2003 |
| WO | 2004/038353 | 5/2004 |
| WO | 2004/038535 | 5/2004 |
| WO | 2004/092697 | 10/2004 |
| WO | 2006-086053 | 8/2006 |
| WO | 2007-049792 | 5/2007 |
| WO | 2008/022140 | 2/2008 |
| WO | 2006/134795 | 1/2009 |
| WO | 09/016631 | 2/2009 |
| WO | 2007/129316 | 4/2009 |
| WO | 2008/135962 | 4/2009 |
| WO | 2009/063464 | 5/2009 |
| WO | 2009/063465 | 5/2009 |
| WO | 2009-144701 | 12/2009 |
| WO | 2009/150641 | 12/2009 |
| WO | 10/013228 | 2/2010 |
| WO | 2010/134061 | 11/2010 |
| WO | 2010/134062 | 11/2010 |

OTHER PUBLICATIONS

European Search Report dated Sep. 16, 2015, which issued during the prosecution of Applicant's European App No. 09844849.

An Office Action dated Nov. 4, 2013, which issued during the prosecution of U.S. Appl. No. 13/323,906.

A Notice of Allowance dated Nov. 18, 2014, which issued during the prosecution of U.S. Appl. No. 13/323,906.

A Notice of Allowance dated Apr. 23, 2014. which issued during the prosecution of U.S. Appl. No. 13/323,906.

A Notice of Allowance dated Apr. 25, 2014, which issued during the prosecution of U.S. Appl. No. 13/490,705.

A Notice of Allowance dated Nov. 7, 2014, which issued during the prosecution of U.S. Appl. No. 13/490,705.

An English translation of an Office Action dated Feb. 3, 2014 which issued during the prosecution of Japanese Patent Application No. 2012-511407.

An English translation of an Office Action dated Aug. 26, 2014 which issued during the prosecution of Japanese Patent Application No. 2012-511407.

An Office Action dated Mar. 6, 2015, which issued during the prosecution of U.S. Appl. No. 14/055,422.

An English translation of an Office Action dated Jun. 25, 2013 which issued during the prosecution of Japanese Patent Application No. 2012-511406.

An Office Action dated Nov. 7, 2012, which issued during the prosecution of U.S. Appl. No. 12/743,209.

An English Translation of an Office Action dated Dec. 24, 2013 which issued during the prosecution of Chinese Patent Application No. 200980160387.4.

An Office Action dated Mar. 9, 2012, which issued during the prosecution of U.S. Appl. No. 12/743,209.

An Office Action dated Apr. 14, 2014, which issued during the prosecution of U.S. Appl. No. 13/657,185.

An Office Action dated Jan. 16, 2013 which issued during the prosecution of U.S. Appl. No. 12/598,979.

An Office Action dated Dec. 19, 2012, which issued during the prosecution of U.S. Appl. No. 12/742,650.

An Office Action dated Mar. 20, 2013, which issued during the prosecution of U.S. Appl. No. 13/321,477.

(56) References Cited

OTHER PUBLICATIONS

An Office Action dated Aug. 14, 2015, which issued during the prosecution of U.S. Appl. No. 14/055,422.
An English Translation of an Office Action dated Feb. 26, 2013 which issued during the prosecution of Japanese Patent Application No. JP2009-508663.
An English Translation of an Office Action dated Jan. 15, 2013 which issued during the prosecution of Japanese Patent Application No. JP2010-507054.
An Extended European Search Report dated Feb. 11, 2013, which issued during the prosecution of European Patent Application No. 08848845.
An Extended European Search Report dated Feb. 18, 2013, which issued during the prosecution of European Application No. 09762166.
An Office Action dated Nov. 7, 2011, which issued during the prosecution of U.S. Appl. No. 12/598,979.
An International Preliminary Report on Patentability dated Nov. 22, 2011 which issued during the prosecution of Applicant's PCT/IL10/00205.
U.S. Appl. No. 60/746,646, filed May 7, 2006.
U.S. Appl. No. 60/804,072, filed Jun. 6, 2006.
U.S. Appl. No. 61/231,799, filed Aug. 6, 2009.
U.S. Appl. No. 61/131,644, filed Jun. 10, 2008.
An Office Action dated Oct. 28, 2013, which issued during the prosecution of U.S. Appl. No. 14/017,545.
An Office Action dated Jun. 20, 2008 which issued during the prosecution of U.S. Appl. No. 11/852,911.
An International Search Report and a Written Opinion both dated Jul. 17, 2008, which issued during the prosecution of Applicant's PCTIL2007000547.
An International Preliminary Report on Patentability dated Mar. 10, 2009, which issued during the prosecution of Applicant's PCTIL2007000547.
An International Search Report and Written Opinion both dated Jan. 9, 2009, which issued during the prosecution of Applicant's PCT/IL2007/001411.
An International Preliminary Report on Patentability dated Nov. 10, 2009, which issued during the prosecution of Applicant's PCT/IL2007/001411.
A Notice of Allowance dated Feb. 15, 2012, which issued during the prosecution of U.S. Appl. No. 12/471,798.
A European Search Report dated Aug. 18, 2011, which issued during the prosecution of European Patent Application No. 0 773 6287.
An Office Action dated Apr. 19, 2011, which issued during the prosecution of U.S. Appl. No. 12/469,309.
A Notice of Allowance dated Sep. 9, 2011, which issued during the prosecution of U.S. Appl. No. 12/469,309.
An Office Action dated May 3, 2011, which issued during the prosecution of U.S. Appl. No. 12/471,798.
An International Search Report and Written Opinion both dated Aug. 31, 2009, which issued during the prosecution of Applicant's PCT/IL2009/000503.
An International Preliminary Report on Patentability dated Dec. 13, 2010, which issued during the prosecution of Applicant's PCT/IL2009/000503.
An International Search Report and Written Opinion both dated Apr. 5, 2010, which issued during the prosecution of Applicant's PCT/IL2009/001167.
An International Preliminary Report on Patentability dated Nov. 22, 2011, which issued during the prosecution of Applicant's PCT/IL2009/001167.
A Notice of Allowance dated Apr. 2, 2013, which issued during the prosecution of U.S. Appl. No. 12/743,209.
An English Translation of an Office Action dated Mar. 10, 2010 which issued during the prosecution of Chinese Patent Application No. 201082230956.6.
An Office Action dated Sep. 10, 2013, which issued during the prosecution of U.S. Appl. No. 13/657,185.
An English translation of an Office Action dated Sep. 10, 2013 which issued during the prosecution of Japanese Patent Application No. 2011-513110.
An English translation of an Office Action dated Aug. 27, 2013 which issued during the prosecution of Japanese Patent Application No. 2010-507054.
An Examiner Interview Summary Report dated Nov. 7, 2008, which issued during the prosecution of U.S. Appl. No. 11/852,911.
A Notice of Allowance dated Feb. 25, 2009, which issued during the prosecution of U.S. Appl. No. 11/852,911.
An Office Action dated Mar. 15, 2013 which issued during the prosecution of U.S. Appl. No. 13/321,467.
A Notice of Allowance dated Jul. 11, 2013, which issued during the prosecution of U.S. Appl. No. 13/321,477.
An Office Action dated Jul. 12, 2013, which issued during the prosecution of European Patent Application No. 07736287.9.
A Notice of Allowance dated May 16, 2013, which issued during the prosecution of U.S. Appl. No. 12/742,650.
An Office Action dated Sep. 18, 2014, which issued during the prosecution of U.S. Appl. No. 14/143,827.
A Notice of Allowance dated Oct. 15, 2014, which issued during the prosecution of U.S. Appl. No. 14/017,545.
A Notice of Allowance dated Apr. 17, 2009, which issued during the prosecution of U.S. Appl. No. 11/852,911.
An Office Action dated Sep. 9, 2011, which issued during the prosecution of U.S. Appl. No. 12/471,798.
An Office Action dated Oct. 12. 2012, which issued during the prosecution of U.S. Appl. No. 12/669,175.
An Office Action dated Aug. 5, 2013, which issued during the prosecution of U.S. Appl. No. 12/669,175.
An Office Action dated Feb. 5, 2013, which issued during the prosecution of U.S. Appl. No. 12/669,175.
An Office Action dated Mar. 7, 2014, which issued during the prosecution of U.S. Appl. No. 12/669,175.
A Notice of Allowance dated Aug. 5, 2014, which issued during the prosecution of U.S. Appl. No. 12/669,175.
An English Translation of an Office Action dated Apr. 22, 2014 which issued during the prosecution of Israeli Patent Application No. 205687.
An English Translation of an Office Action dated Oct. 27, 2014 which issued during the prosecution of Israeli Patent Application No. 209901.
An Office Action dated Jul. 1, 2014, which issued during the prosecution of U.S. Appl. No. 13/576,330.
An English Translation of an Office Action dated Jun. 23, 2014 which issued during the prosecution of Chinese Patent Application No. 200880101405.7.
Letter submitted on Jul. 17, 2009 in U.S. Appl. No. 11/852,911.
An. Office Action dated May 9, 2013, which issued during the prosecution of U.S. Appl. No. 12/937,618.
An English Translation of an Office Action dated Jan. 25, 2013 which issued during the prosecution of Chinese Patent Application No. 200880101405.7
An English Translation of an Office Action dated Apr. 28, 2012 which issued during the prosecution of Chinese Patent Application No. 200880101405.7.
An Office Action dated Aug. 18, 2014, which issued during the prosecution of U.S. Appl. No. 14/461,778.
A Notice of Allowance dated Jun. 27, 2014, which issued during the prosecution of U.S. Appl. No. 14/017,545.
A Supplementary European Search Report dated Jul. 5, 2012, which issued during the prosecution of European Patent Application No. 08789727.
An English Translation of an Office Action dated Jun. 23, 2011 which issued during the prosecution of Chinese Patent Application No. 200880101405.7.
An International Search Report and a Written Opinion both dated May 25, 2011, which issued during the prosecution of Applicant's PCT/IL2011/00088.
An International Search Report dated May 11, 2009, which issued during the prosecution of Applicant's PCT/IL2009/00130.
An Intentational Search Report dated Jun. 26, 2009, which issued during the prosecution of Applicant's PCT/IL2009/00317.

(56) References Cited

OTHER PUBLICATIONS

An International Preliminary Examination Report dated Oct. 19, 2010, which issued during the prosecution of Applicant's PCT/IL2009/00317.
Bick, E., "A Constraint Grammar Based Spelichecker for Danish with a Special Focus on Dyslexics" SKY Journal of Linguistics, vol. 19:2006 (ISSN 1796-279X), pp. 387-396 (retrieved Jan. 12, 2009 from the internet). <URL http://www.ling.helsinki.fi/sky/julkaisut/SKY2006_1/1.6.1.%20BICK.pdf>.
An International Search Report and Written Opinion both dated Feb. 3, 2009 which issued during the prosecution of Applicant's PCT/IL08/01051.
An Office Action dated Jan. 10, 2014, which issued during the prosecution of European Patent Application No. 08848845.
An Office Action dated Jun. 5, 2014, which issued during the prosecution of U.S. Appl. No. 14/017,545.
A Notice of Allowance dated Apr. 26, 2013, which issued during the prosecution of U.S. Appl. No. 12/598,979.
A Supplementary European Search Report dated Apr. 13, 2011, which issued during the prosecution of European Patent Application No. 07827384.
An English Translation of an Office Action dated Feb. 7, 2012 which issued during the prosecution of Japanese Patent Application No. JP2009-508663.
A Supplementary European Search Report dated Aug. 23, 2010, which issued during the prosecution of European Patent Application No. 08849330.9.
An International Preliminary Report on Patentability dated May 18, 2010, which issued during the prosecution of Applicant's PCT/IL2008/001495.
An International Preliminary Report on Patentability dated May 18, 2010, which issued during the prosecution of Applicant's PCT/IL2008/001494.
An International Search Report and a Written Opinion both dated Jun. 3, 2009, which issued during the prosecution of Applicant's PCT/IL2008/001494.
An International Search Report and a Written Opinion both dated Jun. 8, 2010, which issued during the prosecution of Applicant's PCT/IL2010/000205.
An International Search Report and a Written Opinion both dated Mar. 9, 2009, which issued during the prosecution of Applicant's PCT/IL2008/001495.
An Office Action dated Apr. 25, 2012, which issued during the prosecution of U.S. Appl. No. 12/598,979.
An English Translation of an Office Action dated Oct. 25, 2012 which issued during the prosecution of Israeli Patent Application No. 201958.
An Office Action dated Jan. 21, 2015, which issued during the prosecution of U.S. Appl. No. 14/461,778.
An Office Action dated Feb. 11, 2015, which issued during the prosecution of U.S. Appl. No. 13/958,893.
An English Translation of an Office Action dated Feb. 18, 2014 which issued during the prosecution of Japanese Patent Application No. JP2009-508663.
U.S. Appl. No. 60/963,956, filed May 7, 2006.
U.S. Appl. No. 60/959,120, filed Jun. 6, 2006.
An. Office Action dated Sep. 25, 2014, which issued during the prosecution of U.S. Appl. No. 14/461,778.
An English Translation of an Office Action dated Nov. 4, 2014 which issued during the prosecution of Chinese Patent Application No. 201080030956.6.
An English Translation of an Office Action dated Apr. 19, 2015 which issued during the prosecution of Israeli Patent Application No. 216396.
An English Translation of an Office Action dated Jan. 6, 2014 which issued during the prosecution of Chinese Patent Application No. 201080030956.6.
An English translation of an Office Action dated Jul. 28, 2015 which issued during the prosecution of Japanese Patent Application No. 2014-125707.
An Office Action dated May 29, 2015, which issued during the prosecution of U.S. Appl. No. 13/958,893.
An Office Action dated May 13, 2015, which issued during the prosecution of U.S. Appl. No. 14/461,778.

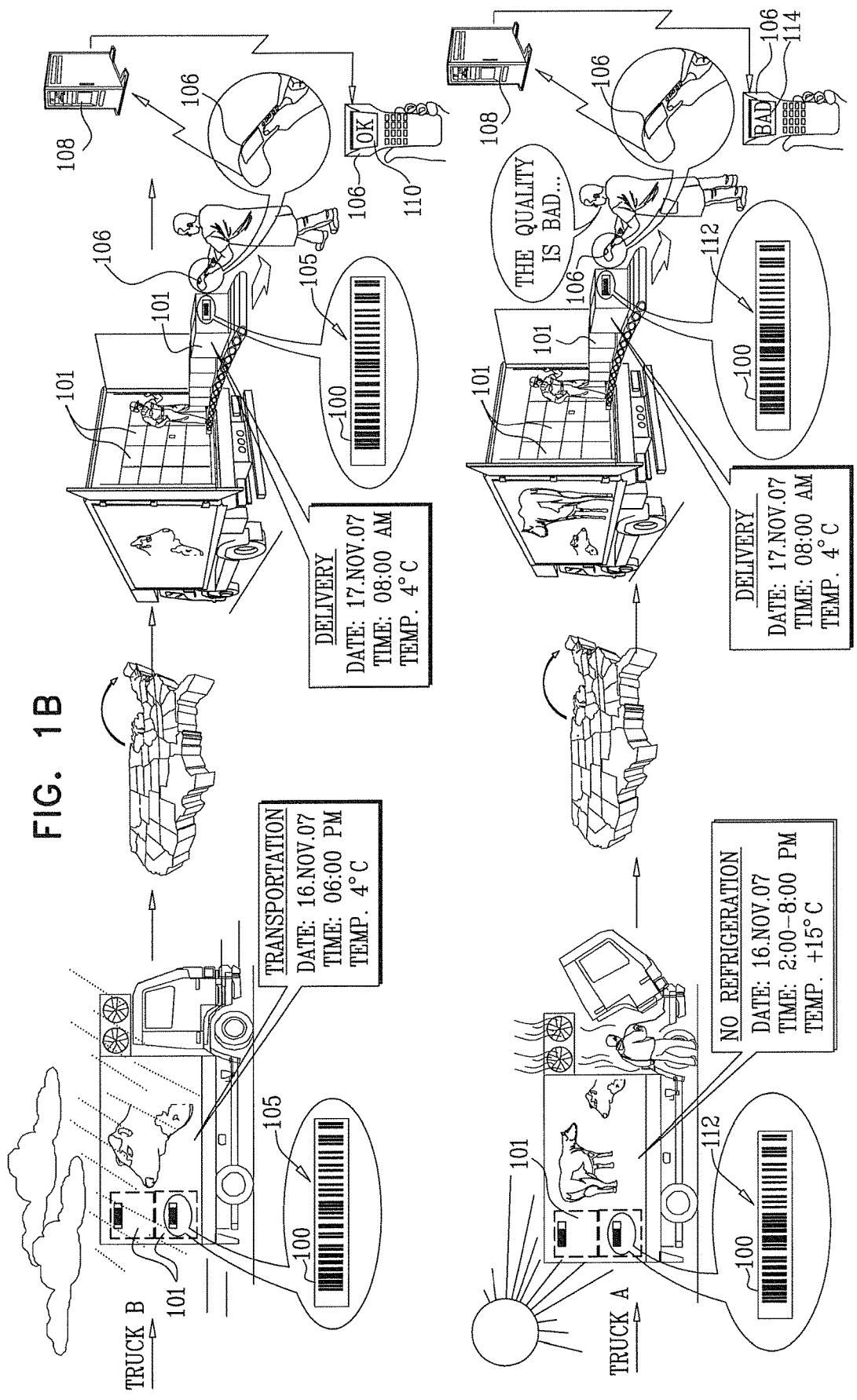

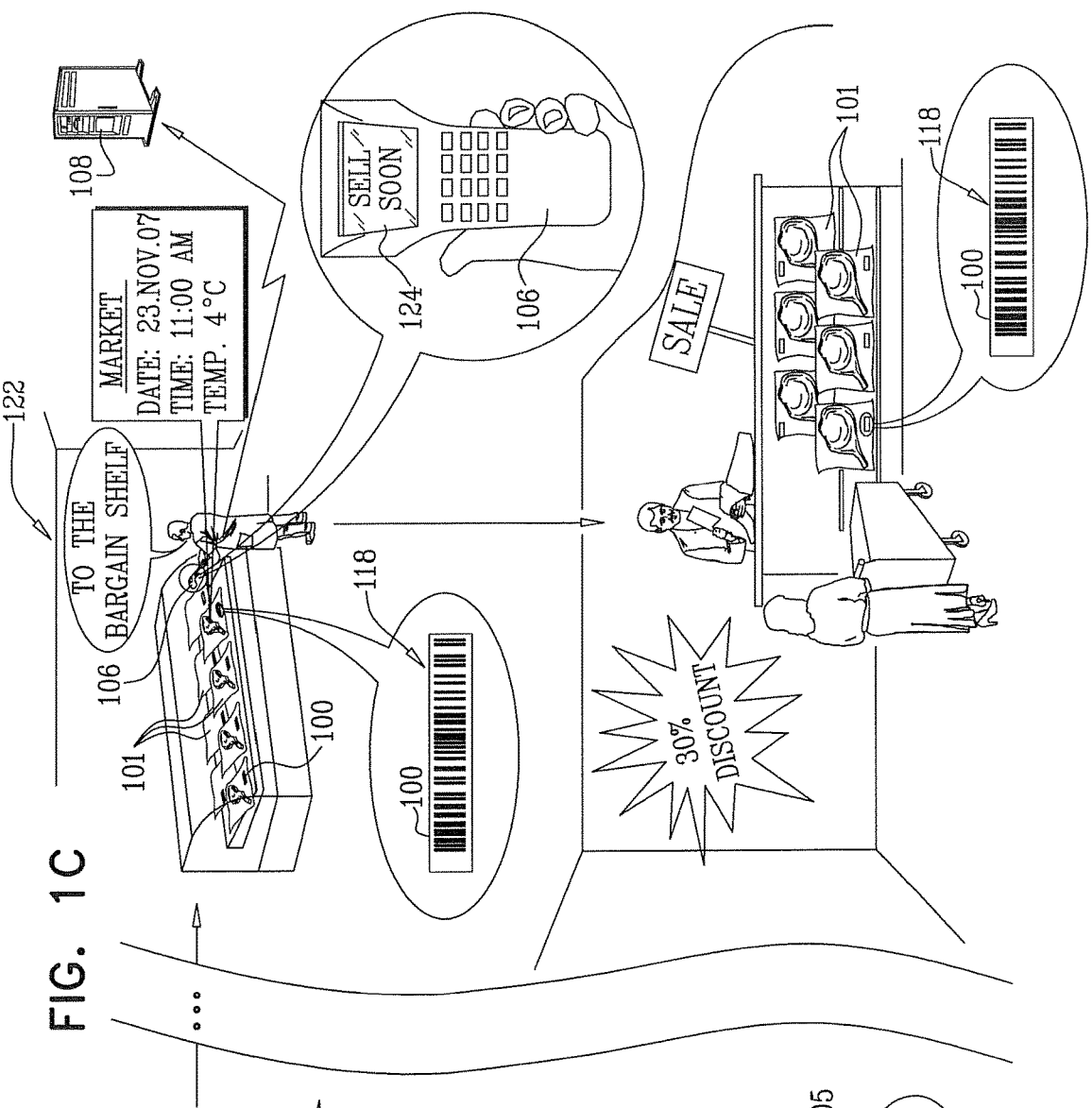
FIG. 1C
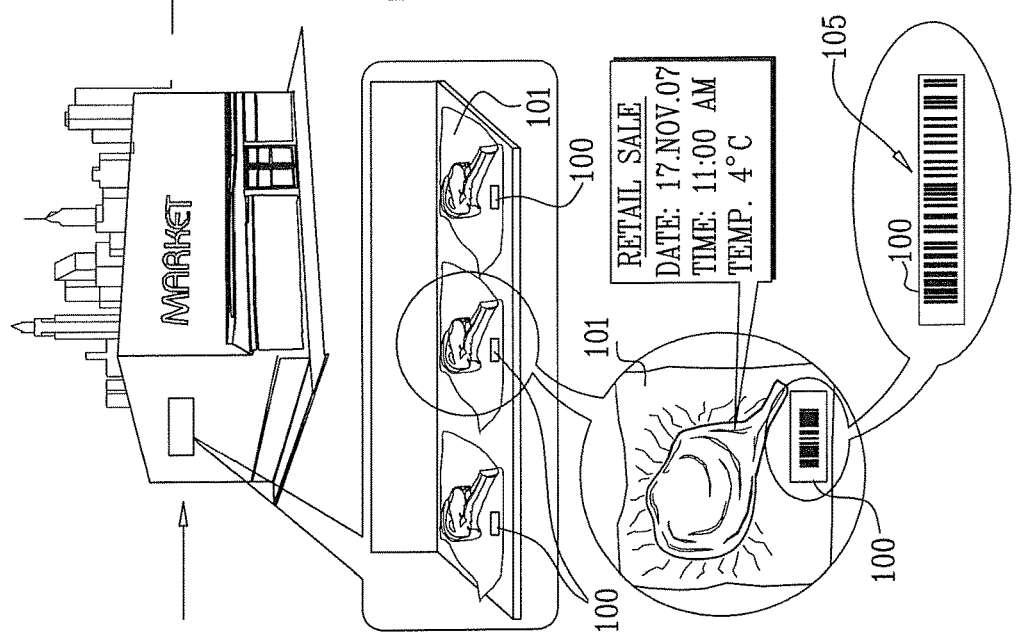

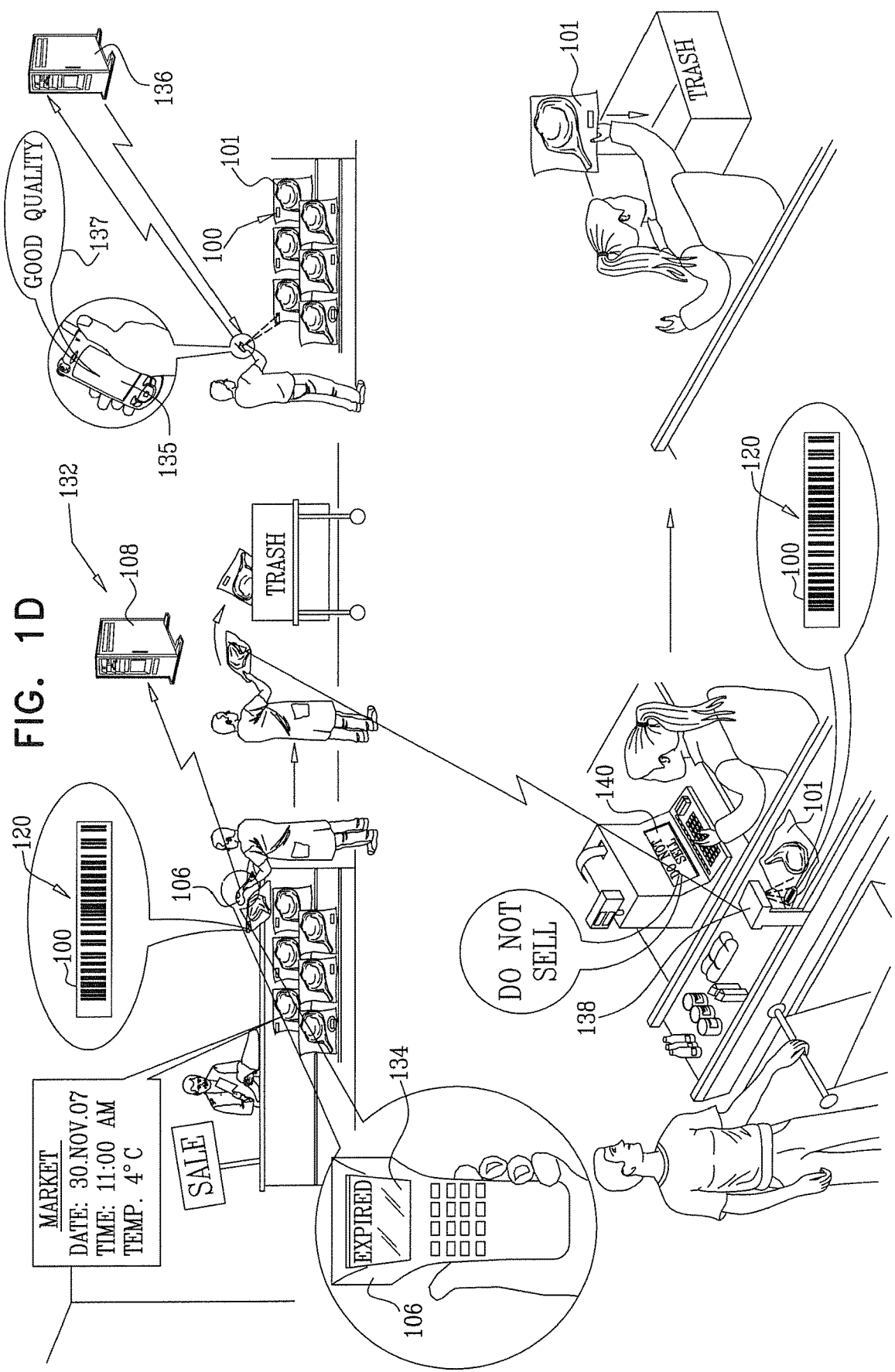

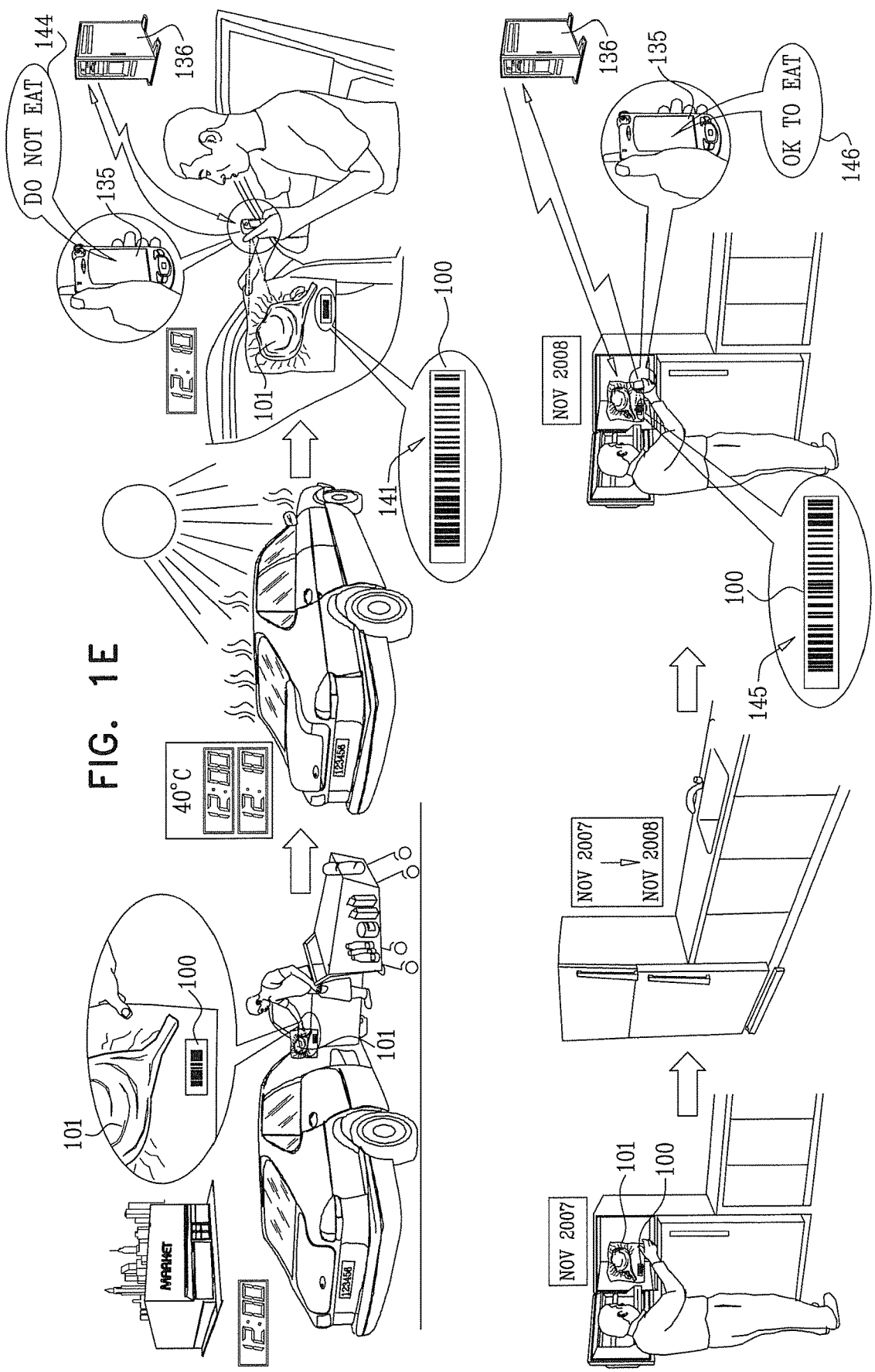

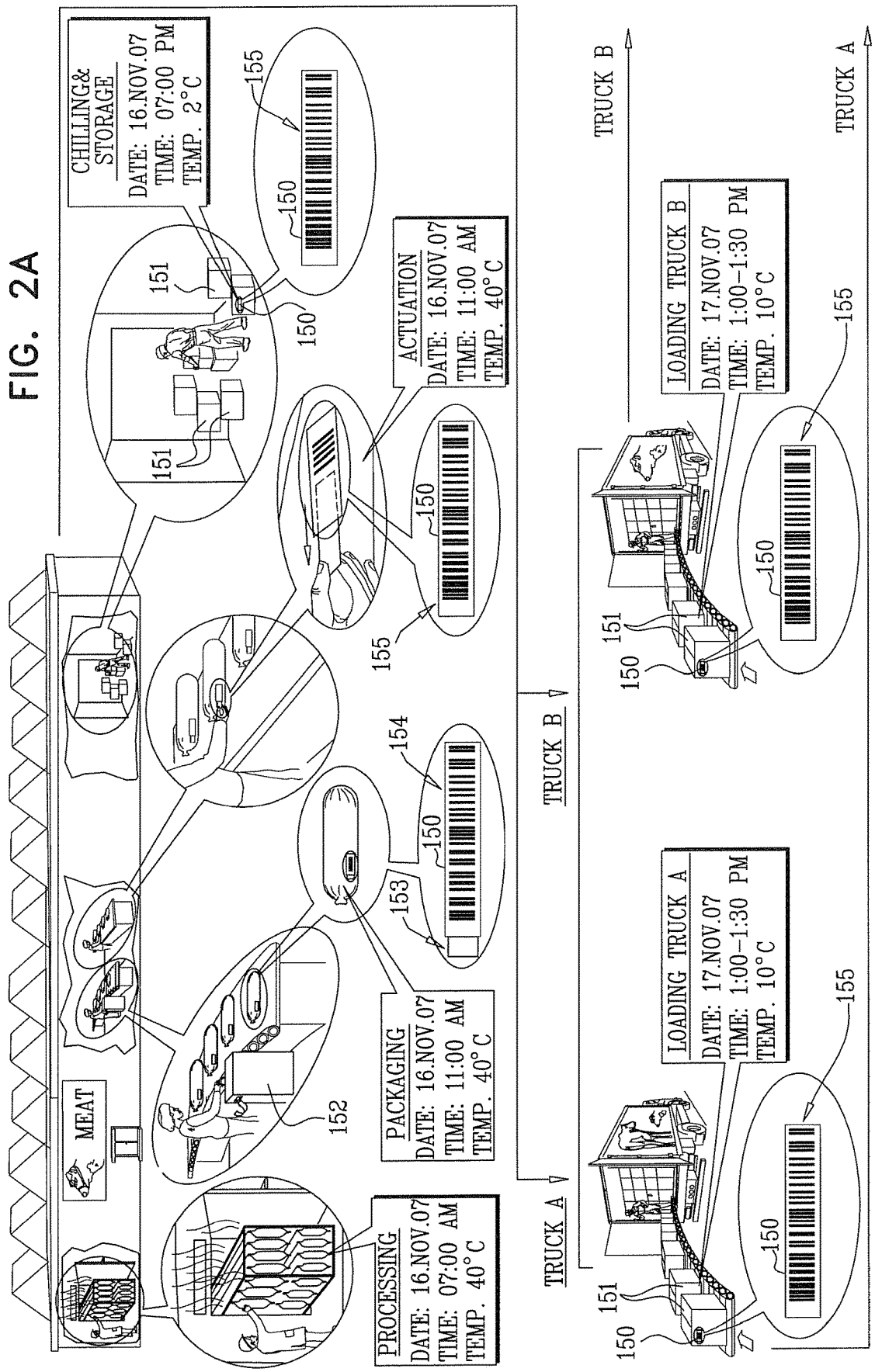

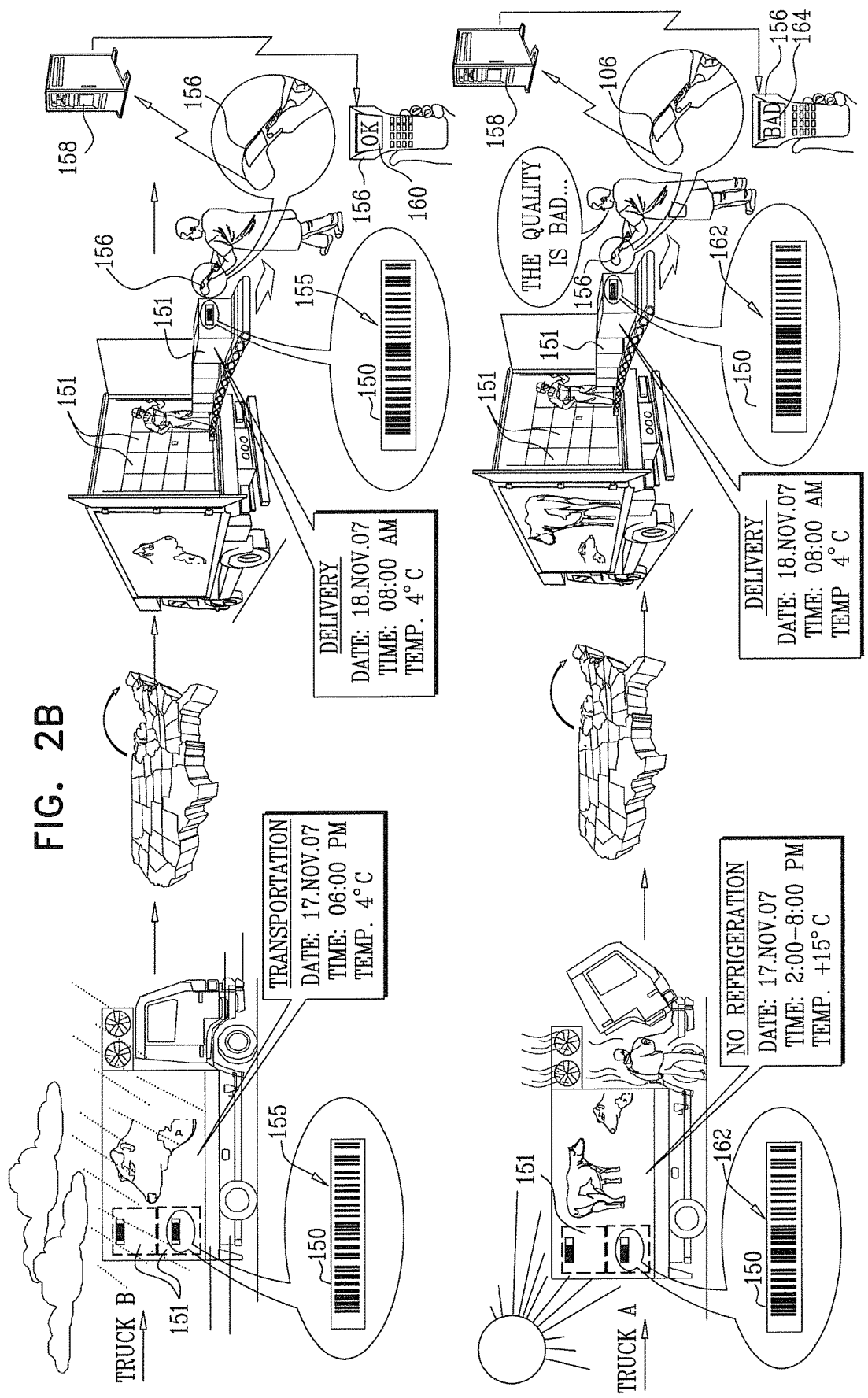

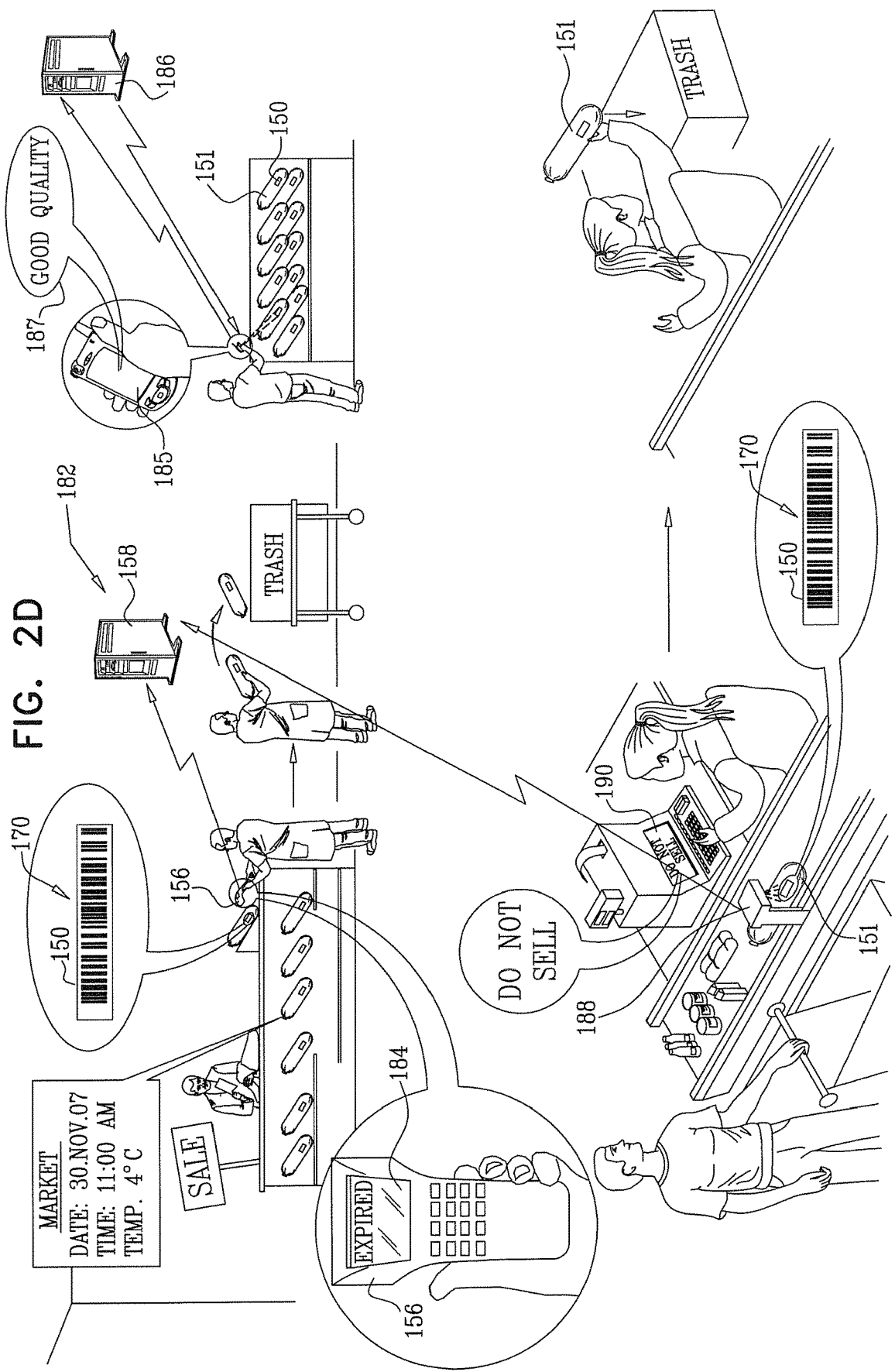

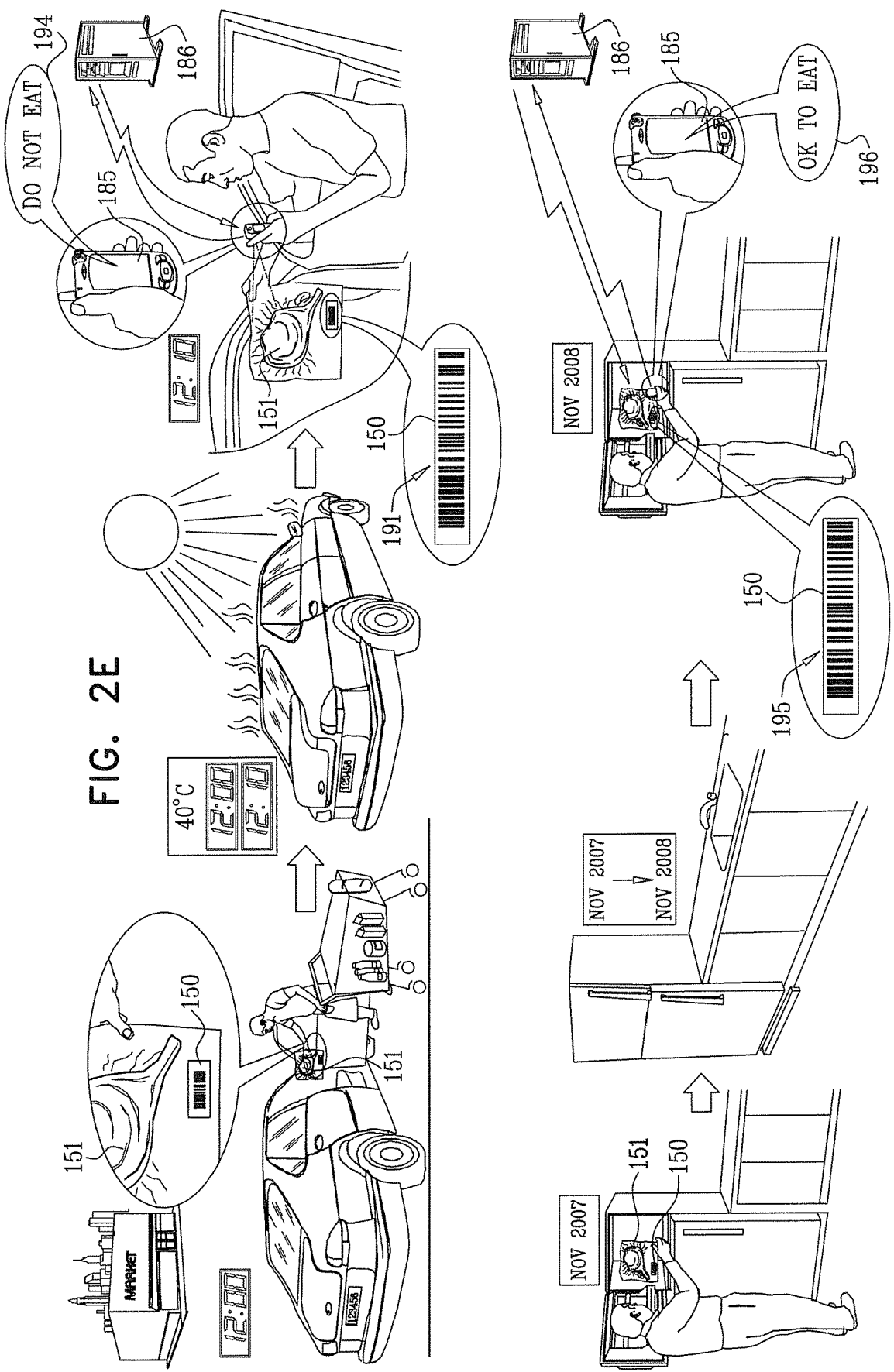

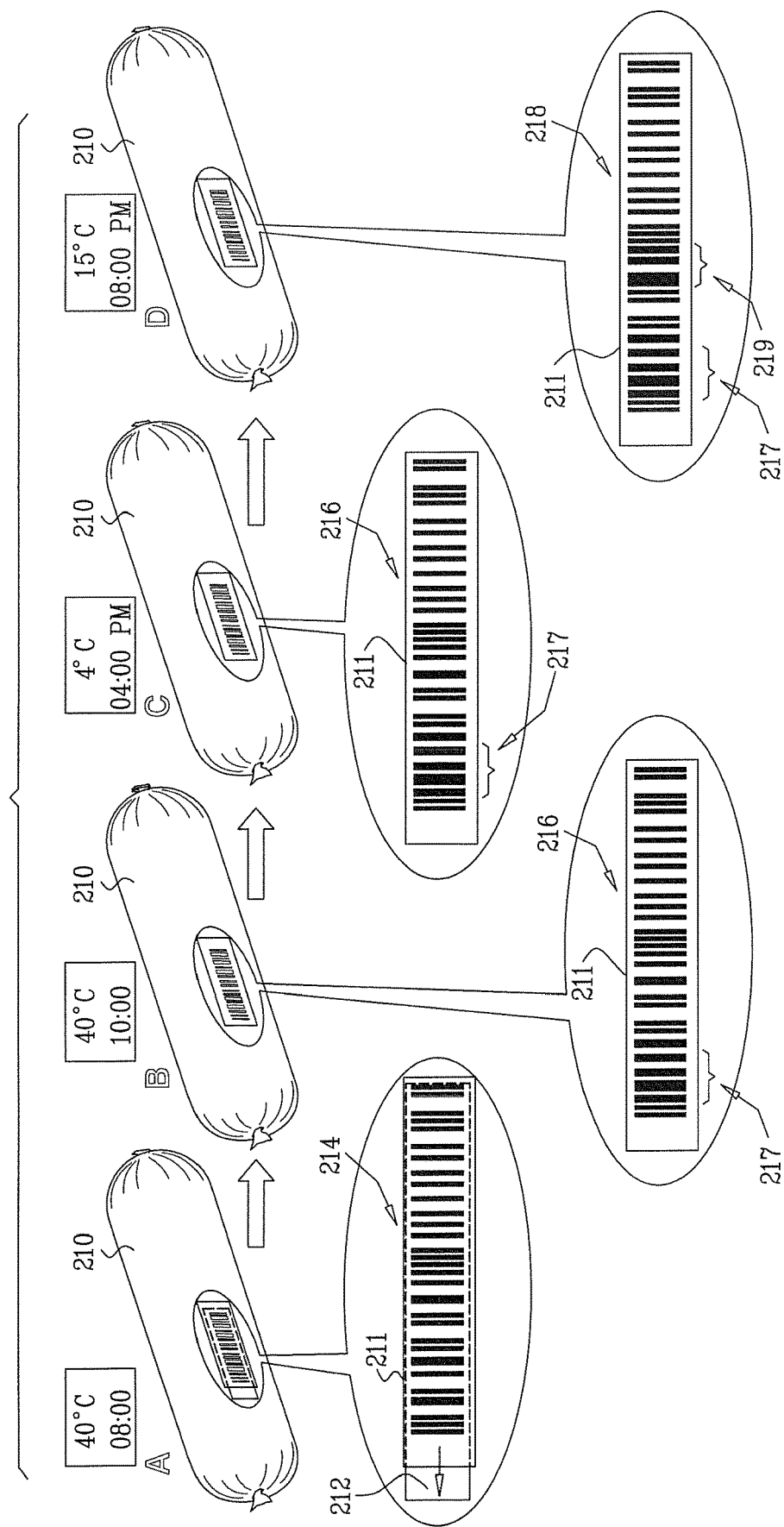

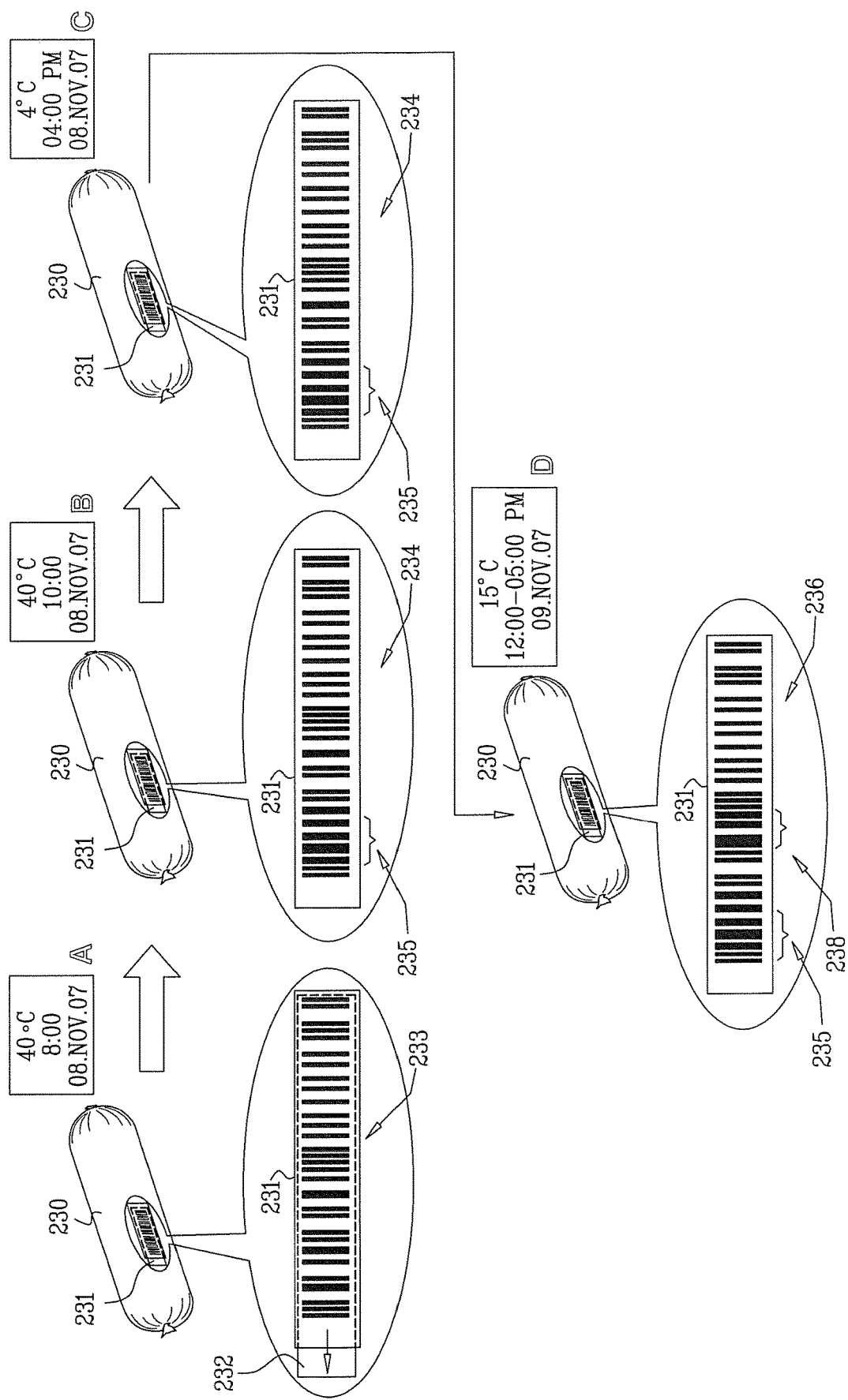

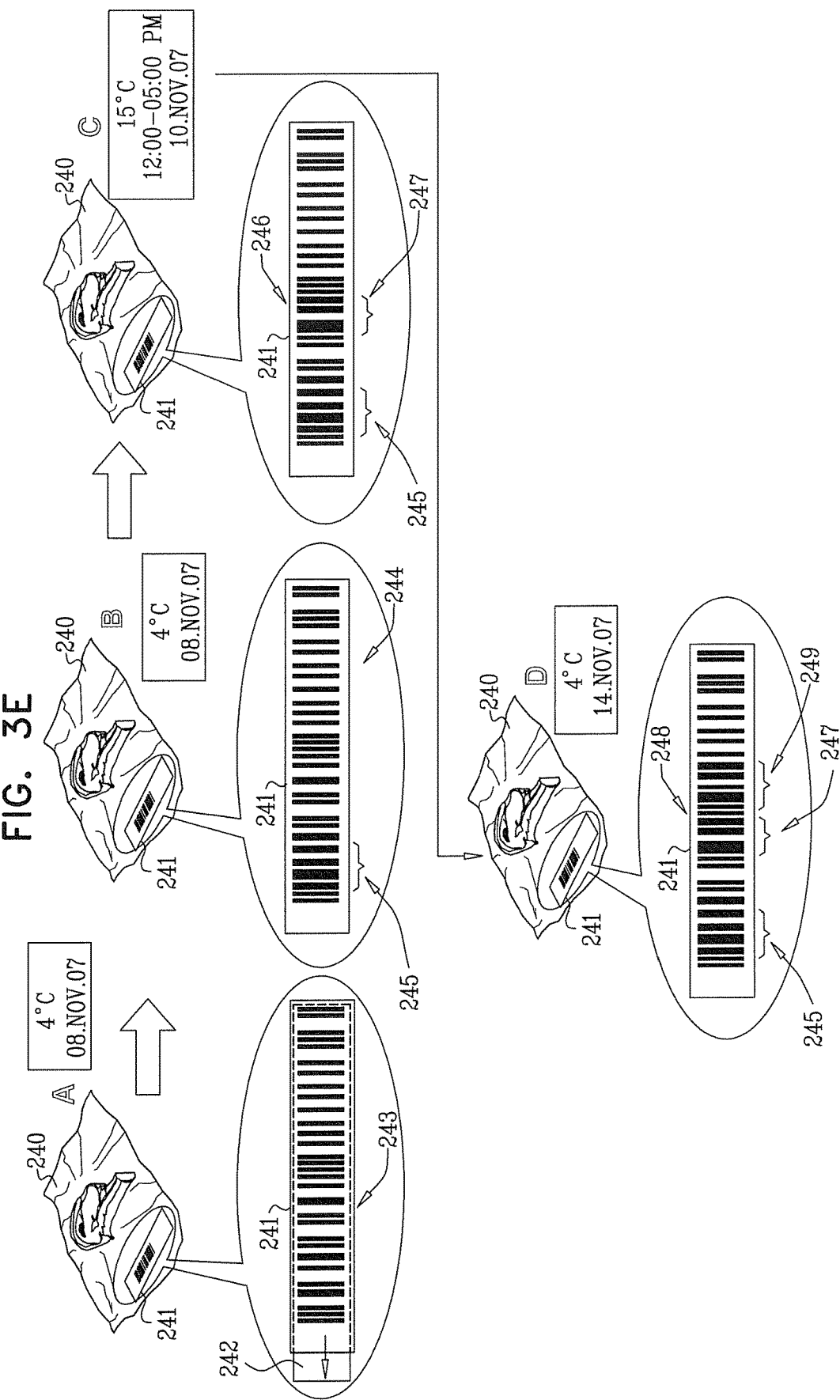

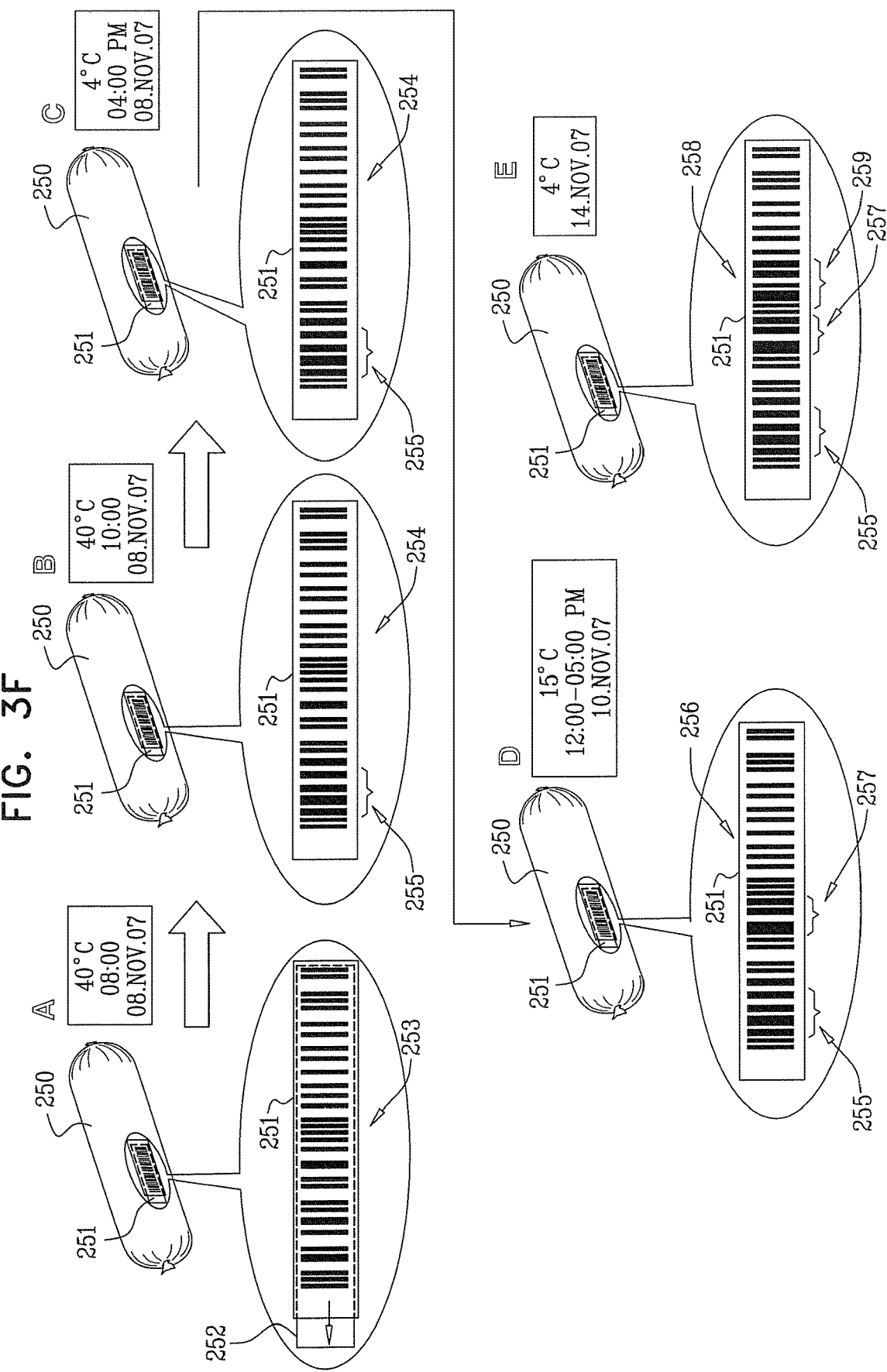

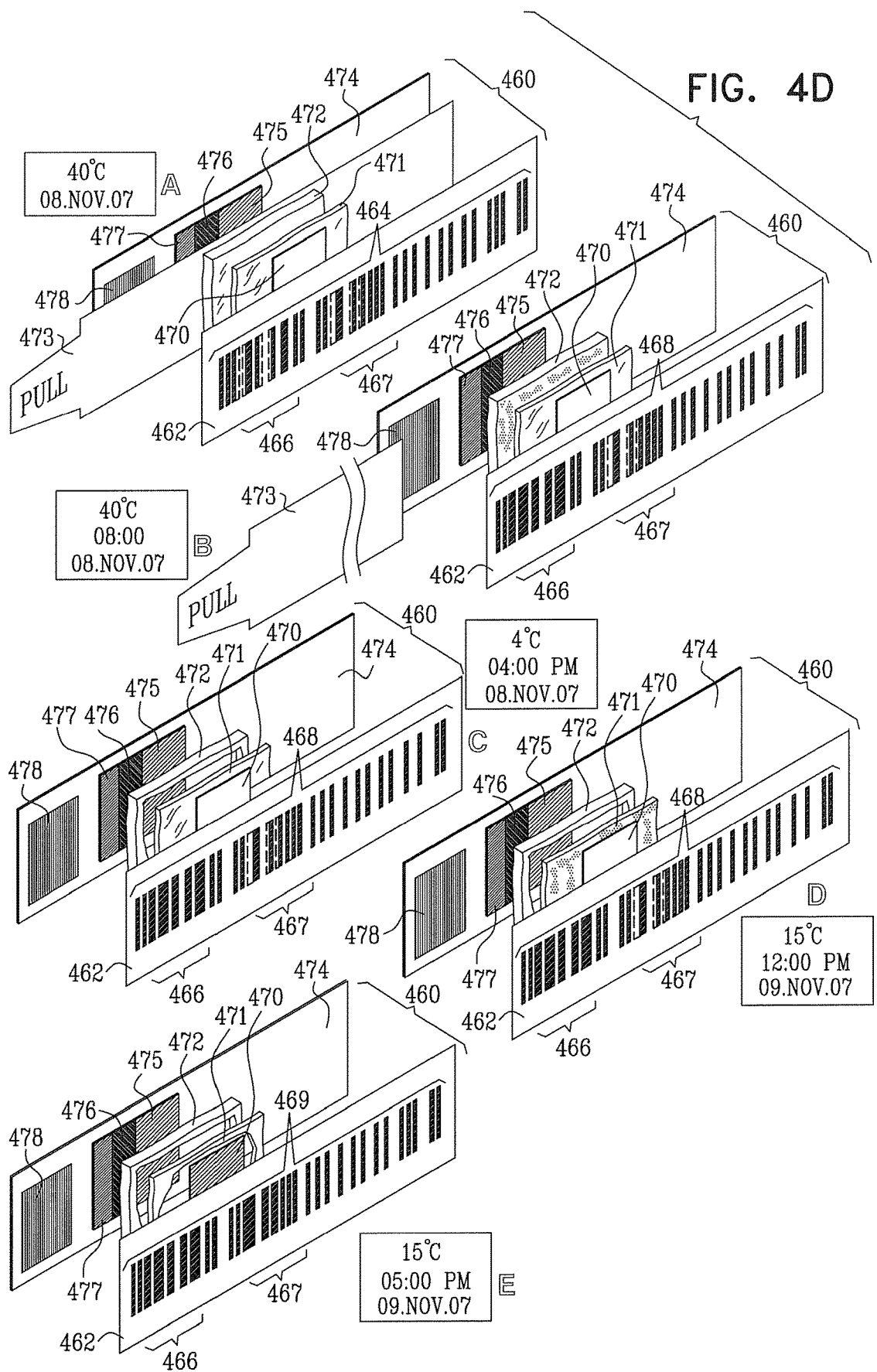

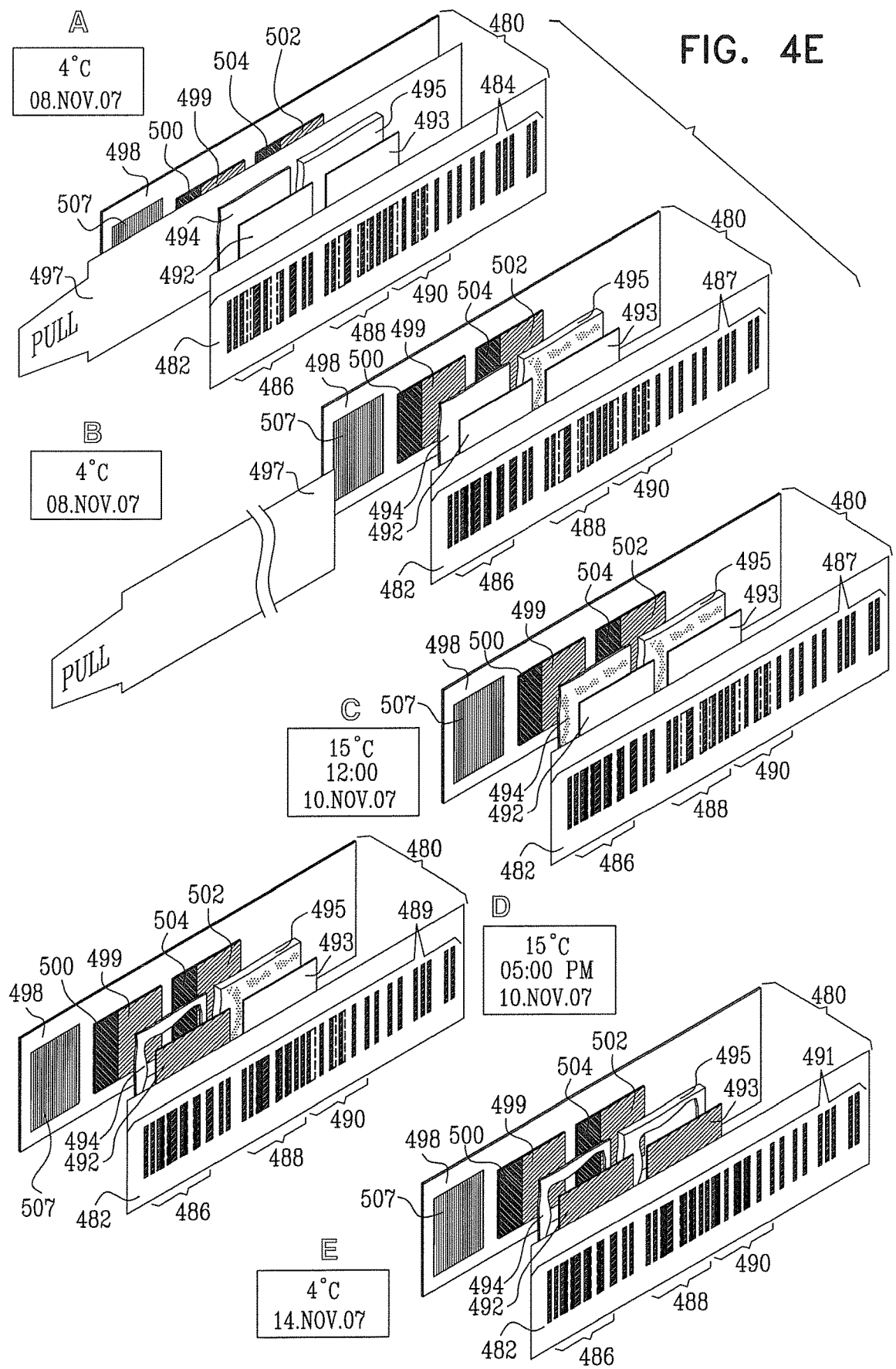

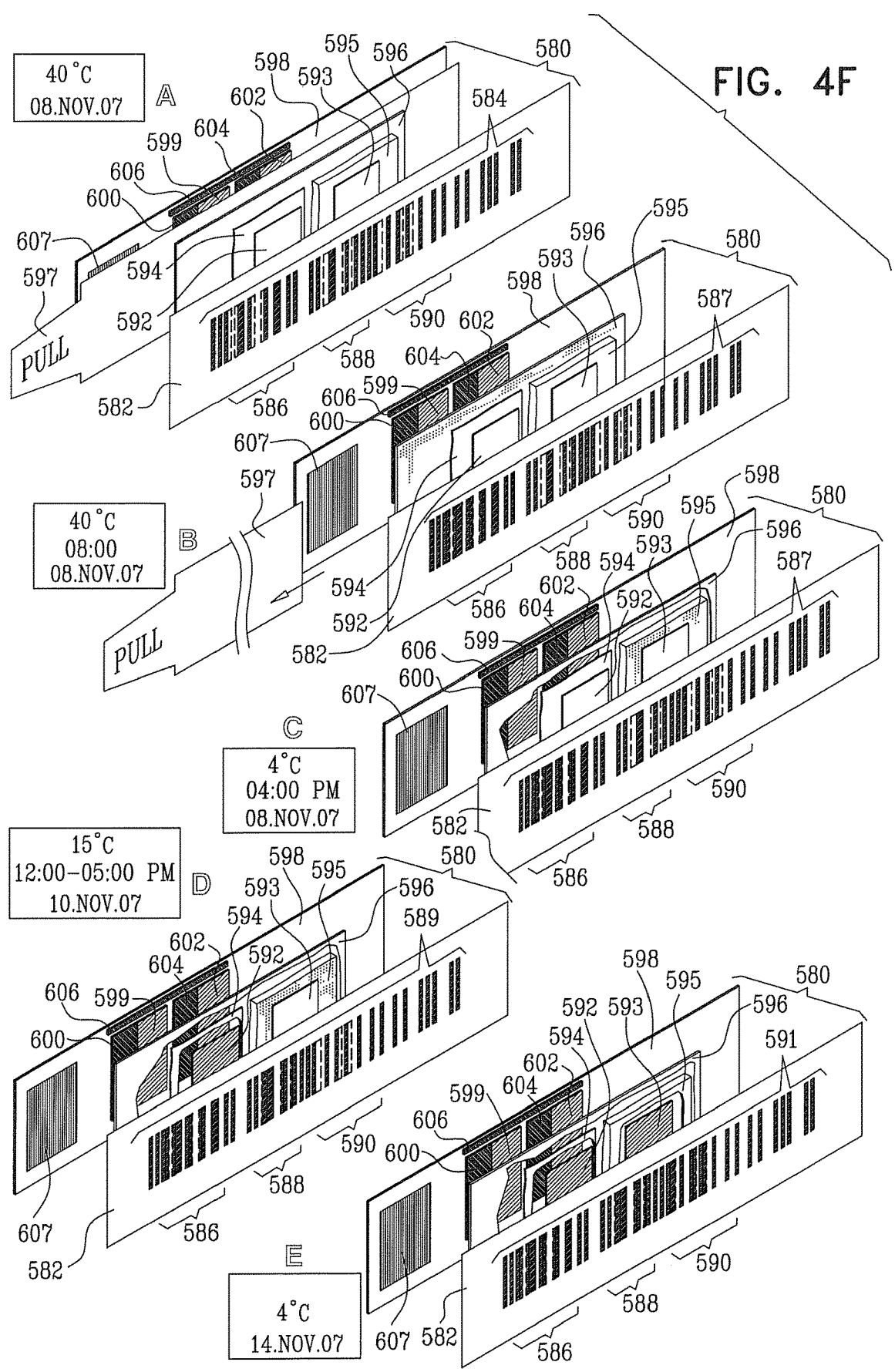

SYSTEM AND METHOD FOR QUALITY MANAGEMENT UTILIZING BARCODE INDICATORS

REFERENCE TO RELATED APPLICATIONS

The present application is a continuation application of U.S. patent application Ser. No. 16/201,334, filed Nov. 27, 2018, entitled "System and Method for Quality Management Utilizing Barcode Indicators", now U.S. Pat. No. 10,504,060, which is a continuation application of U.S. patent application Ser. No. 15/184,483, filed Jun. 16, 2016, entitled "System and Method for Quality Management Utilizing Barcode Indicators", now U.S. Pat. No. 10,176,451, which is a continuation application of U.S. patent application Ser. No. 14/595,412, filed Jan. 13, 2015, entitled "System and Method for Quality Management Utilizing Barcode Indicators", now U.S. Pat. No. 9,373,100, which is a continuation application of U.S. patent application Ser. No. 14/017,545, filed Sep. 4, 2013, entitled "System and Method for Quality Management Utilizing Barcode Indicators", now U.S. Pat. No. 8,950,664, which is a continuation application of U.S. patent application Ser. No. 12/598,979, entitled "System and Method for Quality Management Utilizing Barcode Indicators", now U.S. Pat. No. 8,528,808, which is a National Phase Application of International Patent Application No. PCT/IL2007/001411, filed Nov. 14, 2007, entitled "A System and Method for Quality Management Utilizing Barcode Indicators", which is a continuation-in-part of International Patent Application No. PCT/IL2007/000547, filed May 6, 2007 and entitled "A System and Method for Improved Quality Management in a Product Logistic Chain", and claims priority of U.S. Provisional Patent Application Ser. No. 60/959,120, filed Jul. 10, 2007 and entitled "Encoding Method for Dynamically Changing a Barcode" and to U.S. Provisional Patent Application Ser. No. 60/963,956, filed Aug. 6, 2007 and entitled "A System and Method for Verifying Product Quality", the disclosures of which are hereby incorporated by reference.

FIELD OF THE INVENTION

The present invention relates to quality management systems and methodologies and to indicators useful in such systems and methodologies.

BACKGROUND OF THE INVENTION

The following U.S. Patents relate generally to the subject matter of the present application: U.S. Pat. Nos. 6,758,397; 6,009,400, 6,685,094 and RE 39,226.

SUMMARY OF THE INVENTION

The present invention seeks to provide improved quality management systems and methodologies as well as indicators useful in such systems and methodologies.

There is thus provided in accordance with a preferred embodiment of the present invention a quality management system for products including a multiplicity of barcode indicators, each operative to provide a machine-readable indication of exceedance of at least one threshold by at least one product quality determining parameter, the at least one threshold being at least one of a time duration threshold and a combined temperature and time threshold, a barcode indicator reader operative to read the barcode indicators and to provide output indications and an indication interpreter operative to receive the output indications and to provide human sensible, product unit specific, product quality status outputs.

Preferably, the multiplicity of barcode indicators is operative to provide the machine-readable indication only following actuation thereof. Additionally or alternatively, the multiplicity of barcode indicators is operative to provide the machine-readable indication only upon activation thereof winch occurs automatically a predetermined time following actuation thereof.

Preferably, the indication interpreter includes a server communicating with the barcode indicator reader and providing at least one of a price indication, a shelf-life indication and a salability output indication.

Preferably, the multiplicity of barcode indicators each provides a first machine-readable indication prior to the exceedance of the at least one threshold and a second machine-readable indication, different from the first machine-readable indication, following the exceedance of the at least one threshold, the first and second machine-readable indications having identical check sum digits.

Preferably, each of the multiplicity of barcode indicators includes a barcode including black areas and transparent areas, at least one delay layer dissolvable by a temperature-responsive solvent, the at least one delay layer being suitable to prevent the passage of coloring agents therethrough before dissolution thereof, at least one colorable element and at least one coloring agent adapted to pass through the at least one delay layer, alter the at least one delay layer is dissolved by the temperature-responsive solvent, and to diffuse through the colorable element and the barcode provides an indication of exceedance of temperature relative to the combined temperature and time threshold by dissolution of the delay layer by the temperature-responsive solvent. Additionally, the time duration threshold is determined at least partially by the thickness of the delay layer. Additionally or alternatively, dissolution of the delay layer results in diffusion of the coloring agents through the colorable element such that portions of the colorable element which are readable through the transparent areas in the barcode appear similarly to the barcode in the first machine-readable indication and can be read together therewith as a single barcode in the second machine-readable indication.

Preferably, each of the multiplicity of barcode indicators is operative to provide multiple machine-readable indications for exceedance of multiple ones of the thresholds.

There is also provided in accordance with another preferred embodiment of the present invention a quality management system for products including a multiplicity of barcode indicators each operative to provide a machine readable indication of exceedance of at least one threshold by at least one product quality determining parameter, the multiplicity of barcode indicators being operative to provide the machine-readable indication only following actuation thereof, a barcode indicator reader operative to read the barcode indicators and to provide output indications and an indication interpreter operative to receive the output indications and to provide human sensible, product unit specific, product quality status outputs.

Preferably, prior to the actuation the barcode indicator is in a first visible state and following the actuation the barcode indicator is in a second visible state, different from the first visible state, and the indicator is barcode reader-readable at least in the second visible state. Additionally, the indicator is not barcode reader-readable when the barcode indicator is in the first visible state. Alternatively, the indicator is barcode reader-readable when the barcode indicator is in the first visible state.

Preferably, each of the multiplicity of barcode indicators includes a barcode including black areas and transparent areas, a pull strip, the pull strip being suitable to prevent the passage of solvents and coloring agents therethrough before removal thereof and a colored area, the colored area disposed behind die pull strip and the actuation includes removal of the pull strip. Additionally, the pull strip includes a polyester pull strip, preferably, removal of the pull strip renders portions of the colored area readable through the transparent areas in die barcode and portions of the colored area appear similarly to the barcode in the first visible state and can be read together therewith as a single barcode in the second visible state.

Preferably, the multiplicity of barcode indicators is operative to provide the machine-readable indication only upon activation thereof which occurs automatically a predetermined lime following actuation thereof. Additionally, each of the multiplicity of barcode indicators provides a first machine-readable indication prior to the exceedance of the at least one threshold and a second machine-readable indication following the exceedance of the at least one threshold, the first and second machine-readable indications having identical check sum digits.

Preferably, the indication interpreter includes a server communicating with the barcode indicator reader and providing at least one of a price indication, a shelf-life indication and a salability output indication.

Preferably, each of the multiplicity of barcode indicators is operative to provide multiple machine-readable indications for exceedance of multiple ones of the thresholds.

There is further provided in accordance with yet another preferred embodiment of the present invention a quality management system for products including a multiplicity of barcode indicators each operative to provide a machine-readable indication of exceedance of at least one threshold by at least one product quality determining parameter, the multiplicity of barcode indicators being operative to provide the machine-readable indication only upon activation thereof which occurs automatically a predetermined lime following actuation thereof, a barcode indicator reader operative to read the barcode indicators and to provide output indications and an indication interpreter operative to receive the output indications and to provide human sensible, product unit specific, product quality status outputs.

Preferably, prior to the actuation the barcode indicator is in a first visible state and following the actuation the barcode indicator is in a second visible state, which is different from the first visible state and the indicator is barcode reader-readable at least in the second visible state. Additionally, the indicator is not barcode reader-readable when the barcode indicator is in the first visible state. Alternatively, the indicator is barcode reader-readable when the barcode indicator is in the first visible state.

Preferably, the machine-readable indication includes a variable barcode having a first readable state including digital indicia and at least start and stop code indicia and at least a second readable state wherein at least one of the start and stop code indicia which appear in the first readable state form part of the digital indicia in the second readable state.

Preferably, each of the multiplicity of barcode indicators includes a barcode including black areas and transparent areas, a pull strip, the pull strip being suitable to prevent the passage of solvents and coloring agents therethrough before removal thereof, a colored area disposed behind the pull strip, and an activation delay layer dissolvable by a solvent, the activation delay layer being suitable to prevent the passage of coloring agents and solvents therethrough before dissolution thereof and the actuation includes removal of the pull strap. Additionally, the pull strip includes a polyester pull strip. Additionally or alternatively, the activation is achieved by the dissolution of the activation delay layer by the solvent, and the predetermined time is determined at least partially by the thickness of the activation delay layer. Additionally, the solvent is temperature responsive.

Preferably, the multiplicity of barcode indicators each provides a first machine-readable indication prior to the exceedance of the at least one threshold and a second different machine-readable indication following exceedance of the at least one threshold, the first and second machine-readable indications having identical check sum digits.

Preferably, the indication interpreter includes a server communicating with the barcode indicator reader and providing at least one of a price indication, a shelf-life indication and a salability output indication.

Preferably, each of the multiplicity of barcode indicators is operative to provide multiple machine-readable indications for exceedance of multiple ones of the thresholds.

There is also provided in accordance with an additional preferred embodiment of the present invention a quality management system for products including a multiplicity of barcode indicators each operative to provide a machine-readable indication of exceedance of at least one threshold by at least one product quality determining parameter, the multiplicity of barcode indicators each providing a first machine-readable indication prior to the exceedance of the at least one threshold and a second machine-readable indication following exceedance of the at least one threshold, the first and second machine-readable indications having identical check sum digits, a barcode indicator reader operative to read the barcode indicators and to provide output indications and an indication interpreter operative to receive the output indications and to provide human sensible, product unit specific, product quality status outputs.

Preferably, the first and the second machine-readable indications differ by two digits thereof, and MOD 10 of the weighted sum of the two digits of the first machine-readable indication is the same as MOD 10 of the weighted sum of the two digits of the second machine-readable indication, the weighted sum is calculated according to the EAN (European Article Number) checksum system.

Additionally, the indication interpreter includes a server communicating with the barcode indicator reader and providing at least one of a price indication, a shelf-life indication and a salability output indication.

Preferably, each of the multiplicity of barcode indicators is operative to provide multiple machine readable indications for exceedance of multiple ones of the thresholds.

There is additionally provided in accordance with yet another preferred embodiment of the present invention a quality management system for products including a multiplicity of barcode indicators each operative to provide a machine-readable indication of exceedance of at least one time duration threshold, a barcode indicator reader operative to read the barcode indicators and to provide output indications and an indication interpreter operative to receive the output indications and to provide human sensible, product unit specific, product quality status outputs.

Preferably, each of the multiplicity of barcode indicators includes a barcode including black areas and transparent areas, at least one delay layer dissolvable by a solvent, the at least one delay layer being suitable to prevent the passage of coloring agents therethrough before dissolution thereof, at least one colorable element, and at least one coloring agent adapted to pass through the at least one delay layer once dissolved by the solvent and to diffuse through the colorable element and the multiplicity of barcode indicators provides an indication of exceedance of the at least one time duration threshold by dissolution of the at least one delay layer by the solvent.

Preferably, the multiplicity of barcode indicators each provides a first machine-readable indication prior to the exceedance of the at least one time duration threshold and a second machine-readable indication, different from the first machine-readable indication, following exceedance of the at least one time duration threshold, and dissolution of the delay layer results in diffusion of the coloring agents through the colorable element such that portions of the colorable element which are readable through the transparent areas in the barcode appear similarly to the barcode in the first machine-readable indication, and can be read together therewith as a single barcode in the second machine-readable indication. Additionally, the time duration threshold is determined at least partially by the thickness of the delay layer. Additionally or alternatively, the solvent is temperature responsive.

Preferably, the multiplicity of indicators is operative to provide a machine-readable indication of exceedance of two different time duration thresholds.

There is further provided in accordance with another preferred embodiment of the present invention a quality management system for products including a multiplicity of barcode indicators each operative to provide a machine-readable indication of exceedance of at least one threshold by at least one product quality determining parameter, a barcode indicator reader operative to read the barcode indicators and to provide output indications and an indication interpreter operative to receive the output indications and to provide human sensible, product unit specific, product quality status outputs, the indication interpreter includes a server communicating with the barcode indicator reader and providing at least one of a price indication, a shelf-life indication and a salability output indication.

There is also provided in accordance with yet another preferred embodiment of the present invention a quality management system for products including a multiplicity of barcode indicators each operative to provide a machine-readable indication of exceedance of at least one threshold by at least one product quality determining parameter, a telephone including image capture functionality operative to image the barcode indicators and to provide output indications, and an indication interpreter operative to receive the output indications and to provide human sensible, product unit specific, product quality status outputs, the indication interpreter includes a server communicating with the telephone and providing at least one of a price indication, a shelf-life indication, and a quality output indication to the telephone.

Preferably, the server includes callerID functionality and is responsive to the identity of the caller to select a suitable at least one output indication to be provided.

There is also provided in accordance with a different preferred embodiment of the present invention a barcode indicator operative to provide a machine-readable indication of exceedance of at least one threshold by at least one product quality determining parameter, the at least one threshold being at least one of a time duration threshold and a combined temperature and time threshold.

Preferably, the barcode indicator includes a barcode including black areas and transparent areas, at least one delay layer dissolvable by a temperature-responsive solvent, the at least one delay layer being suitable to prevent the passage of coloring agents therethrough before dissolution thereof, at least one colorable element, and at least one coloring agent adapted to pass through the delay layer once dissolved by the temperature-responsive solvent and to diffuse through the colorable element, and the barcode indicator provides an indication of exceedance of temperature relative to the combined temperature and time threshold by dissolution of the at least one delay layer by the temperature-responsive solvent. Additionally, the time duration threshold is determined at least by the thickness of the at least one delay layer. Additionally, or alternatively, the barcode includes a fixed barcode portion and at least one selectably appearing barcode portion, both the fixed barcode portion and tire at least one selectably appearing barcode portion being readable by a barcode reader.

There is also provided in accordance with another preferred embodiment of the present invention a barcode indicator operative to provide a machine-readable indication of exceedance of at least one threshold by at least one product quality determining parameter, the barcode indicator being operative to provide the machine-readable indication only following actuation thereof.

Preferably, prior to the actuation the barcode indicator is in a first visible state and following the actuation the barcode indicator is in a second visible state, which is different from the first visible state and the indicator is barcode reader-readable at least in the second visible state. Additionally, the indicator is not barcode reader-readable when the barcode indicator is in the first visible state. Alternatively, the indicator is barcode reader-readable when the barcode indicator is in the first visible state.

Preferably, the barcode indicator includes a barcode including black areas and transparent areas, a pull strip, the pull strip being suitable to prevent the passage of solvents and coloring agents therethrough before removal thereof, and a colored area disposed behind the pull strip, and the actuation includes removal of the pull strip.

There is further provided in accordance with yet another preferred embodiment of the present invention a barcode indicator operative to provide a machine-readable indication of exceedance of at least one threshold by at least one product quality determining parameter, the barcode indicator being operative to provide the machine-readable indication only upon activation thereof which occurs automatically a predetermined time following actuation thereof.

Preferably, prior to the actuation the barcode indicator is in a first visible state and following the actuation the barcode indicator is in a second visible state, which is different from the first visible state and the indicator is barcode reader-readable at least in the second visible stale. Additionally, the indicator is not barcode reader-readable when the barcode indicator is in the first visible state. Alternatively, the indicator is barcode reader-readable when the barcode indicator is in the first visible suite.

Preferably, the machine-readable indication includes a variable barcode having a first readable state including digital indicia and at least start and stop code indicia and at least a second readable state wherein at least one of the start and stop code indicia which appear in the first readable state form part of the digital indicia in the second readable state.

Preferably, the barcode indicator includes a barcode including black areas and transparent areas, a pull strip, the pull strip being suitable to prevent the passage of solvents and coloring agents therethrough before removal thereof, a colored area disposed behind the pull strip, and an activation delay layer dissolvable by a solvent, the activation delay layer being suitable to prevent the passage of coloring agents and solvents therethrough before dissolution thereof and the actuation includes removal of the pull strip. Additionally, the activation is achieved by the dissolution of the activation delay layer by the solvent. Additionally or alternatively, the predetermined rime is determined at least by the thickness of the activation delay layer.

There is still further provided in accordance with yet another preferred embodiment of the present invention a barcode indicator operative to provide a machine-readable indication of exceedance of at least one threshold by at least one product quality determining parameter, the barcode indicator providing a first machine-readable indication prior to the exceedance of the at least one threshold and a second machine-readable indication following exceedance of the at least one threshold, the first and second machine-readable indications having identical check sum digits.

Preferably, the first and the second machine-readable indications differ by two digits thereof, and MOD 10 of the weighted sum of the two digits of the first machine-readable indication is the same as MOD 10 of the weighted sum of the two digits of the second machine-readable indication, the weighted sum is calculated according to the EAN (European Article Number) checksum system.

There is also provided in accordance with a different preferred embodiment of the present invention a barcode indicator operative to provide a machine-readable indication of exceedance of at least one time duration threshold.

Preferably, the barcode indicator includes a barcode including black areas and transparent areas, and at least one delay layer dissolvable by a solvent, the at least one delay layer being suitable to prevent the passage of coloring agents therethrough before dissolution thereof and the exceedance of the at least one time duration threshold is indicated by the dissolution of the at least one delay layer by the solvent. Additionally, the time duration threshold is determined at least partially by the thickness of the delay layer.

There is also provided in accordance with another preferred embodiment of the present invention a method for quality management for products including employing a multiplicity of barcode indicators each operative to provide a machine-readable indication of exceedance of at least one threshold by at least one product quality determining parameter, the at least one threshold being at least one of a time duration threshold and a combined temperature and time threshold, reading the barcode indicators and providing output indications therefrom, receiving the output indications and interpreting the output indications to provide human sensible, product unit specific, product quality status outputs.

There is also provided in accordance with another preferred embodiment of the present invention a method for quality management for products including employing a multiplicity of barcode indicators each operative to provide a machine-readable indication of exceedance of at least one threshold by at least one product quality determining parameter, the multiplicity of barcode indicators being operative to provide the machine-readable indication only following actuation thereof, reading the barcode indicators and providing output indications therefrom, receiving the output indications and interpreting the output indications to provide human sensible, product unit specific, product quality status outputs.

There is also provided in accordance with another preferred embodiment of the present invention a method for quality management for products including employing a multiplicity of barcode indicators each operative to provide a machine-readable indication of exceedance of at least one threshold by at least one product quality determining parameter, the multiplicity of barcode indicators being operative to provide the machine-readable indication only upon activation thereof which occurs automatically a predetermined time following actuation thereof, reading the barcode indicators and providing output indications therefrom, receiving the output indications and interpreting the output indications to provide human sensible, product unit specific, product quality status outputs.

There is also provided in accordance with another preferred embodiment of the present invention a method for quality management for products including employing a multiplicity of barcode indicators each operative to provide a machine-readable indication of exceedance of at least one threshold by at least one product quality determining parameter, each the multiplicity of barcode indicators provides a first machine-readable indication prior to the exceedance of the at least one threshold and a second machine-readable indication following the exceedance of the at least one threshold, the first and second machine-readable indications having identical check sum digits, reading the barcode indicators and providing output indications therefrom, receiving the output indications and interpreting the output indications to provide human sensible, product unit specific, product quality status outputs.

There is also provided in accordance with another preferred embodiment of the present invention a method for quality-management for products including employing a multiplicity of barcode indicators each operative to provide a machine-readable indication of exceedance of at least one time duration threshold, reading the barcode indicators and providing output indications therefrom, receiving the output indications and interpreting the output indications to provide human sensible, product unit specific, product quality status outputs.

There is also provided in accordance with another preferred embodiment of the present invention a method for quality management for products including employing a multiplicity of barcode indicators each operative to provide a machine-readable indication of exceedance of at least one threshold by at least one product qualify determining parameter, reading the barcode indicators and providing output indications therefrom, receiving the output indications, and interpreting the output indications to provide human sensible, product unit specific, product quality status outputs, the interpreting includes communicating the barcode indicators to a server and providing at least one of a price indication, a shelf-life indication and a salability output indication.

There is also provided in accordance with another preferred embodiment of the present invention a method for quality management for products including employing a multiplicity of barcode indicators each operative to provide a machine-readable indication of exceedance of at least one threshold by at least one product quality determining parameter, imaging the barcode indicators using a telephone including image capture functionality, and providing output indications, and interpreting the output indications to provide human sensible, product unit specific, product quality status outputs, the interpreting includes communicating the barcode indicators from the telephone to a server and providing at least one of a price indication, a shelf-life indication and a salability output indication to the telephone from the server.

BRIEF DESCRIPTION OF THE DRAWINGS

The present invention will be understood and appreciated more fully from the following detailed description, taken in conjunction with the drawings in which:

FIGS. 1A, 1B, 1C, 1D and 1E together are a simplified illustration of a system and methodology for quality management constructed and operative in accordance with a preferred embodiment of the present invention;

FIGS. 2A, 2B, 2C, 2D and 2E together are a simplified illustration of a system and methodology for quality management constructed and operative in accordance with another preferred embodiment of the present invention;

FIG. 3B is a simplified illustration of a quality indicator constructed and operative in accordance with another preferred embodiment of the present invention for indicating temperature history with delayed activation;

FIG. 3D is a simplified illustration of a quality indicator constructed and operative in accordance with another preferred embodiment of the present invention for indicating elapsed time/temperature history with delayed activation;

FIG. 3E is a simplified illustration of a quality indicator constructed and operative in accordance with yet another preferred embodiment of the present invention for separately indicating elapsed time and temperature history;

FIG. 3F is a simplified illustration of a quality indicator constructed and operative in accordance with yet another preferred embodiment of the present invention for separately indicating elapsed time and temperature history with delayed activation;

FIG. 4D is a simplified illustration of the structure and operation of an example of the indicator of FIG. 3D, in accordance with a preferred embodiment of the present invention;

FIG. 4C is a simplified illustration of the structure and operation of an example of the indicator of FIG. 3E, in accordance with a preferred embodiment of the present invention;

FIG. 4F is a simplified illustration of the structure and operation of an example of the indicator of FIG. 3F, in accordance with a preferred embodiment of the present invention;

DETAILED DESCRIPTION OF PREFERRED EMBODIMENTS

Figure 1A:
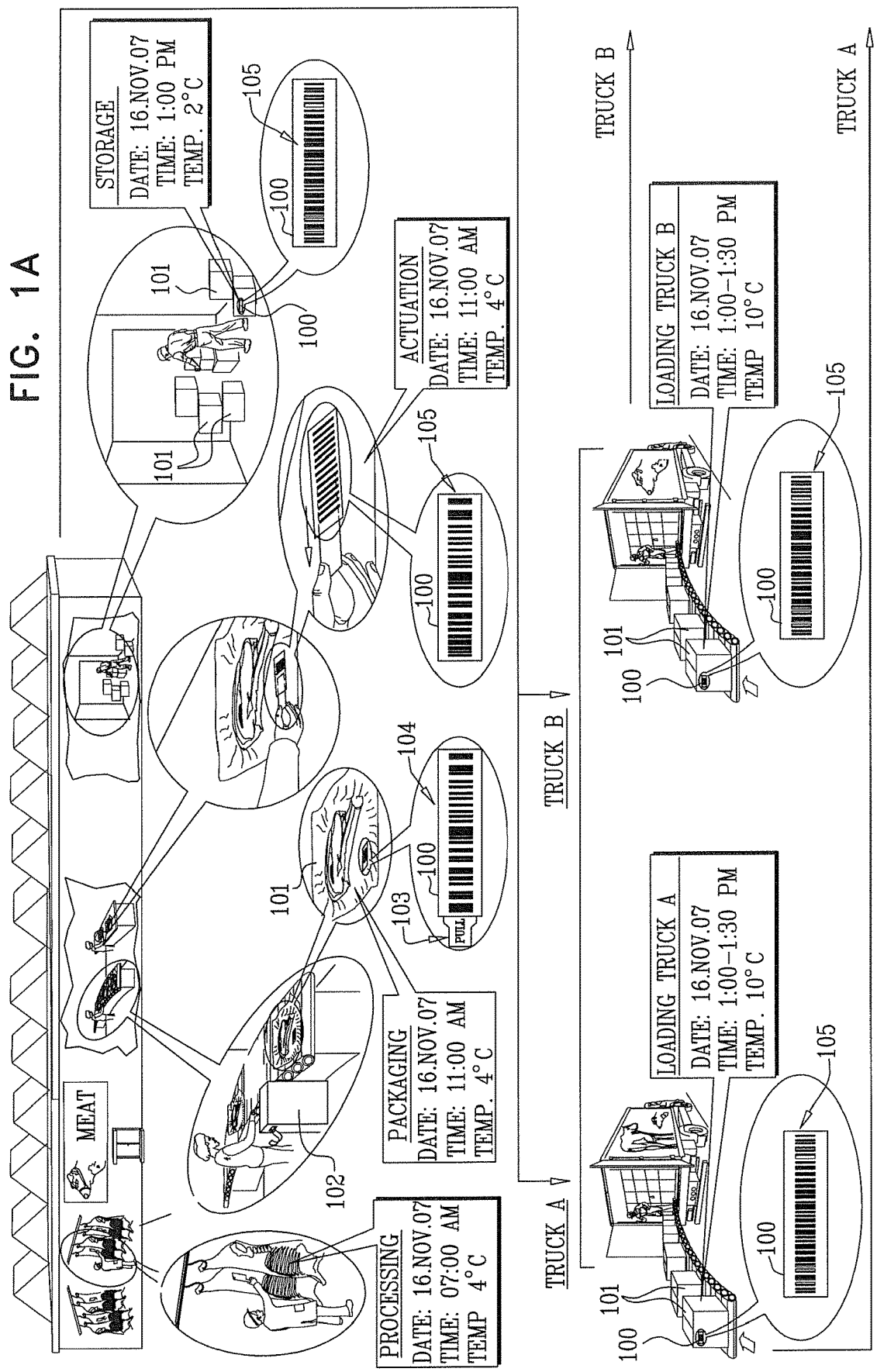

Reference is now made to FIGS. 1A, 1B, 1C, 1D and 1E, which together are a simplified illustration of a system and methodology for quality management constructed and operative in accordance with a preferred embodiment of the present invention. As seen in FIGS. 1A-1E, there is shown a quality management system and methodology for products including a multiplicity of product unit specific indicators, here shown in the form of changeable barcode indicators, each operative to provide a machine-readable, preferably barcode-reader-readable, indication of exceedance of at least one threshold by at least one product quality determining parameter, at least one indicator reader operative to read the product unit specific indicators and to provide output indications and a product type specific indication interpreter operative to receive the output indications and to provide human sensible, product unit specific, product quality status outputs.

The changeable barcode indicator may incorporate a product code such as an EAN (European Article Number) or a UPC code (Universal Product Code). FIGS. 1A-1E illustrate the use of an EAN code.

Preferably, the product unit specific indicator is operative to provide a machine-readable indication of exceedance of at least one threshold by at least one product quality determining parameter. In a preferred embodiment the indicator provides a variable barcode having a fixed barcode portion and at least one selectably appearing barcode portion, both the fixed barcode portion and the combination of the fixed barcode portion and at least one selectably appearing barcode portion having barcode check sum integrity when read by a conventional barcode reader. Accordingly, it is appreciated that the selectably appearing barcode portion includes at least two digits which are different from those in the fixed barcode portion. The check sum is not necessarily changed. The check sum digit may be part of the fixed barcode portion or of the selectably appearing barcode portion.

It is appreciated that in order to maintain checksum integrity under an EAN/UPC checksum system a barcode can be changed into another barcode by replacing at least two digits thereof, one of which may be the checksum digit. Each pair of digits can be replaced by another pair of digits where MOD 10 of the weighted sum of both pairs is the same. For example, two adjacent digits, A1 in an odd position and A2 in an even position, may be replaced by two digits B1 and B2 such that MOD 10(3*A1*A2)=MOD 10(3*B1+B2). A digit can be replaced by another digit only by printing additional bar widths. For example, the digit 3 in right hand encoding may only be replaced by 0, 1 or 5.

Additionally or alternatively, the indicator provides a variable barcode having a visible pre-actuation state, a different visible post-actuation state and at least one visible state indicating exceedance of a corresponding one of at least one threshold. The various states are preferably all machine-readable by a conventional barcode reader. However one or more of the states may not be machine-readable by the conventional barcode reader and the fact that they cannot be read provides status information. For example, various situations in which a product is not to be sold or used may be indicated as non-readable states of the indicator.

Turning now to FIGS. 1A-1E, the present invention is illustrated in the context of a typical application, here a meat processing plant. A product unit specific indicator 100 is attached to or otherwise incorporated into each package 101 of processed meat. A package bearing a product unit specific indicator 100 may be an individual package suitable for retail sale and/or a carton containing a plurality of such individual packages, in the illustrated embodiment, packages 101 include both alternatives.

It is also a possibility that different types of indicators 100 may be employed for different types of packages. For example, the indicator used on a carton containing a plurality of individual packages may be more or less accurate or have a greater or lesser dynamic range of indications than the indictor used on an individual package. For example, the indicator on a carton may include an indicator capable of indicating exceedance of additional thresholds, not included on the indicators of individual packages contained therein, or fewer thresholds than the indicators of individual packages contained therein.

In accordance with a preferred embodiment of the present invention, the indicators 100 may be assembled and/or actuated at the same location or at a location adjacent that at which the indicators 100 are associated with packages 101. A suitable indicator assembler is indicated by reference numeral 102. It is appreciated that assembly 102 may be associated with an automatic actuator.

In the illustrated embodiment, the indicator includes an EAN (European Article Number) barcode. The indicator 100 is typically constructed to be actuatable by pulling a pull strip 103 forming part thereof. Accordingly, the indicator 100 has a visible pre-actuation state indicated by reference numeral 104, a different visible post-actuation state indicated by reference numeral 105 and at least one visible state indicating exceedance of a corresponding one of at least one threshold.

It is seen that so long as the temperature of the package 101 does not exceed 4 degrees Celsius and five days have not elapsed since manufacture or other actuation of the indicator, the indicator 100 remains in readable state 105. At any stage, such as upon delivery to the customer, the indicator 100 can be read with a conventional barcode reader 106, which preferably communicates with a remote quality indication server 108 and provides an immediate indication of a quality parameter, such as an OK indication 110, to an inspector.

If and when the temperature of the package 101 exceeds 4 degrees Celsius for at least a predetermined duration, typically four hours, such as when it reaches 15 degrees Celsius for 6 hours in the case of a transport vehicle breakdown, the indicator assumes a further readable state, indicated by reference numeral 112. Thus, as seen in FIG. 1A, if during truck loading, the temperature reaches 10 degrees Celsius for 30 minutes, i.e. less than the predetermined duration, the indicator does not assume the further readable state. It is appreciated that the predetermined duration may be as long or short as necessary for a given application. This further readable state does not revert to readable state 105 notwithstanding that the temperature of the package 101 subsequently returns to an acceptable temperature, such as 4 degrees Celsius.

Accordingly, upon inspection, as upon delivery to the customer, upon reading the indicator 100 by an inspector using a conventional barcode reader 106, the barcode in its readable state 112 preferably provides information to the quality indication server 108 which enables the server to provide an immediate indication of a quality parameter, such as a BAD indication 114. This BAD indication 114 indicates that at some time in the history of the indicator 100, the package 101 to which it was attached was at a temperature exceeding 4 degrees Celsius and that this event has rendered the specific product in package 101 unacceptable for sale.

Should the indicator 100 be in visible state 104, indicating that proper actuation of the indicator 100 did not occur, a BAD indication 114 may be provided to an inspector or other interested party.

It is appreciated that whereas machine reading of the indicator 100 provides an indication of whether or not a given event has occurred, the indication of a quality parameter by quality indication server 108 provides an indication of whether and to what extent that event has affected the quality of a given product with which the indicator 100 is associated. It is appreciated that there may be a great variation in the effect of a given event depending on the type of product. Thus, for example, exposure to 15 degrees Celsius may cause fresh meat to be rendered unfit for sale but may not appreciably affect the quality or saleability of oranges.

Turning now specifically to FIGS. 1C and 1D, it is seen that indicator 100 may additionally and independently serve to indicate elapsed time. Thus, upon exceedance of the predetermined time period following manufacture or other actuation of the indicator 100, the indicator 100 assumes yet a further readable state 118 which indicates that a predetermined amount of time has elapsed. Upon elapse of a further predetermined amount of time, typically a second week, the indicator 100 may assume a still further readable state 120.

Accordingly, upon inspection, as indicated by reference numeral 122, as upon periodic stock inspection at a retail site, upon reading the indicator 100 by an inspector using a conventional barcode reader 106, the barcode in its readable state 118 provides information to the quality indication server 108 which enables the server to provide an immediate indication of a quality parameter, such as a SELL SOON indication 124. This SELL SOON indication 124 indicates that, since the predetermined time interval has elapsed, the package 101 to which it was attached should be positioned and/or priced for immediate sale.

Turning now to FIG. 1D, it is seen that upon further inspection, as indicated by reference numeral 132, as upon periodic stock inspection at the retail site, upon reading the indicator 100 by an inspector using a conventional barcode reader 106, the barcode in its readable state 120 provides information to the quality indication server 108 which enables the server to provide art immediate indication of a quality parameter, such as an EXPIRED indication 134. This EXPIRED indication 134 indicates that the package 101 to which it was attached should be discarded, since the further predetermined time period has elapsed.

Additionally or alternatively, a user, employing an imager-equipped telephone or other suitable mobile communicator 135 may image the indicator 100 and communicate the image information to a suitably programmed quality indication server 136, which may be identical to server 108, and which is capable of reading the barcode from the image information and providing to the user, via SMS or any other suitable communication methodology, an immediate indication of a quality parameter, such as an GOOD QUALITY indication 137. This quality parameter indicates that the product is safe for use.

It is appreciated that server 136 may provide reports to various interested entities, such as the manufacturer or distributor of the products, health authorities and other governmental or private entities, to enable real-time monitoring of the quality of products offered for sale. Server 136 may have caller ID functionality so as to be able to identify the caller, classify the caller, for example as a customer, a manufacturer's QA inspector and a health inspector, and provide an appropriate quality indication output. Additionally or alternatively, the quality indication server 136 may send messages to supermarket management regarding remedial steps to be taken, such as refrigeration maintenance or repair instructions.

Additionally or alternatively, the further inspection may take place automatically at the checkout, where the indicator 100 is read by a checkout scanner 138. In such a case, the barcode in its readable state 120 provides information to the quality indication server 108 which enables the server to provide an immediate indication of a quality parameter, such as a DO NOT SELL indication 140, to the checkout clerk. This DO NOT SELL indication 140 indicates that the package 101 to which it was attached may not be sold since the further predetermined time period has elapsed. It is appreciated that the DO NOT SELL indication functionality described above provides a high level of control in implementing package-specific shelf-life restrictions and thus, by eliminating uncertainty regarding the shelf life of a given product, may enable packaged products which have been maintained under optimal conditions to have longer shelf lives than would otherwise be possible.

Additionally or alternatively, the further inspection at the checkout may also be carried out by a customer at a suitable quality check location within the store.

Turning now to FIG. 1E, it is seen that indicator 100 may additionally and independently serve to indicate exceedance of a predetermined temperature for a relatively short time duration. Thus, if the package 101 bearing indicator 100 is left inside a vehicle in the sun and is exposed to 40 degrees C. for a duration as short as ten minutes, the indicator 100 may assume a still further readable state 141. In such a situation, a purchaser, employing an imager-equipped telephone or other suitable mobile communicator 135 may image the indicator 100 and communicate the image information to a suitably programmed quality indication server 136, which may be identical to server 108 in FIG. 1D, and which is capable of reading the barcode from the image information and providing to the user, via SMS or any other suitable communication methodology, an immediate indication of a quality parameter, such as a DO NOT EAT indication 144. This quality parameter indicates that the product is not safe for human consumption.

FIG. 1E also shows that indicator 100 may additionally and independently serve to indicate elapsed time following purchase. Thus, upon exceedance of a predetermined long time period, such as 12 months following manufacture or other actuation of the indicator 100, the indicator 100 assumes yet a further readable state 145 which indicates that a predetermined amount of time has elapsed. Such a situation might occur, when package 101 bearing indicator 100 is forgotten in a consumer's home freezer. In such a situation, the consumer, employing imager-equipped telephone or other suitable mobile communicator 135 may image the indicator 100 and communicate the image information to suitably programmed quality indication server 136, which may be identical to server 108 in FIG. 1D, and which is capable of reading the barcode from the image information and providing to the user, via SMS or any other suitable communication methodology, an immediate indication of a quality parameter, such as an OK TO EAT indication 146. This quality parameter indicates that the product is safe for human consumption.

Reference is now made to FIGS. 2A, 2B, 2C, 2D, and 2E which together are a simplified illustration of a system and methodology for quality management constructed and operative in accordance with another preferred embodiment of the present invention. As seen in FIGS. 2A-2E, there is shown a quality management system and methodology for products including a multiplicity of product unit specific indicators, here shown in the form of changeable barcode indicators, each operative to provide a machine-readable indication of exceedance of at least one threshold by at least one product quality determining parameter, at least one indicator reader operative to read the product unit specific indicators and to provide output indications and a product type specific indication interpreter operative to receive the output indications and to provide human sensible, product unit specific, product quality status outputs.

The changeable barcode indicator may incorporate a product code such as an EAN or a UPC code. FIGS. 2A-2E illustrate the use of an EAN code.

Preferably, the product unit specific indicator is operative to provide a machine-readable indication of exceedance of at least one threshold by at least one product quality determining parameter, only after the elapse of a predetermined amount of time following actuation, and in a preferred embodiment provides a variable barcode having a visible pre-actuation state, a different visible post-actuation state, and at least one visible state indicating exceedance of a corresponding one of at least one threshold, which occurs only after the elapse of a predetermined amount of time following actuation.

Turning now to FIGS. 2A-2E, the present invention is illustrated in the context of a typical application, here a meat processing plant. A product unit specific indicator 150 is attached to or otherwise incorporated into each package 151 of processed meat. A package bearing a product unit specific indicator 150 may be an individual package suitable for retail sale and/or a carton containing a plurality of such individual packages. In the illustrated embodiment, packages 151 include both alternatives.

It is also a possibility that different types of indicators 150 may be employed for different types of packages. For example, the indicator used on a carton containing a plurality of individual packages may be more or less accurate or have a greater or lesser dynamic range, of indications than the indictor used on an individual package. For example, the indicator on a carton may include an indicator capable of indicating exceedance of additional thresholds, not included on the indicators of individual packages contained therein, or fewer thresholds than the indicators of individual packages contained therein.

In accordance with a preferred embodiment of the present invention, the indicators 150 may be assembled and/or actuated at the same location or at a location adjacent that at which the indicators 150 are associated with packages 151. A suitable indicator assembler is indicated by reference numeral 152. It is appreciated that assembly 152 may be associated with an automatic actuator.

In the illustrated embodiment, the indicator includes an EAN (European Article Number) barcode. The indicator 150 is typically constructed to be actuatable by pulling a pull strip 153 forming part thereof. In contrast to the embodiment described hereinabove with reference to FIGS. 1A-1E, actuation, as by pulling pull strip 153 does not result in immediate activation of the variable barcode indication functionality of indicator 150 and thus the indicator 150 does not provide a barcode readable indication of exceedance of thresholds which takes place during a period of time between actuation and activation.

Accordingly, the indicator 150 has a visible pre-actuation state indicated by reference numeral 154. In the illustrated example of FIGS. 2A-2E, where hot packaging and labeling takes place, it is necessary for activation to take place only once the product has been cooled to its desired long term storage temperature. Typically the resulting activation delay may be 8 hours following actuation. A different visible post-actuation state is indicated by reference numeral 155.

It is seen that during the activation delay, the indicator 150 is not sensitive to temperature and retains its visible post-actuation state. Once the activation delay has elapsed, so long as the temperature of the package 151 does not exceed 4 degrees Celsius and five days have not elapsed since manufacture or other activation of the indicator, the indicator 150 remains in readable state 155. At any stage, such as upon delivery to the customer, the indicator 150 can be read with a conventional barcode reader 156, which preferably communicates with a remote quality indication server 158 and provides an immediate indication of a quality parameter, such as an OK indication 160, to an inspector.

If and when, after the activation delay has elapsed, the temperature of the package 151 exceeds 4 degrees Celsius for at least a predetermined duration, typically four hours, such as when it reaches 15 degrees Celsius for 6 hours in the case of a transport vehicle breakdown, the indicator assumes a further readable state, indicated by reference numeral 162. Thus, as seen in FIG. 2A, if during truck loading, the temperature reaches 10 degrees Celsius for 30 minutes, i.e. less than the predetermined duration, the indicator docs not assume the further readable state. It is appreciated that the predetermined duration may be as long or short as necessary for a given application. This further readable state does act revert to readable state 155 notwithstanding that the temperature of the package 151 subsequently returns to an acceptable temperature, such as 4 degrees Celsius.

Accordingly, upon inspection, as upon delivery to the customer, upon reading the indicator 150 by an inspector using a conventional barcode reader 156, the barcode in its readable state 162 preferably provides information to the quality indication server 158 which enables the server to provide an immediate indication of a quality parameter, such as a BAD indication 164. This BAD indication 164 indicates that at some lime in the history of the indicator 150, the package 151 to which it was attached was at a temperature exceeding 4 degrees Celsius and that this event has rendered the specific product in package 151 unacceptable for sale.

Should the indicator 150 be in visible state 154, indicating that proper actuation of the indicator 150 did not occur a BAD indication 164 may be provided to an inspector or other interested party.

It is appreciated that whereas machine reading of the indicator 150 provides an indication of whether or not a given event has occurred, the indication of a quality parameter by quality indication server 158 provides an indication of whether and to what extent that event has affected the quality of a given product with which the indicator 150 is associated. It is appreciated that there may be a great variation in the effect of a given event depending on the type of product. Thus, for example, exposure to 35 degrees Celsius may cause fresh meat to be rendered unfit for sale but may not appreciably affect the quality or saleability of oranges.

Figure 2C:
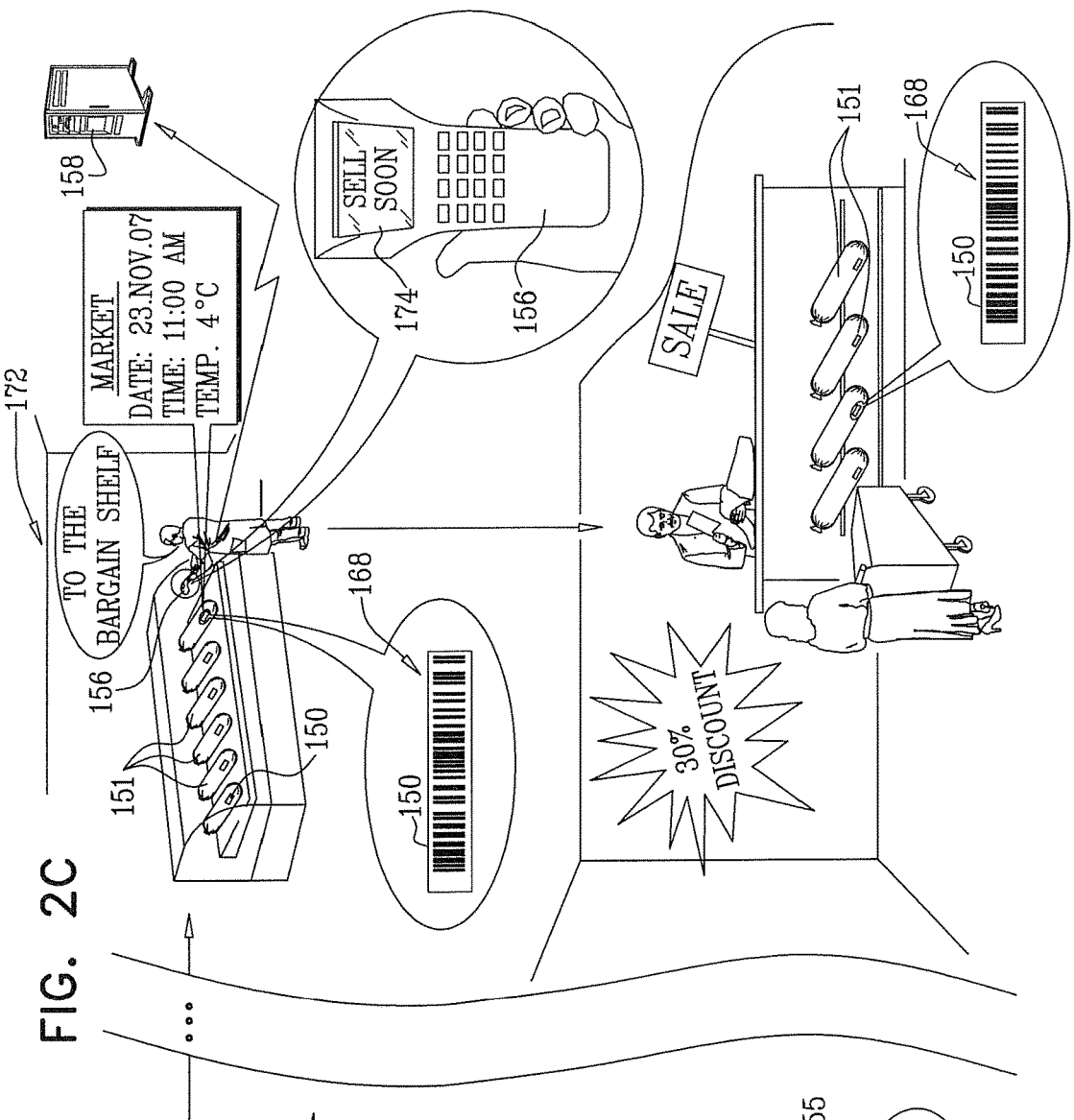
Figure 2C:
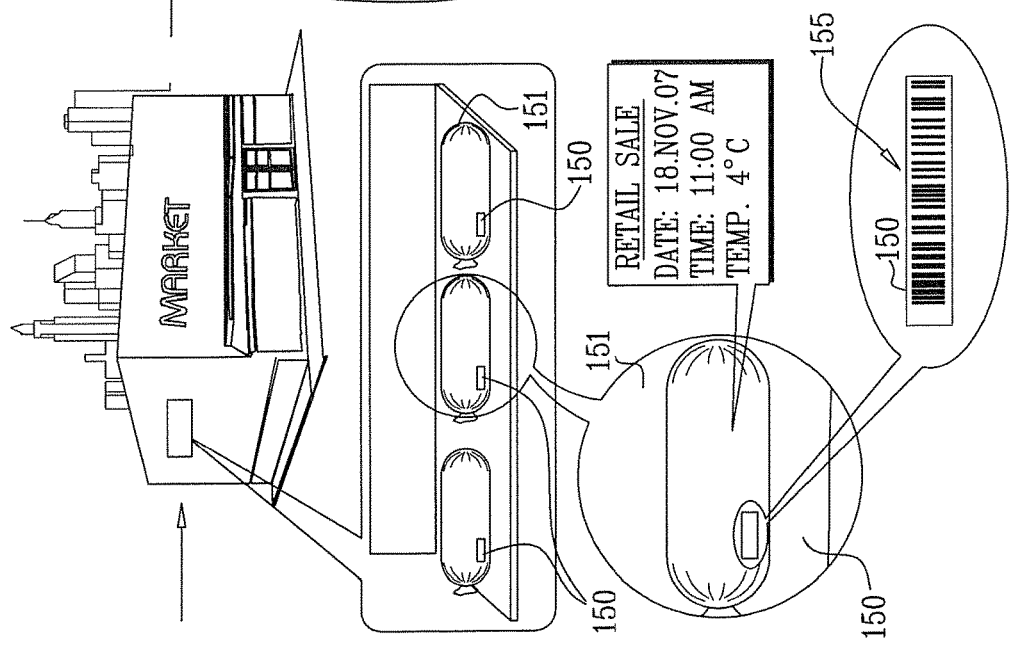

Turning now specifically to FIGS. 2C and 2D, it is seen that indicator 150 may additionally and independently serve to indicate elapsed time. Thus, upon exceedance of the predetermined time period following manufacture or other activation of the indicator 150, the indicator 150 assumes yet a further readable state 168 which indicates that a predetermined amount of time has elapsed. Upon elapse of a further predetermined amount of time, typically a second week, the indicator 150 may assume a still further readable state 170.

Accordingly, upon inspection, as indicated by reference numeral 172, as upon periodic stock inspection at a retail site, upon reading the indicator 150 by an inspector using a conventional barcode reader 156, the barcode in its readable state 168 provides information to the quality indication server 158 which enables the server to provide an immediate indication of a quality parameter, such as a SELL SOON indication 174. This SELL SOON indication 174 indicates that, since the predetermined time interval has elapsed, the package 151 to which it was attached should be positioned and/or priced for immediate sale.

Turning now to FIG. 2D, it is seen that upon further inspection, as indicated by reference numeral 182, as upon periodic stock inspection at the retail site, upon reading the indicator 150 by an inspector using a conventional barcode reader 156, the barcode in its readable state 170 provides information to the quality indication server 158 which enables the server to provide an immediate indication of a quality parameter, such as an EXPIRED indication 184. This EXPIRED indication 184 indicates that the package 151 to which it was attached should be discarded, since the further predetermined time period has elapsed.

Additionally or alternatively, a user, employing an imager-equipped telephone or other suitable mobile communicator 185 may image the indicator 150 and communicate the image information to a suitably programmed quality indication server 186, which may be identical to server 158, and which is capable of leading the barcode from the image information and providing to the user, via SMS or any other suitable communication methodology, an immediate indication of a quality parameter, such as an GOOD QUALITY indication 187. This quality parameter indicates that the product is safe for use.

It is appreciated that server 186 may provide reports to various interested entities, such as the manufacturer or distributor of the products, health authorities and other governmental or private entities, to enable real-time monitoring of the quality of products offered for sale. Server 186 may have caller ID functionality so as to be able to identify the caller, classify the caller, for example as a customer, a manufacturer's QA inspector and a health inspector, and provide an appropriate quality indication output. Additionally or alternatively, the quality indication server 186 may send messages to supermarket management regarding remedial steps to be taken, such as refrigeration maintenance or repair instructions.

Additionally or alternatively, the further inspection may take place automatically at the checkout, where the indicator 150 is read by a checkout scanner 188. In such a case, the barcode in its readable state 170 provides information to the quality indication server 158 which enables the server to provide an immediate indication of a quality parameter, such as a DO NOT SELL indication 190, to the checkout clerk. This DO NOT SELL indication 190 indicates that the package 131 to which it was attached may not be sold since the further predetermined time period has elapsed. It is appreciated that the DO NOT SELL indication functionality described above provides a high level of control in implementing package-specific shelf-life restrictions and thus, by eliminating uncertainty regarding the shelf life of a given product, may enable packaged products which have been maintained under optimal conditions to have longer shelf lives than would otherwise be possible.

Additionally or alternatively, the further inspection at the checkout may also be carried out by a customer at a suitable quality check location within the store.

Turning now to FIG. 2E, it is seen that indicator 150 may additionally and independently serve to indicate exceedance of a predetermined temperature for a relatively short time duration. Thus, if the package 151 bearing indicator 150 is left inside a vehicle in the sun and is exposed to 40 degrees C. for a duration as short as ten minutes, the indicator 150 may assume a still further readable state 191. In such a situation, a purchaser, employing an imager-equipped telephone or other suitable mobile communicator 185 may image the indicator 150 and communicate the image information to a suitably programmed quality indication server 186, which may be identical to server 158 in FIG. 2D, and which is capable of reading the barcode from the image information and providing to the user, via SMS or any other suitable communication methodology, an immediate indication of a quality parameter, such as a DO NOT EAT indication 194. This quality parameter indicates that the product is not safe for human consumption.

FIG. 2E also shows that indicator 150 may additionally and independently serve to indicate elapsed time following purchase. Thus, upon exceedance of a predetermined long time period, such as 12 months following manufacture or other actuation of the indicator 150, the indicator 150 assumes yet a further readable state 195 which indicates that a predetermined amount of time has elapsed. Such a situation might occur, when package 151 bearing indicator 150 is forgotten in a consumer's home freezer. In such a situation, the consumer, employing imager-equipped telephone or other suitable mobile communicator 185 may image the indicator 150 and communicate the image information to suitably programmed quality indication server 186, which may be identical to server 158 in FIG. 2D, and which is capable of reading the barcode from the image information and providing to the user, via SMS or any other suitable communication methodology, an immediate indication of a quality parameter, such as an OK TO EAT indication 196. This quality parameter indicates that the product is safe for human consumption.

Reference is now made to FIGS. 3A-3F, which are simplified illustrations of event indicators constructed and operative in accordance with a preferred embodiment of the present invention for indicating temperature history and a combination of elapsed time and temperature history.

Figure 3A:
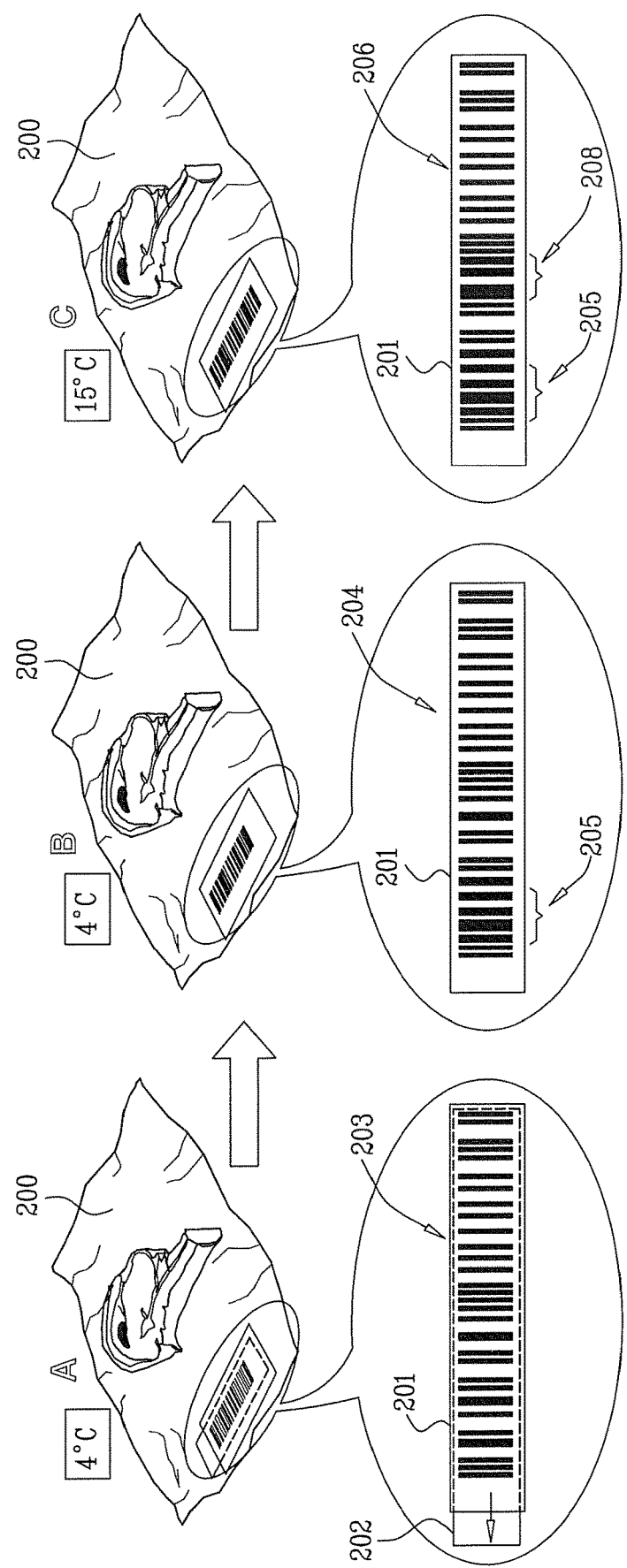
FIG. 3A is a simplified illustration of a quality indicator constructed and operative in accordance with a preferred embodiment of the present invention for indicating temperature history.

FIG. 3A illustrates a package of meat 200 including a temperature event indicator 201 constructed and operative in accordance with a preferred embodiment of the present invention of the type described hereinabove with reference to FIGS. 1A-1E. The indicator 201 is typically constructed to be actuatable by pulling a pull strip 202 forming part thereof. As illustrated in FIG. 3A, indicator 201 includes a barcode which is in a visible state 203, typically 7431348787736, prior to actuation, as indicated by designator A.

Following actuation, indicator 201 presents a barcode which is in a visible state 204, typically 7811348787736 including a changed portion 205 so long as the temperature of the package 200 does not exceed 4 degrees Celsius, as indicated by designator B. Once the temperature of the package 200 is more than 4 degrees Celsius, such as 15 degrees Celsius, the indicator presents a barcode which is in a visible state 206, typically 7811362787736, including a changed portion 208, as indicated by designator C. It is appreciated that once the state 206 is reached, the indicator preferably does not thereafter revert to the state 204 notwithstanding that the temperature of the package 200 subsequently returns to 4 degrees Celsius.

FIG. 3B illustrates a package of salami 210 including a temperature event indicator 211 constructed and operative in accordance with a preferred embodiment of the present invention, of the type described hereinabove with reference to FIGS. 2A-2E.

The indicator 211 is typically constructed to be actuatable by pulling a pull strip 212 forming part thereof. As illustrated in FIG. 3B, indicator 211 includes a barcode which is in a first visible state 214, typically 7431348787736, prior to actuation as indicated by designator A and in a second visible state 216, typically 7811348787736, including a changed portion 217 following actuation for at least a predetermined time, typically 8 hours, prior to activation, irrespective of the temperature of the indicator 211 as indicated by designators B and C.

Upon activation, the indicator 211 indicates exceedance of a predetermined temperature threshold, typically 4 degrees Celsius, as indicated by designator D, by changing to a third visible state 218, typically 7811362787736, including a changed portion 219. It is appreciated that once the slate 218 is reached, the indicator preferably does not thereafter revert to the state 216 notwithstanding that the temperature of the package 210 subsequently returns to 4 degrees Celsius.

Figure 3C:
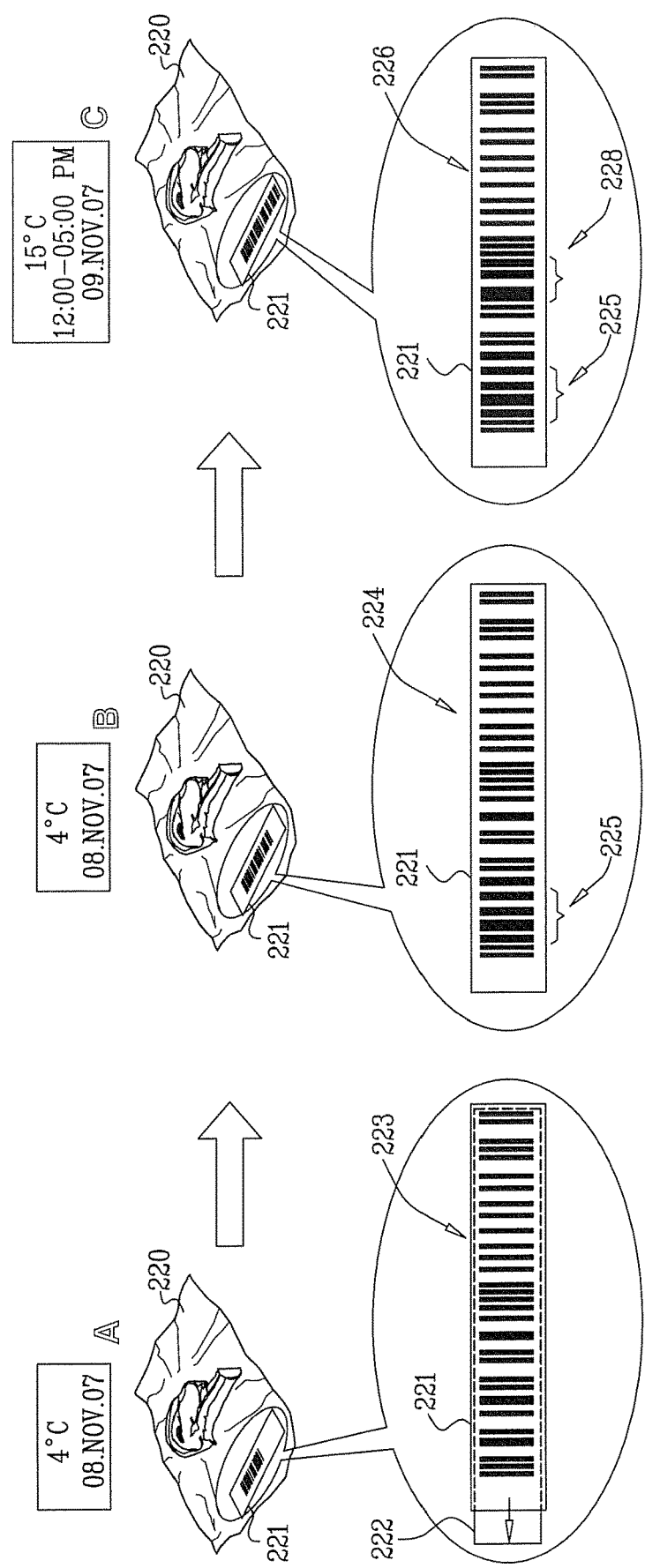
FIG. 3C is a simplified illustration of a quality indicator constructed and operative in accordance with another preferred embodiment of the present invention for indicating elapsed time/temperature history.

FIG. 3C illustrates a package of meat 220 including a combination elapsed time/temperature indicator 221, constructed and operative in accordance with a preferred embodiment of the present invention, of the type described hereinabove with reference to FIGS. 1A-1E. The indicator 221 is typically constructed to be actuatable by pulling a pull strip 222 forming part thereof.

As illustrated in FIG. 3C, indicator 221 includes a barcode which is in a visible state 223, typically 7431348787736, prior to actuation, as indicated by designator A. Following actuation, indicator 221 presents a barcode which is in a visible state 224, typically 7811348787736 including a changed portion 225 so long as the temperature of the package 220 does not exceed 4 degrees Celsius, as indicated by designator B. Once the temperature of the package 220 is more than 4 degrees Celsius for at least a predetermined duration, such as 15 degrees Celsius for five hours, the indicator presents a barcode which is in a visible state 226, typically 7811362787736, including a changed portion 228, as indicated by designator C. It is appreciated that once the state 226 is reached, the indicator preferably docs not thereafter revert to the state 224 notwithstanding that the temperature of the package 220 subsequently returns to 4 degrees Celsius.

FIG. 3D illustrates a package of salami 230 including a combination elapsed time/temperature indicator 231 constructed and operative in accordance with a preferred embodiment of the present invention, of the type described hereinabove with reference to FIGS. 2A-2E. The indicator 231 is typically constructed to be actuatable by pulling a pull strip 232 forming part thereof.

As illustrated in FIG. 3D, indicator 231 includes a barcode which is in a first visible state 233, typically 7431348787736, prior to actuation as indicated by designator A and in a second visible state 234, typically 7811348787736, including a changed portion 235 following actuation for at least a predetermined time, typically 8 hours, prior to activation, irrespective of the temperature of the indicator 231 as indicated by designators B and C.

Upon activation, once the temperature of the package 230 is more than 4 degrees Celsius for at least a predetermined duration, such as 15 degrees Celsius for five hours, as indicated by designator D, the indicator presents a barcode which is in a visible state 236, typically 7811362787736, including a changed portion 238. It is appreciated that once the state 236 is reached, the indicator preferably does not thereafter revert to the state 234 notwithstanding that the temperature of the package 230 subsequently returns to 4 degrees Celsius.

FIG. 3E illustrates a package of meat 240 including an indicator for separately indicating elapsed time and temperature 241, constructed and operative in accordance with a preferred embodiment of the present invention, of the type described hereinabove with reference to FIGS. 1A-1E. The indicator 241 is typically constructed to be actualable by pulling a pull strip 242 forming part thereof.

As illustrated in FIG. 3E, indicator 241 includes a barcode which is in a visible state 243, typically 7431348787736, prior to actuation, as indicated by designator A. Following actuation, indicator 241 presents a barcode which is in a visible state 244, typically 7811348787736 including a changed portion 245 so long as the temperature of the package 240 does not exceed 4 degrees Celsius, and no more than a predetermined time period, typically five days, has elapsed since actuation of the indicator, as indicated by designator B.

Once the temperature has exceeded 4 degrees Celsius for a predetermined amount of time, typically 5 hours, but the predetermined time period has not elapsed since actuation, the indicator presents a barcode which is in readable state 246, typically 7811362787736, including a changed portion 247, as indicated by designator C. Once the predetermined time has elapsed since actuation of indicator 241 the indicator presents a further readable state 248, typically 7811362927736, including a changed portion 249, as indicated by designator D. It is appreciated that once the state 246 is reached, the indicator preferably does not thereafter revert to the state 244 notwithstanding that the temperature of the package 240 subsequently returns to 4 degrees Celsius.

FIG. 3F illustrates a package of meat 250 including an indicator for separately indicating elapsed time and temperature 251, constructed and operative in accordance with a preferred embodiment of the present invention, of the type described hereinabove with reference to FIGS. 2A-2E. The indicator 251 is typically constructed to be actuatable by pulling a pull strip 252 forming part thereof.

As illustrated in FIG. 3F, indicator 251 includes a barcode which is in a first visible state 253, typically 7431348787736, prior to actuation as indicated by designator A and in a second visible state 254, typically 7811348787736, including a changed portion 255 following actuation for at least a predetermined time, typically 8 hours, prior to activation, irrespective of the temperature and elapsed time of the indicator 251 as indicated by designators B and C.

Following activation, once the temperature has exceeded 4 degrees Celsius for a predetermined amount of time, typically 5 hours, but the predetermined time period, typically five hours, has not elapsed since activation, the indicator presents a barcode which is in readable stale 256, typically 7811362787736, including a changed portion 257, as indicated by designator D. Once the predetermined time has elapsed since activation of indicator 251 the indicator presents a further readable state 258, typically 7811362927736, including a changed portion 259, as indicated by designator E. It is appreciated that once the stale 256 is reached, the indicator preferably does not thereafter revert to the state 254 notwithstanding that the temperature of the package 250 subsequently returns to 4 degrees Celsius.

Reference is now made to FIGS. 4A-4F, which, respectively, are simplified illustrations of the structure and operation of examples of the indicators of FIGS. 3A-3F constructed and operative in accordance with a preferred embodiment of the present invention for indicating temperature history and a combination of elapsed time and temperature history.

Figure 4A:
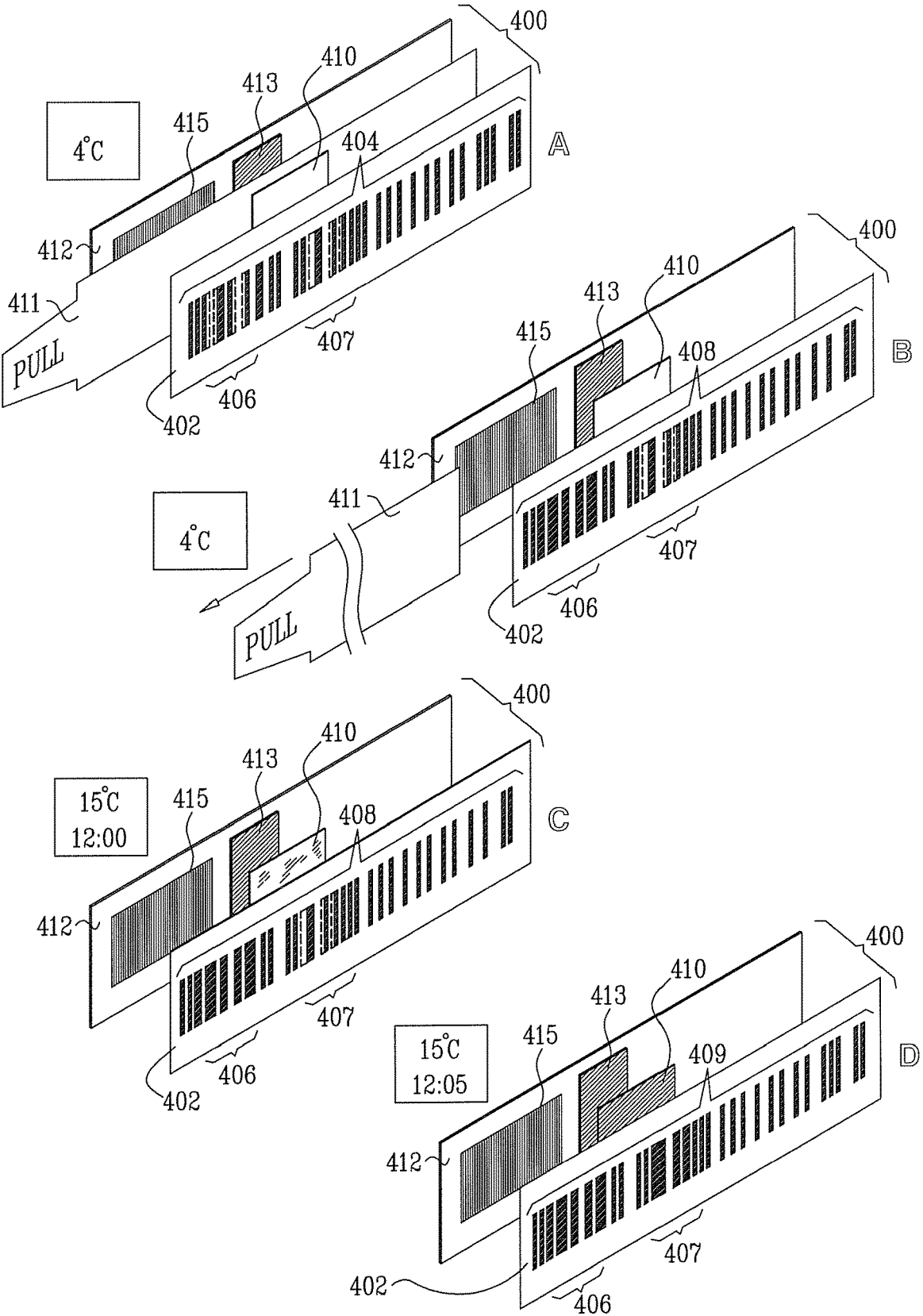
FIG. 4A is a simplified illustration of the structure and operation of an example of the indicator of FIG. 3A, in accordance with a preferred embodiment of the present invention.

Reference is now made to FIG. 4A, which is a simplified illustration of the construction and operation of one embodiment of the indicator 201 of FIG. 3A for indicating temperature history. As seen in FIG. 4A, the indicator, here designated by reference numeral 400, preferably includes a barcode defining layer 402, which is preferably printed on a transparent substrate. The printing on the transparent substrate preferably defines a barcode in a first visible state 404, typically 7431348787736, which is machine readable in this embodiment, and associated therewith a plurality of transparent areas 406 and 407.

If transparent areas 406 are colored and read together with the barcode in the first readable state 404, there is provided a barcode in a second readable state 408 typically 7811348787736. If both transparent areas 406 and 407 are colored and read together with the barcode in the first readable state 404, there is provided a barcode in a third readable state 409 typically 7811362787736. There is also a theoretical possibility that transparent areas 407 could be colored and 406 could not be colored, but it is not practical in the present embodiment.

It is appreciated that the remainder of the barcode defining layer 402, other than the barcode in a first readable state 404 and the transparent areas 406 and 407, is preferably printed in a white color or a color defining high contrast with respect to the barcode in the first readable state 404.

Disposed behind transparent areas 407 is a colorable element 410, which until colored is normally white. Disposed behind barcode defining layer 402 and behind colorable element 410 is a pull strip 411, corresponding to pull strip 102 in FIG. 1A, and pull strip 202 in FIG. 3A. Full strip 411 is preferably white and prevents the passage therethrough of coloring agents employed in this embodiment of the invention. Preferably, pull strip 411 is formed of polyester.

Disposed behind pull strip 411 is a back layer 412 onto which is preferably adhered, rearwardly of transparent areas 407, a temperature responsive coloring element 413, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium.

A colored area 415 is formed on back layer 412, rearwardly of transparent areas 406, in order to define high contrast with layer 402, when pull strip 411 is removed.

Until such time as pull strip 411 is removed, the indicator 400 is nonresponsive to temperature changes and remains in the first readable state 404 designated by A.

Once pull strip 411 is removed, the indicator 400 becomes responsive to temperature changes. As long as the temperature at the indicator stays below 4 degrees Celsius, the portions of the colored area 415 which are readable through the transparent areas 406 appear similarly to the barcode in the first readable state 404 and can be read together therewith as a single barcode in the second readable state 408, designated by B.

When the pull strip 411 has been removed and when the temperature at the indicator rises above 4 degrees Celsius, the coloring agent on coloring element 413 begins to melt and be released from coloring element 413 and begins to diffuse through the colorable element 410, as designated by C in FIG. 4A. Thus, when the temperature exceeds 4 degrees Celsius for at least a minimum time, such as 15 degrees Celsius for five minutes, the coloring agent rapidly diffuses through colorable element 410, such that the portions of the colorable element 410 which are readable through the transparent areas 407 appear similarly to the barcode in the first readable state 404 and can be read together therewith and with areas 406 as a single barcode as in the third readable state 409 designated by D in FIG. 4A.

Figure 4B:
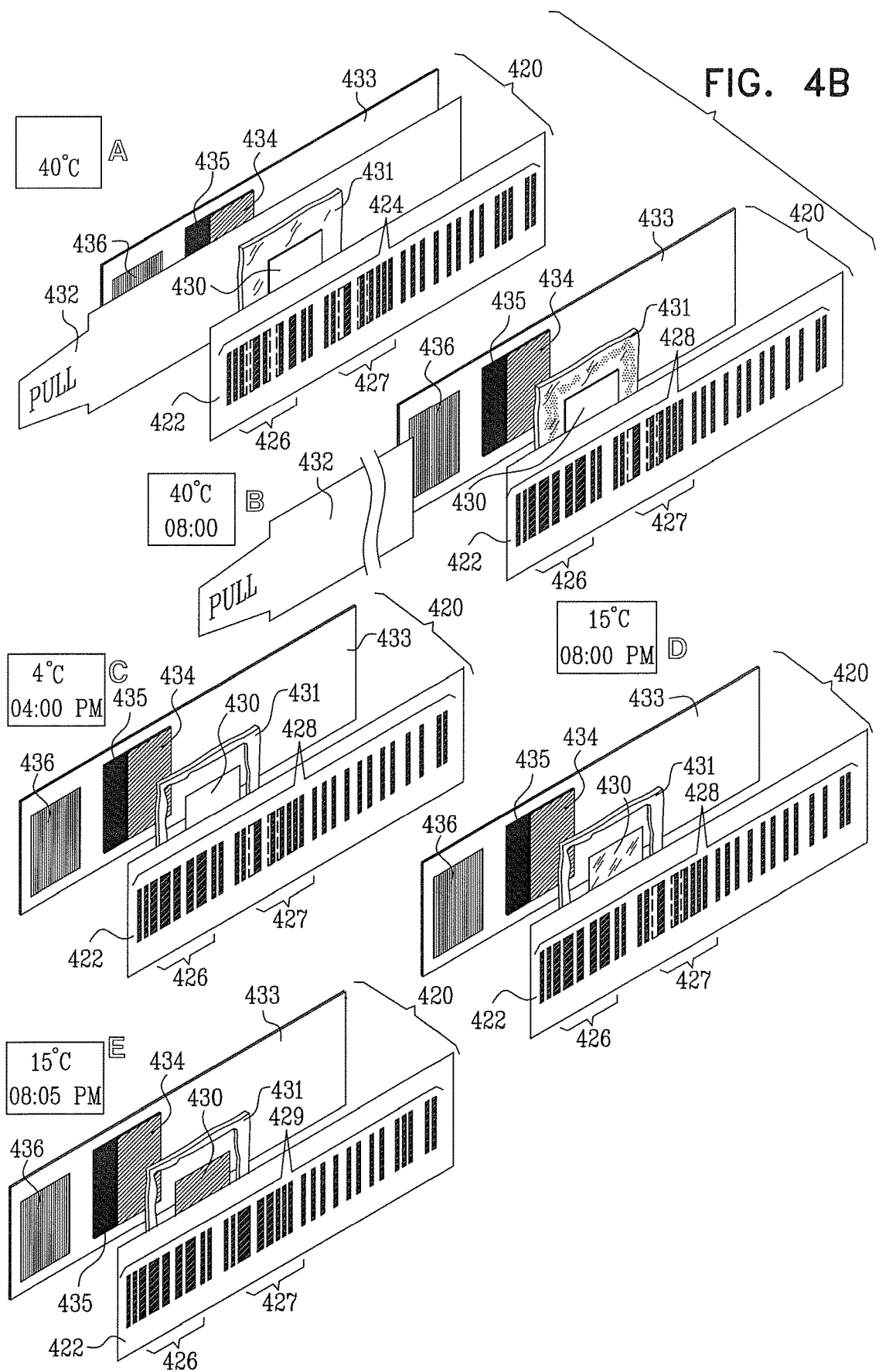
FIG. 4B is a simplified illustration of the structure and operation of an example of the indicator of FIG. 3B, in accordance with a preferred embodiment of the present invention.

Reference is now made to FIG. 4B, which is a simplified illustration of the construction and operation of one embodiment of the indicator 211 of FIG. 3B for indicating temperature history. As seen in FIG. 4B, the indicator, here designated by reference numeral 420, preferably includes a barcode defining layer 422, which is preferably printed on a transparent substrate. The printing on the transparent substrate preferably defines a barcode in a first visible state 424, typically 7431348787736, which is machine readable in this embodiment, and associated therewith a plurality of transparent areas 426 and 427.

If transparent areas 426 are colored and read together with the barcode in the first readable state 424, there is provided a barcode in a second readable state 428 typically 7811348787736. If both transparent areas 426 and 427 are colored and read together with the barcode in the first readable state 424, there is provided a barcode in a third readable state 429 typically 7811362787736. There is also a theoretical possibility that transparent areas 427 could be colored and 426 could not be colored, but it is not practical in the present embodiment.

It is appreciated that the remainder of the barcode defining layer 422, other than the barcode in a first readable slate 424 and the transparent areas 426 and 427, is preferably printed in a white color or a color defining high contrast with respect to the barcode in the first readable state 424.

Disposed behind transparent areas 427 and preferably adhered to barcode defining layer 422 is a colorable element 430, which until colored is normally white. Disposed behind barcode defining layer 422 and behind colorable element 430 and preferably adhered thereto is a dissolvable activation delay layer 431. Activation delay layer 431 is dissolvable by a suitable solvent, as described hereinbelow, and until dissolved prevents the passage therethrough of coloring agents employed in this embodiment of the present invention.

Disposed behind activation delay layer 431 is a pull strip 432, corresponding to pull strip 153 in FIG. 2A, and pull strip 212 in FIG. 3B. Pull strip 432 is preferably white and prevents the passage therethrough of coloring agents and solvents employed in this embodiment of the invention. Preferably, pull strip 432 is formed of polyester.

Disposed behind pull strip 432 is a back layer 433 onto which is preferably adhered, rearwardly of transparent areas 427, a temperature responsive coloring element 434, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium. Adjacent coloring element 434 or combined therewith is a solvent 435, such as Ethylene glycol (CAS #: 107-21-1), commercially available from Sigma Aldrich of St. Louis, Mo., which may be temperature responsive and which, as noted above, is operative to dissolve the dissolvable activation delay layer 431, preferably after a predetermined period of time, which is preferably measured in hours, such as eight hours.

A colored area 436 is formed on back layer 433, rearwardly of transparent areas 426, in order to define high contrast with layer 422, when pull strip 432 is removed.

Until such time as pull strip 432 is removed, the indicator 420 is nonresponsive to temperature changes and remains the first readable state 424 designated by A.

Once pull strip 432 is removed, solvent 435 begins to dissolve the dissolvable activation delay layer 431. Prior to dissolvable activation delay layer 431 becoming permeable to the coloring agent in temperature responsive coloring element 434, the indicator 420 does not provide a readable indication responsive to temperature changes and the portions of the colored area 436 which are readable through the transparent areas 426 appear similarly to the barcode in the first readable state 424 and can be read together therewith as a single barcode in the second readable state 428, designated by B.

Once dissolvable activation delay layer 431 becomes permeable to the coloring agent in temperature responsive coloring element 434, typically after 8 hours, the indicator 420 becomes responsive to temperature changes. As long as the temperature at the indicator stays below 4 degrees Celsius, the indicator remains in the second readable state 428, as designated by C. It is appreciated that the time needed to achieve dissolution of dissolvable activation delay layer 431 may be determined inter alia by the thickness thereof.

When the pull strip 432 has been removed and when the temperature at the indicator rises above 4 degrees Celsius, typically to 15 degrees Celsius, the coloring agent on coloring element 434 begins to melt and be released from coloring element 434 and begins to diffuse through the colorable element 430, as designated by D in FIG. 4B. Thus, when the temperature exceeds 4 degrees Celsius for at least a minimum time, such as 15 degrees Celsius for five minutes, the coloring agent rapidly diffuses through colorable element 430, such that the portions of the colorable element 430 which are readable through the transparent areas 427 appear similarly to the barcode in the first readable state 424 and can be read together therewith and with areas 426 as a single barcode as in the third readable state 429 designated by E in FIG. 4B.

Figure 4C:
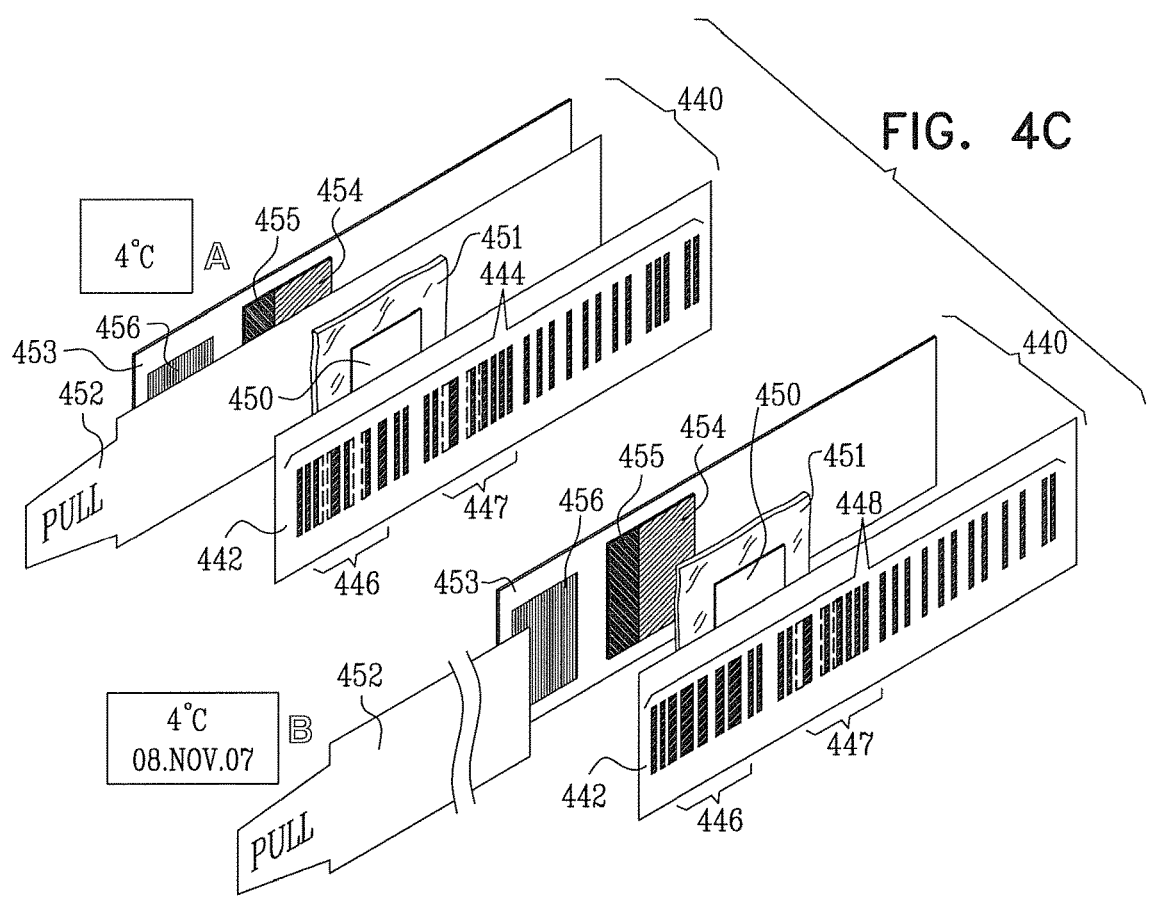
FIG. 4C is a simplified illustration of the structure and operation of an example of the indicator of FIG. 3C, in accordance with a preferred embodiment of the present invention.
Figure 4C:
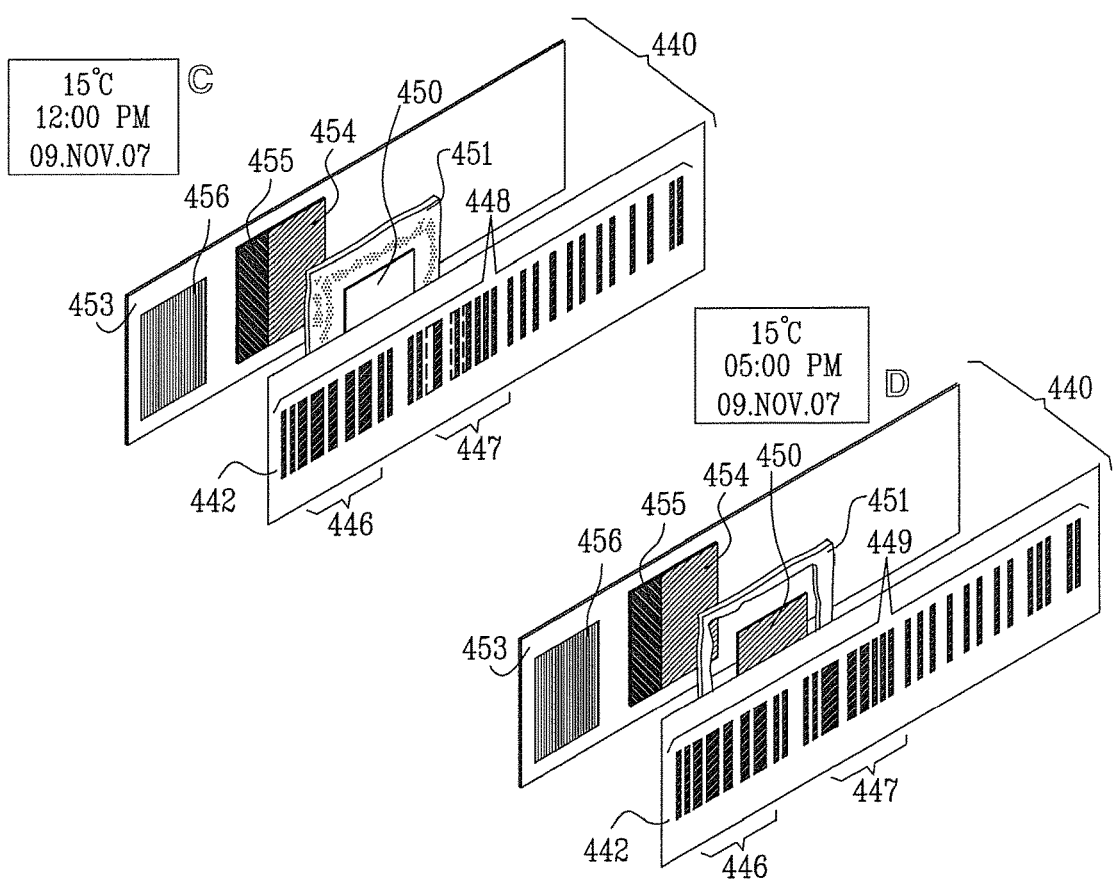

Reference is now made to FIG. 4C, which is a simplified illustration of the construction and operation of one embodiment of the indicator 221 of FIG. 3C for indicating temperature/time history. As seen in FIG. 4C, the indicator, here designated by reference numeral 440, preferably includes a barcode defining layer 442, which is preferably printed on a transparent substrate. The printing on the transparent substrate preferably defines a barcode in a first visible state 444, typically 7431348787736, which is machine readable in this embodiment, and associated therewith a plurality of transparent areas 446 and 447.

If transparent areas 446 are colored and read together with the barcode in the first readable state 444, there is provided a barcode in a second readable state 448 typically 7811348787736. If both transparent areas 446 and 447 are colored and read together with the barcode in the first readable state 444, there is provided a barcode in a third readable state 449 typically 7811362787736. There is also a theoretical possibility that transparent areas 447 could be colored and 446 could not be colored, but it is not practical in the present embodiment.

It is appreciated that the remainder of the barcode defining layer 442, other than the barcode in a first readable state 444 and the transparent areas 446 and 447, is preferably printed in a white color or a color defining high contrast with respect to the barcode in the first readable state 444.

Disposed behind transparent areas 447 and preferably adhered to barcode defining layer 442 is a colorable element 450, which until colored is normally white. Disposed behind barcode defining layer 442 and behind colorable element 450 and preferably adhered thereto is a dissolvable delay layer 451. Dissolvable delay layer 451 is dissolvable by a suitable solvent, as described hereinbelow, and until dissolved prevents the passage therethrough of coloring agents employed in this embodiment of the present invention.

Disposed behind dissolvable delay layer 451 is a pull strip 452, corresponding to pull strip 103 in FIG. 1A, and pull strip 222 in FIG. 3C. Pull strip 452 is preferably white and prevents the passage therethrough of coloring agents and solvents employed in this embodiment of the invention. Preferably, pull strip 452 is formed of polyester.

Disposed behind pull strip 452 is a back layer 453 onto which is preferably adhered, rearwardly of transparent areas 447, a coloring element 454, such as a piece of paper impregnated with a coloring agent, such as Nigrosine. Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium. Adjacent coloring element 454 or combined therewith is a temperature responsive solvent 455, such as Ethyl Cinnamate (CAS #: 103-36-6), commercially available from Sigma Aldrich of St. Louis, Mo., which, as noted above, is operative to dissolve the dissolvable delay layer 451, preferably after a predetermined period of time, which is preferably measured in hour's, such as five hours.

A colored area 456 is formed on back layer 453, rearwardly of transparent areas 446, in order to define high contrast with layer 442, when pull strip 452 is removed.

Until such time as pull strip 452 is removed, the indicator 440 is nonresponsive to temperature changes and remains the first readable state 444 designated by A.

Once pull strip 452 is removed and so long as the temperature does not exceed 4 degrees Celsius, the portions of the colored area 456 which are readable through the transparent areas 446 appear similarly to the barcode in the first readable state 444 and can be read together therewith as a single barcode in the second readable state 448, designated by B.

Following removal of pull strip 452 and once the temperature rises above 4 degrees Celsius, typically 15 degrees, solvent 455 begins to dissolve the dissolvable delay layer 451. Prior to dissolution of dissolvable delay layer 451, typically for a cumulative duration of four hours at a temperature above A degrees Celsius, after the solvent 455 begins to dissolve the dissolvable delay layer 451 the portions of the colored area 456 which are readable through the transparent areas 446 continue to appear similarly to the barcode in the first readable state 444 and can be read together therewith as a single barcode in the second readable state 448, designated by C. It is appreciated that the time needed to achieve dissolution of dissolvable delay layer 451 may be determined inter alia by the thickness thereof.

Once dissolvable delay layer 451 becomes permeable, to the coloring agent in coloring element 454, typically five hours after temperature rise, the coloring agent rapidly diffuses through colorable element 450, such that the portions of the colorable element 450 which are readable through the transparent areas 447 appear similarly to the barcode in the first readable state 444 and can be read together therewith and with areas 446 as a single barcode as in the third readable state 449 designated by D in FIG. 4C.

Reference is now made to FIG. 4D, which is a simplified illustration of the construction and operation of one embodiment of the indicator 231 of FIG. 3D indicating temperature/time history. As seen in FIG. 4D, the indicator, here designated by reference numeral 460, preferably includes a barcode defining layer 462, which is preferably printed on a transparent substrate. The printing on the transparent substrate preferably defines a barcode in a first visible state 464, typically 7431348787736, which is machine readable in this embodiment, and associated therewith a plurality of transparent areas 466 and 467.

If transparent areas 466 are colored and read together with the barcode in the first readable state 464, there is provided a barcode in a second readable state 468 typically 7811348787736. If both transparent areas 466 and 467 are colored and read together with the barcode in the first readable state 464, there is provided a barcode in a third readable state 469 typically 7811362787736. There is also a theoretical possibility that transparent areas 467 could be colored and 466 could not be colored, but it is not practical in the present embodiment.

It is appreciated that the remainder of the barcode defining layer 462, other than the barcode in a first readable state 464 and the transparent areas 466 and 467, is preferably printed in a white color or a color defining high contrast with respect to the barcode in the first readable state 464.

Disposed behind transparent areas 467 and preferably adhered to barcode defining layer 462 is a colorable element 470, which until colored is normally white. Disposed behind barcode defining layer 462 and behind colorable element 470 and preferably adhered thereto is a dissolvable delay layer 471. Dissolvable delay layer 471 is dissolvable by a suitable solvent, as described hereinbelow, and until dissolved prevents the passage therethrough of coloring agents employed in this embodiment of the present invention.

Disposed behind dissolvable delay layer 471 is a dissolvable activation delay layer 472. Dissolvable activation delay layer 472 is dissolvable by a suitable solvent, as described hereinbelow, preferably different from the solvent which dissolves delay layer 471, and until dissolved prevents the passage therethrough of the solvent which dissolves delay layer 471.

Disposed behind dissolvable activation delay layer 472 is a pull strip 473, corresponding to pull strip 153 in FIG. 2A, and pull strip 232 in FIG. 3D. Pull strip 473 is preferably white and prevents the passage therethrough of coloring agents and solvents employed in this embodiment of the invention. Preferably, pull strip 473 is formed of polyester.

Disposed behind pull strip 473 is a back layer 474 onto which is preferably adhered, rearwardly of transparent areas 467, a coloring element 475, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium. Adjacent coloring element 475 or combined therewith is a temperature responsive solvent 476, such as Ethyl Cinnamate (CAS #: 103-36-6), commercially available from Sigma Aldrich of St. Louis, Mo., which, as noted above, is operative to dissolve the dissolvable delay layer 471, preferably after a predetermined period of time, which is preferably measured in hours, such as five hours, and a second solvent 477, such as Ethylene glycol (CAS #: 107-21-1), commercially available from Sigma Aldrich of St. Louis, Mo., which, as noted above, is operative to dissolve the dissolvable activation delay layer 472, preferably after a predetermined period of time, which is preferably measured in hours, such as eight hours.

A colored area 478 is formed on back layer 474, rearwardly of transparent areas 466, in order to define high contrast with layer 462, when pull strip 473 is removed.

Until such time as pull strip 473 is removed, the indicator 460 is nonresponsive to temperature changes and remains the first readable state 464 designated by A.

Once pull strip 473 is removed, solvent 477 begins to dissolve the dissolvable activation delay layer 472. Prior to dissolvable activation delay layer 472 becoming permeable to temperature responsive solvent 476, tire indicator 460 does not provide a readable indication responsive to temperature changes and the portions of the colored area 478 which are readable through the transparent areas 466 appear similarly to the barcode in the first readable state 464 and can be read together therewith as a single barcode in the second readable stale 468, designated by B.

Once dissolvable activation delay layer 472 becomes permeable to temperature responsive solvent 476, typically after 8 hours, the indicator 460 becomes responsive to temperature changes and so long as the temperature docs not exceed 4 degrees Celsius, the portions of the colored area 478 which are readable through the transparent areas 466 continue to appear similarly to the barcode in the first readable state 464 and can be read together therewith as a single barcode in the second readable state 468, designated by C.

Following removal of pull strip 473 and once the temperature rises above 4 degrees Celsius, typically 15 degrees, temperature responsive solvent 476 begins to dissolve the dissolvable delay layer 471. Prior to dissolution of dissolvable delay layer 471, typically for a cumulative duration of four hours at a temperature above 4 degrees Celsius after the temperature responsive solvent 476 begins to dissolve the dissolvable delay layer 471, the portions of the colored area 478 which are readable through the transparent areas 466 continue to appear similarly to the barcode in the first readable state 464 and can be read together therewith as a single barcode in the second readable state 468, designated by D. It is appreciated that the lime needed to achieve dissolution of dissolvable activation delay layer 472 and of dissolvable delay layer 471 may be determined inter alia by the thickness thereof.

Once dissolvable delay layer 471 becomes permeable to the coloring agent in coloring element 475, typically after five hours at a temperature above 4 degrees Celsius, the coloring agent rapidly diffuses through colorable element 470, such that the portions of the colorable element 470 which are readable through the transparent areas 467 appear similarly to the barcode in the first readable state 464 and can be read together therewith and with areas 466 as a single barcode as in the third readable state 469 designated by E in FIG. 4D.

Reference is now made to FIG. 4E, which is a simplified illustration of the construction and operation of one embodiment of the indicator 241 of FIG. 3E for separately indicating elapse of time and time/temperature history. As seen in FIG. 4E, the indicator, here designated by reference numeral 480, preferably includes a barcode defining layer 482, which is preferably printed on a transparent substrate.

The printing on the transparent substrate preferably defines a barcode in a first readable state 484 typically 7431348787736 and associated therewith, a first plurality of transparent areas 486, which, if colored and read together with the barcode in the first readable state 484, provides a barcode in a second readable state 487, typically 7811348787736, a second plurality of transparent areas 488, which, if colored and read together with the barcode in the first readable state 484, and with areas 486, provides a barcode in a third readable state 489, typically 7811362787736, and a third plurality of transparent areas 490, which, if colored and read together with the barcode in the first readable stale 484, and with areas 486 and 488, provides a barcode in a forth readable state 491 typically 7811362927736.

There is also a theoretical possibility, not shown, that transparent areas 486 and 490 could be colored and 488 could not be colored.

There is also a theoretical possibility that transparent areas 488 could be colored end transparent areas 486 and 490 could not be colored, but it is not practical in the present embodiment.

There is also a theoretical possibility that transparent areas 490 could be colored and transparent areas 486 and 488 could not be colored, but it is not practical in the present embodiment.

There is also a theoretical possibility that transparent areas 488 and 490 could be colored and transparent areas 486 could not be colored, but it is not practical in the present embodiment.

It is appreciated that the remainder of the barcode defining layer 482, ether than the barcode in a first readable state 484 and the transparent areas 486, 488 and 490 is preferably printed in a white color or a color defining high contrast with respect to the barcode in the first readable state 484.

Disposed behind transparent areas 488 and 490 and preferably adhered to barcode defining layer 482 are colorable elements 492 and 493, which until colored are normally white. Disposed behind barcode defining layer 482 and behind colorable elements 492 and 493 and preferably adhered thereto are dissolvable delay layers 494 and 495. Dissolvable delay layer 494 is dissolvable by a first suitable solvent, as described hereinbelow, and until dissolved prevents die passage therethrough of coloring agents employed in this embodiment of the present invention. Dissolvable delay layer 495 is dissolvable by a second suitable solvent, as described hereinbelow, and until dissolved prevents the passage therethrough of coloring agents employed in this embodiment of the present invention.

Disposed behind dissolvable delay layers 494 and 495 is a pull strip 497, corresponding to pull strip 103 in FIG. 1A, and pull strip 242 in FIG. 3E. Full strip 497 is preferably white and prevents the passage there through of coloring agents and solvents employed in this embodiment of the invention. Preferably, pull strip 497 is formed of polyester.

Disposed behind pull strip 497 is a back layer 498 onto which is preferably adhered, rearwardly of transparent areas 488, a coloring element 499, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent

[CAS: 118-93-4], commercially available from Acros Organics of Geel, Belgium. Adjacent coloring element 499 or combined therewith is a temperature responsive solvent 500, such as Ethyl Cinnamate (CAS #: 103-36-6), commercially available from Sigma Aldrich of St. Louis, Mo., which, as noted above, is operative to dissolve the dissolvable delay layer 494, preferably after a predetermined period of time, which is preferably measured in hours, such as five hours.

Rearwardly of transparent areas 490 and preferably adhered to back layer 498 there is preferably provided a coloring element 502, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium. Adjacent coloring element 502 or combined therewith is a solvent 504, such as 1-Methylnaphthalene (CAS #: 124-07-02), commercially available from Sigma Aldrich of St. Louis, Mo., which, as noted above, is operative to dissolve the dissolvable delay layer 495, preferably after a predetermined period of time, which is preferably measured in days, such as five days.

A colored area 507 is formed on back layer 498, rearwardly of transparent areas 486, in order to define high contrast with layer 482, when pull strip 497 is removed.

Until such time as pull strip 497 is removed, the indicator 480 is nonresponsive to temperature changes and to elapsed time and remains in the first readable state 484 designated by A.

Once pull strip 497 is removed, the portions of the colored area 507 which are readable through the transparent areas 486 appear similarly to the barcode in the first readable state 484 and can be read together therewith as a single barcode in the second readable state 487. Following removal of pull strip 497 solvent 504 begins to dissolve the dissolvable delay layer 495, as designated by B.

Once the temperature rises above 4 degrees Celsius, typically at 15 degrees Celsius, temperature responsive solvent 500 begins to dissolve die dissolvable delay layer 494. At this point, the indicator 480 is still in the second readable state 487, as designated by C.

Once dissolution of delay layer 494 renders it permeable to the coloring agent in coloring element 499, typically a cumulative time duration of about five hours at a temperature above 4 degrees Celsius, the coloring agent rapidly diffuses through colorable element 492, such that the portions of the colorable element 492 which are readable through the transparent areas 488 appear similarly to the barcode in the first readable state 484 and can be read together therewith and with areas 486 as a single barcode as in the third readable state 489 designated by D in FIG. 4E.

Once dissolution of delay layer 495 renders it permeable to the coloring agent in coloring element 502, typically a cumulative time duration of about five days after removal of pull strip 497, the coloring agent rapidly diffuses through colorable element 493, such that the portions of the colorable element 493 which are readable through the transparent areas 490 appear similarly to the barcode in the first readable state 484 and can be read together therewith and with areas 486 and 488 as a single barcode as in the fourth readable state 491 designated by E in FIG. 4E. It is appreciated that the time needed to achieve dissolution of dissolvable delay layers 494 and 495 may be determined inter alia by the thickness thereof.

Reference is now made to FIG. 4F, which is a simplified illustration of the construction and operation of one embodiment of the indicator 251 of FIG. 3F for separately indicating elapse of time and time/temperature history. As seen in FIG. 4F, the indicator, here designated by reference numeral 580, preferably includes a barcode defining layer 582, which is preferably printed on a transparent substrate.

The printing on the transparent substrate preferably defines a barcode in a first readable state 584 typically 7431348787736 and associated therewith, a first plurality of transparent areas 586, which, if colored and read together with the barcode in the first readable state 584, provides a barcode in a second readable state 587, typically 7811348787736, a second plurality of transparent areas 588, which, if colored and read together with the barcode in the first readable state 584, and with areas 586, provides a barcode in a third readable state 589, typically 7811362787736, and a third plurality of transparent areas 590, which, if colored and read together with the barcode in the first readable state 584, and with areas 586 and 588, provides a barcode in a forth readable state 591, typically 7811362927736.

There is also a theoretical possibility, not shown, that transparent areas 586 and 590 could be colored and 588 could not be colored.

There is also a theoretical possibility that transparent areas 588 could be colored and transparent areas 586 and 590 could not be colored, but it is not practical in the present embodiment.

There is also a theoretical possibility that transparent areas 590 could be colored and transparent areas 586 and 588 could not be colored, but it is not practical in the present embodiment.

There is also a theoretical possibility that transparent areas 588 and 590 could be colored and transparent areas 586 could not be colored, but it is not practical in the present embodiment.

It is appreciated that the remainder of the barcode defining layer 582, other than the barcode in a first readable state 584 and the transparent areas 586, 588 and 590 is preferably printed in a white color or a color defining high contrast with respect to the barcode in the first readable state 584.

Disposed behind transparent areas 588 and 590 and preferably adhered to barcode defining layer 582 are colorable elements 592 and 593, which until colored are normally white. Disposed behind barcode defining layer 582 and behind colorable elements 592 and 593 and preferably adhered thereto are dissolvable delay layers 594 and 595.

Dissolvable delay layer 594 is dissolvable by a first suitable solvent, as described hereinbelow, and until dissolved prevents the passage therethrough of coloring agents employed in this embodiment of the present invention. Dissolvable delay layer 595 is dissolvable by a second suitable solvent, as described hereinbelow, and until dissolved prevents the passage therethrough of coloring agents employed in this embodiment of the present invention.

Disposed behind dissolvable delay layers 594 and 595 is dissolvable activation delay layer 596. Dissolvable activation delay layer 596 is dissolvable by a third suitable solvent, as described hereinbelow, and until dissolved prevents the passage therethrough of solvents and coloring agents employed in this embodiment of the present invention.

Disposed behind dissolvable activation delay layer 596 is a pull strip 597, corresponding to pull strip 153 in FIG. 2A, and pull strip 252 in FIG. 3F. Pull strip 597 is preferably white and prevents the passage therethrough of coloring agents and solvents employed in this embodiment of the invention. Preferably, pull strip 597 is formed of polyester.

Disposed behind pull strip 597 is a back layer 598 onto which is preferably adhered, rearwardly of transparent areas 588, a coloring element 599, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium. Adjacent coloring element 599 or combined therewith is a temperature responsive solvent 609, such as Ethyl Cinnamate (CAS #: 103-36-6), commercially available from Sigma Aldrich of St. Louis, Mo., which, as noted above, is operative to dissolve the dissolvable delay layer 594, preferably alter a predetermined period of time, which is preferably measured in hours, such as five hours.

Rearwardly of transparent areas 590 and preferably adhered to back layer 598, there is preferably provided a coloring element 602, such as a piece of paper impregnated with a coloring agent, such as Nigrosine, Alcohol soluble, a black color dye [CAS: 11099-03-9], commercially available from Acros Organics of Geel, Belgium, dissolved in 2'-Hydroxyacetophenone 99.9% solvent [CAS: 118-93-4], commercially available from Acros Organics of Geel, Belgium. Adjacent coloring element 602 or combined therewith is a solvent 604, such as 1-Methylnaphthalene (CAS #: 124-07-02), commercially available from Sigma Aldrich of St. Louis, Mo., which, as noted above, is operative to dissolve the dissolvable delay layer 595, preferably after a predetermined period of time, which is preferably measured in days, such as five days.

A solvent 606, such as Ethylene glycol (CAS #: 107-21-1), commercially available from Sigma Aldrich of St. Louis, Mo., is provided on back layer 598 and is operative to dissolve the dissolvable activation delay layer 596, preferably after a predetermined period of time, which is preferably measured in hours, such as eight hours.

A colored area 607 is formed on back layer 598, rearwardly of transparent areas 586, in order to define high contrast with layer 582, when pull strip 597 is removed.

Until such time as pull strip 597 is removed, the indicator 580 is nonresponsive to temperature changes and to elapsed time and remains in the first readable state 584 designated by A.

Once pull strip 597 is removed, solvent 606 begins to dissolve the dissolvable activation delay layer 596. Prior to dissolvable activation delay layer 596 becoming permeable to solvents 600 and 604, the indicator 580 does not provide a readable indication responsive to temperature changes and elapsed time and the portions of the colored area 607 which are readable through the transparent areas 586 appear similarly to the barcode in the first readable state 584 and can be read together therewith as a single barcode in the second readable state 587, as designated by B.

Following dissolution of dissolvable activation delay layer 596, typically 8 hours after removal of pull strip 597, solvent 604 begins to dissolve the dissolvable delay layer 595, as designated by C.

Once the temperature rises above 4 degrees Celsius, typically at 15 degrees Celsius, temperature responsive solvent 600 begins to dissolve the dissolvable delay layer 594. At this point, the indicator 589 is still in the second readable state 587.

Once dissolution of delay layer 594 renders it permeable to the coloring agent in coloring element 599, typically a cumulative time duration of about five hours at a temperature above 4 degrees Celsius, the coloring agent rapidly diffuses through colorable element 592, such that the portions of the colorable element 592 which are readable through the transparent areas 588 appear similarly to the barcode in the first readable state 584 and can be read together therewith and with areas 586 as a single barcode in tire third readable state 589 designated by D in FIG. 4F.

Once dissolution of delay layer 595 renders it permeable to the coloring agent in coloring element 602, typically a cumulative time duration of about five days after dissolution of activation delay layer 596, the coloring agent rapidly diffuses through colorable element 593, such that the portions of the colorable element 593 which are readable through the transparent areas 590 appear similarly to the barcode in the first readable state 584 and can be read together therewith and with areas 586 and 588 as a single barcode in the fourth readable state 591 designated by E in FIG. 4F. If is appreciated that the time needed to achieve dissolution of dissolvable activation delay layer 596 and of dissolvable delay layers 594 and 595 may be determined inter alia by the thickness thereof.

It is appreciated that the present invention also encompasses indicators wherein the first readable state has more digits than the second readable state and similarly where each subsequent readable state has fewer digits than the preceding readable state. This may readily be achieved in accordance with the present invention, for example, by initially locating a black background behind transparent areas, similar to the transparent areas described hereinabove with reference to FIGS. 4A-4F, and then, as the result of a change in an environmental parameter, changing that black background to white. Alternatively, this may be achieved by employing white on black background barcodes instead of black on white background barcodes as shown in the examples above.

Figure 5A:
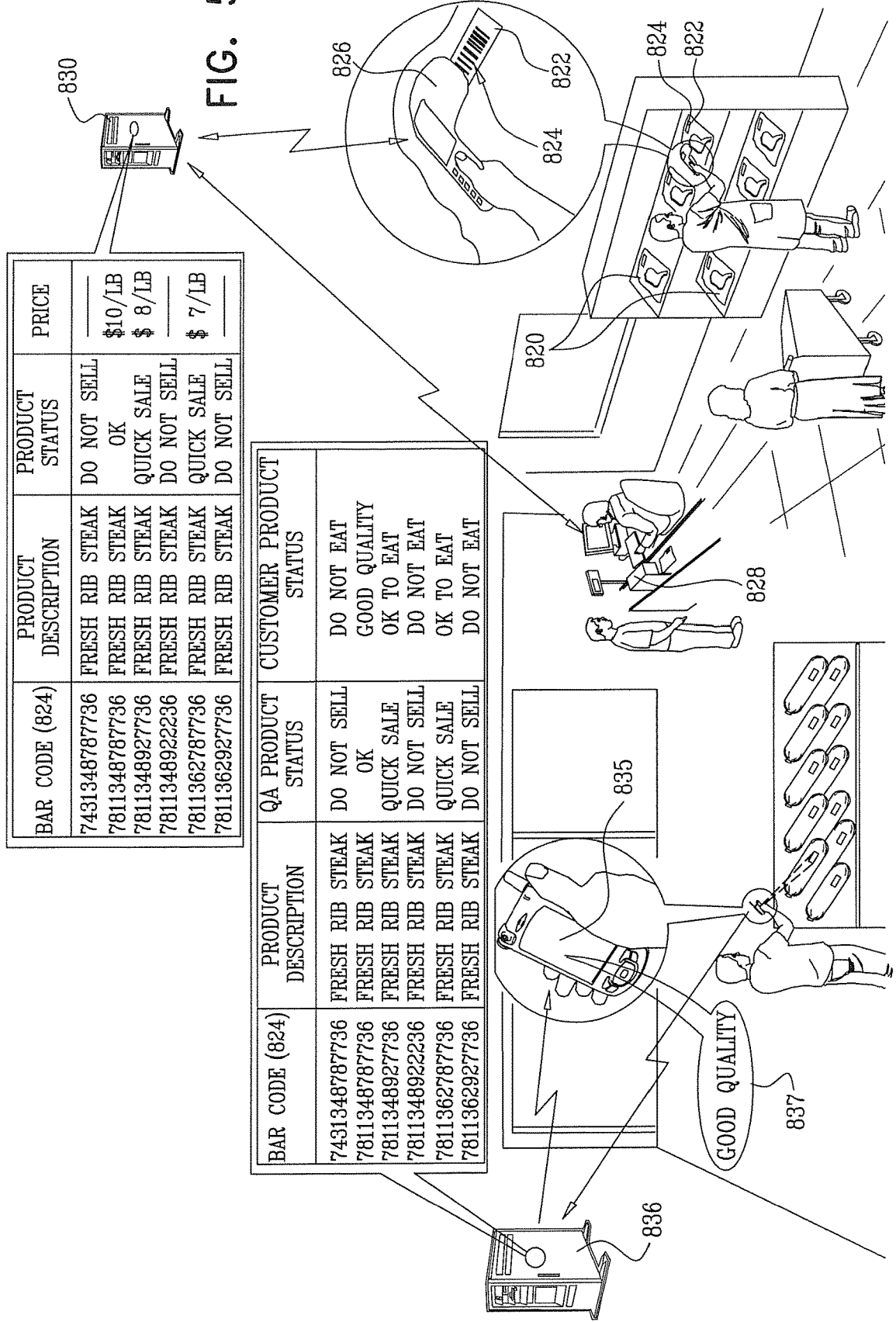
FIG. 5A is a simplified illustration of the structure and operation of a quality management system constructed and operative in accordance with a preferred embodiment of the present invention in the context of a supermarket.

Reference is now made to FIG. 5A, which illustrates the structure and operation of a quality management system constructed and operative in accordance with a preferred embodiment of the present invention in the context of a supermarket. In the embodiment of FIG. 5A, packaged products 820 each bear an event indicator 822 of the general type described hereinabove and illustrated in FIGS. 1A-4F and including one or more of the operational and structural features described hereinabove.

In the illustrated embodiment, indicator 822 preferably presents a variable barcode 824, which includes a product designator. Such a barcode may, but need not necessarily, include a UPC code. When this code is read, as by a conventional barcode reader 826 used by a stock checker or by a conventional checkout scanner 828, it provides product identification information to a product management server 830.

As described hereinabove, the barcode 824 is preferably a variable barcode which, depending on the product, may provide barcode readable indications of one or more event parameters, such as temperature and/or elapsed time, and for each such parameter may indicate multiple levels. For example, where the packaged product 820 is fresh rib steak, as shown, the barcode 824 may have multiple readable states such as:

FIRST READABLE STATE 7431348787736—FRESH RIB STEAK
INDICATOR WAS NOT ACTUATED
SECOND READABLE STATE 7811348787736—FRESH RIB STEAK
TEMPERATURE DID NOT EXCEED 4 DEGREES CELSIUS
TIME DURATION FROM PACKAGING DID NOT EXCEED 3 DAYS
THIRD READABLE STATE 7811348927736—FRESH RIB STEAK

TEMPERATURE DID NOT EXCEED 4 DEGREES CELSIUS
TIME DURATION FROM PACKAGING DID EXCEED 3 DAYS BUT DID NOT EXCEED 6 DAYS
FOURTH READABLE STATE 7811348922236—FRESH RIB STEAK
TEMPERATURE DID NOT EXCEED 4 DEGREES CELSIUS
TIME DURATION FROM PACKAGING DID EXCEED 6 DAYS
FIFTH READABLE STATE 7811362787736—FRESH RIB STEAK
TEMPERATURE DID EXCEED 4 DEGREES CELSIUS FOR MORE THAN 5 HOURS
TIME DURATION FROM PACKAGING DID NOT EXCEED 3 DAYS
SIXTH READABLE STATE 7811362927736—FRESH RIB STEAK
TEMPERATURE DID EXCEED 4 DEGREES CELSIUS FOR MORE THAN 5 HOURS
TIME DURATION FROM PACKAGING DID EXCEED 3 DAYS

In the illustrated embodiment, the product management server 830 maintains a database which preferably contains at least the following information:

TABLE I

| BARCODE | PRODUCT DESCRIPTION | PRODUCT STATUS | PRICE |
|---|---|---|---|
| 7431348787736 | FRESH RIB STEAK | DO NOT SELL | |
| 7811348787736 | FRESH RIB STEAK | OK | $10/LB |
| 7811348927736 | FRESH RIB STEAK | QUICK SALE | $8/LB |
| 7811348922236 | FRESH RIB STEAK | DO NOT SELL | |
| 7811362787736 | FRESH RIB STEAK | QUICK SALE | $7/LB |
| 7811362927736 | FRESH RIB STEAK | DO NOT SELL | |

Based on the scanned barcode, the product management server 830 provides both product status information and price information as appropriate to management as well as points of sale.

In accordance with an additional feature of the present invention, the code may be read by a consumer employing an imager-equipped telephone or other suitable mobile communicator 835 which may be identical to mobile communicator 135 (FIGS. 1D & 1E) or 185 (FIGS. 2D & 2E), who may image the indicator 822 and communicate the image information to a suitably programmed quality indication server 836, which may be identical to server 136 (FIGS. 1D & 1E) or 186 (FIGS. 2D & 2E), and to server 830, and which is capable of reading the barcode from the image information and providing to the user, via SMS or any other suitable communication methodology, an immediate indication of a quality parameter, such as a GOOD QUALITY indication 837. This quality parameter indicates that the product is safe for use Additionally or alternatively, server 836 may provide coupons to the user corresponding to the state of the indicator.

In the illustrated embodiment, the quality indication server 836 maintains a database which preferably contains at least the following information:

TABLE II

| BARCODE | PRODUCT DESCRIPTION | QA PROD. STATUS | CUSTOMER PROD STATUS |
|---|---|---|---|
| 7431348787736 | FRESH RIB STEAK | DO NOT SELL | DO NOT EAT |
| 7811348787736 | FRESH RIB STEAK | OK | GOOD QUALITY |
| 7811348927736 | FRESH RIB STEAK | QUICK SALE | OK TO EAT |
| 7811348922236 | FRESH RIB STEAK | DO NOT SELL | DO NOT EAT |
| 7811362787736 | FRESH RIB STEAK | QUICK SALE | OK TO EAT |
| 7811362927736 | FRESH RIB STEAK | DO NOT SELL | DO NOT EAT |

Based on the scanned barcode and identification of the caller, the quality indication server 836 provides product status information both to quality assurance inspectors and to customers. Additionally or alternatively, the quality indication server 836 may send messages to the supermarket management regarding remedial steps to be taken, such as refrigeration maintenance instructions.

Figure 5B:
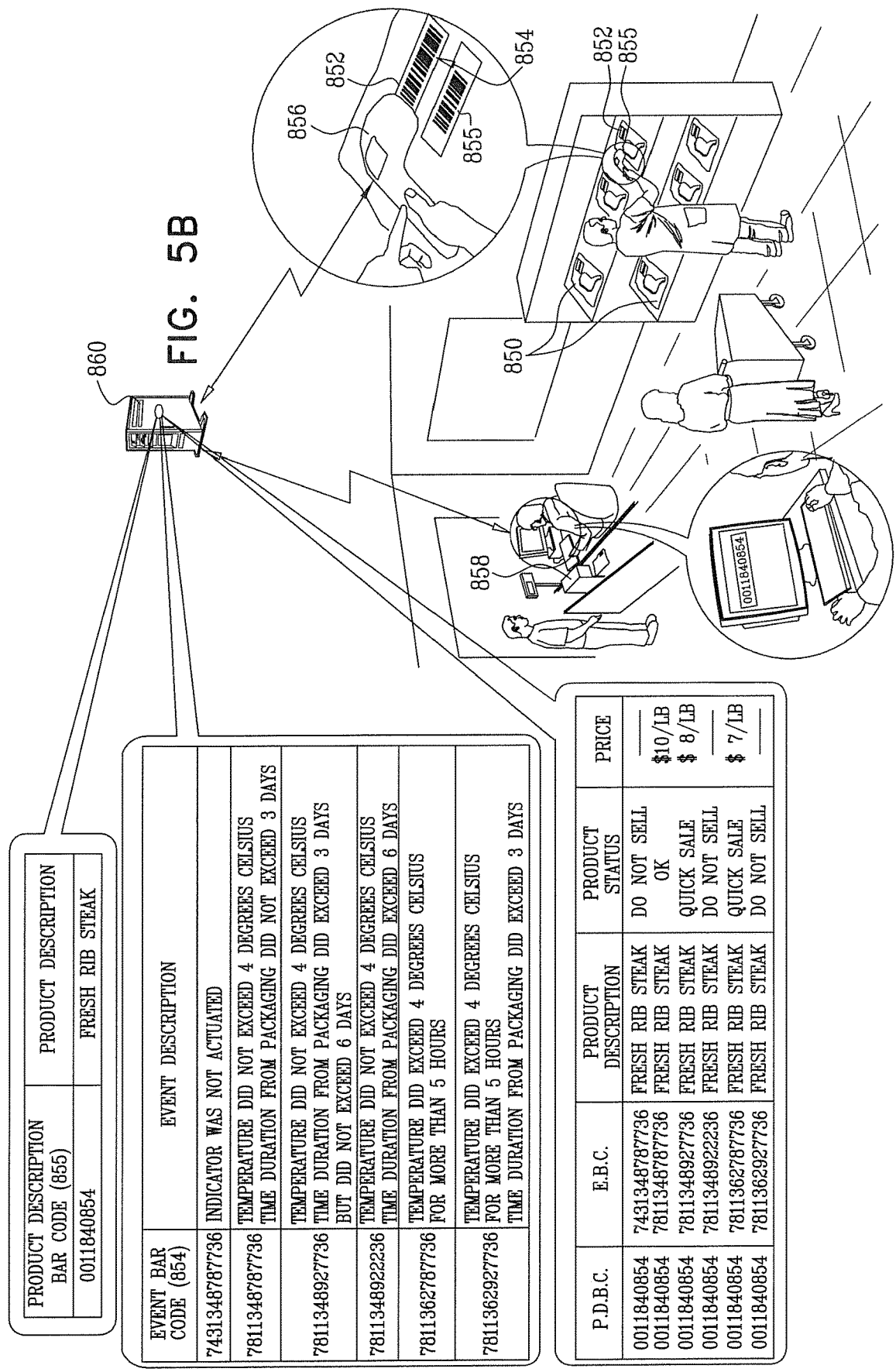
FIG. 5B is a simplified illustration of the structure and operation of a quality management system constructed and operative in accordance with a preferred embodiment of the present invention in the context of a supermarket.

Reference is now made to FIG. 5B, which illustrates the structure and operation of a quality management system constructed and operative in accordance with another preferred embodiment of the present invention in the context of a supermarket. In the embodiment of FIG. 5B, packaged products 850 each bear an event indicator 852 of the general type described hereinabove and illustrated in FIGS. 1-4F and including one or more of the operational and structural features described hereinabove.

In the illustrated embodiment, indicator 852 preferably presents a variable barcode 854 which does not include a product designator. A separate barcode bearing indicator 855, including, for example, a UPC code, may appear on each packaged product 850 or alternatively, a product designation may be entered manually when scanning barcode 854.

When barcode 854 is read, as by a conventional barcode reader 856, used by a stock checker or by a conventional checkout scanner 858, it provides event information but it does not provide product identification information to a product management server 860. Product identification information may be entered by scanning barcode bearing indicator 855 or manually.

As described hereinabove, with reference to FIGS. 1-4F, the barcode 854 is preferably a variable barcode which, depending on the product, may provide barcode readable indications of one or more event parameters, such as temperature and elapsed time, and for each such parameter may indicate multiple levels. In the illustrated example, the packaged product 850, as shown in a Product Description Table, is fresh rib steak, and the variable barcode 854 may have multiple readable states corresponding to multiple events, such as shown below in an Event Description Table.

In the illustrated embodiment of FIG. 5B, the variable barcode 854 includes a first readable state 7431348787736, a second readable state 7811348787736 7811348787736, a third readable state 7811348927736, a forth readable state 7811348922236, a fifth readable state 7811362787736, and a sixth readable state 7811362927736.

As seen in the illustrated embodiment, the product management server 860 maintains a database which preferably includes at least a product description table, such as Table III, and an event report table, such as Table IV.

TABLE III

| PRODUCT DESCRIPTION BARCODE (855) | PRODUCT DESCRIPTION |
|---|---|
| 0011840854 | FRESH RIB STEAK |

TABLE IV

| EVENT BARCODE (854) | EVENT DESCRIPTION |
|---|---|
| 7431348787736 | INDICATOR WAS NOT ACTUATED |
| 7811348787736 | TEMPERATURE DID NOT EXCEED 4 DEGREES CELSIUS TIME DURATION FROM PACKAGING DID NOT EXCEED 3 DAYS |
| 7811348927736 | TEMPERATURE DID NOT EXCEED 4 DEGREES CELSIUS TIME DURATION FROM PACKAGING DID EXCEED 3 DAYS BUT DID NOT EXCEED 6 DAYS |
| 7811348922236 | TEMPERATURE DID NOT EXCEED 4 DEGREE CELCIUS TIME DURATION FROM PACKAGING DID EXCEED 6 DAYS |
| 7811362787736 | TEMPERATURE DID EXCEED 4 DEGREES CELSIUS FOR MORE THAN 5 HOURS TIME DURATION FROM PACKAGING DID NOT EXCEED 3 DAYS |
| 7811362927736 | TEMPERATURE DID EXCEED 4 DEGREES CELSIUS FOR MORE THAN 5 HOURS TIME DURATION FROM PACKAGING DID EXCEED 3 DAYS |

Upon receipt of inputs identifying a product in Table III and indicating an event description in Table IV corresponding to the same product, the product management server 860 is operative to provide a product status table, such as Table V, typically including a product description barcode (P.D.B.C.), an event barcode (E.B.C.), a product description, a product status and a price, as follows:

TABLE V

| P.D.B.C | E.B.C | PRODUCT DESCRIPTION | PRODUCT STATUS | PRICE |
|---|---|---|---|---|
| 0011840854 | 7431348787736 | FRESH RIB STEAK | DO NOT SELL | |
| 0011840854 | 7811348787736 | FRESH RIB STEAK | OK | $10/LB |
| 0011840854 | 7811348927736 | FRESH RIB STEAK | QUICK SALE | $8/LB |
| 0011840854 | 7811348922236 | FRESH RIB STEAK | DO NOT SELL | |
| 0011840854 | 7811362787736 | FRESH RIB STEAK | QUICK SALE | $7/LB |
| 0011840854 | 7811362927736 | FRESH RIB STEAK | DO NOT SELL | |

The product management server 860 provides both product status information and price information from Table V to management as well as to points of sale as appropriate.

It will be appreciated by persons skilled in the art that the present invention is not limited by what has been particularly shown and described hereinabove. Rather the scope of the present invention includes both combinations and sub-combinations of various feature of the invention and modifications thereof which may occur to persons skilled in the art upon reading the foregoing description and which are not in the prior art.

The invention claimed is:

1. A quality management system for products comprising:
a multiplicity of barcode indicators each configured to provide a machine-readable indication of exceedance of at least one threshold by at least one product quality determining parameter, each of said multiplicity of barcode indicators comprising a pull strip, each of said multiplicity of barcode indicators being operative to provide said machine-readable indication only following actuation thereof, said actuation comprising removal of said pull strip;
a barcode indicator reader operative to read said barcode indicators and to provide output indications; and
an indication interpreter operative to receive said output indications and to provide human sensible, product unit specific, product quality status outputs.

2. A quality management system according to claim 1 and wherein prior to said actuation said barcode indicator is in a first visible state and following said actuation said barcode indicator is in a second visible state, different from said first visible state, and wherein said indicator is barcode reader-readable at least in said second visible state.

3. A quality management system according to claim 2 and wherein said indicator is not barcode reader-readable when said barcode indicator is in said first visible state.

4. A quality management system according to claim 2 and wherein said indicator is barcode reader-readable when said barcode indicator is in said first visible state.

5. A quality management system according to claim 1 and wherein said pull strip is suitable to prevent the passage of solvents and coloring agents therethrough before removal thereof.

6. A quality management system according to claim 1 and wherein said pull strip comprises a polyester pull strip.

7. A quality management system according to claim 1 and wherein each of said multiplicity of barcode indicators provides a first machine-readable indication prior to said exceedance of said at least one threshold and a second machine-readable indication following said exceedance of said at least one threshold.

8. A quality management system according to claim 1 and wherein said indication interpreter comprises a server communicating with said barcode indicator reader and providing at least one of a price indication, a shelf-life indication and a salability output indication.

9. A quality management system according to claim 1 and wherein each of said multiplicity of barcode indicators is operative to provide multiple machine-readable indications for exceedance of multiple ones of said thresholds.

\* \* \* \* \*